(12) United States Patent
Jung et al.

(10) Patent No.: US 12,302,344 B2
(45) Date of Patent: May 13, 2025

(54) METHOD AND DEVICE FOR TRANSMITTING OR RECEIVING MULTIPLE DATA IN WIRELESS COOPERATIVE COMMUNICATION SYSTEM

(71) Applicant: Samsung Electronics Co., Ltd., Suwon-si (KR)

(72) Inventors: Euichang Jung, Suwon-si (KR); Hoondong Noh, Suwon-si (KR); Jinhyun Park, Suwon-si (KR); Youngrok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 406 days.

(21) Appl. No.: 17/775,123

(22) PCT Filed: Nov. 9, 2020

(86) PCT No.: PCT/KR2020/015658
§ 371 (c)(1),
(2) Date: May 6, 2022

(87) PCT Pub. No.: WO2021/091361
PCT Pub. Date: May 14, 2021

(65) Prior Publication Data
US 2022/0408470 A1 Dec. 22, 2022

(30) Foreign Application Priority Data

Nov. 7, 2019 (KR) .................. 10-2019-0142139
Mar. 24, 2020 (KR) .................. 10-2020-0035748
(Continued)

(51) Int. Cl.
*H04W 72/23* (2023.01)
*H04B 17/373* (2015.01)
*H04L 5/00* (2006.01)

(52) U.S. Cl.
CPC .......... *H04W 72/23* (2023.01); *H04B 17/373* (2015.01); *H04L 5/0044* (2013.01); *H04L 5/0053* (2013.01)

(58) Field of Classification Search
CPC .... H04W 72/23; H04W 72/21; H04B 17/373; H04B 7/0695; H04L 5/0044; H04L 5/0053
See application file for complete search history.

(56) References Cited

U.S. PATENT DOCUMENTS 9,531,448 B2    12/2016  Sesia et al.
11,863,476 B2 *  1/2024  Lee .............. H04L 5/0053
(Continued)

FOREIGN PATENT DOCUMENTS

EP     3 547 782 A1    10/2019
WO   2019/099659 A1     5/2019

OTHER PUBLICATIONS

European Search Report dated Oct. 28, 2022, issued in European Application No. 20885908.2.
(Continued)

*Primary Examiner* — Hanh N Nguyen
(74) *Attorney, Agent, or Firm* — Jefferson IP Law, LLP

(57) ABSTRACT

A method of receiving a PDSCH, by a terminal, in a wireless communication system includes: receiving, from a base station through higher layer signaling, configuration information as to whether information of a transmission configuration indication (TCI) field included in downlink control information (DCI) is to be applied; receiving, from the base station, at least one physical downlink control channel (PDCCH) for scheduling a first PDSCH and a second PDSCH transmitted from different base stations from each other; and when it is configured to apply the TCI field, and when a scheduling time offset between the at least one PDCCH and at least one of the first PDSCH and the second
(Continued)

PDSCH is longer than or equal to a beam switching time limit, receiving each of the first PDSCH and the second PDSCH based on a quasi co-location (QCL) parameter of a TCI state indicated by a codepoint of a TCI field included in DCI transmitted through the at least one PDCCH.

15 Claims, 23 Drawing Sheets

(30) Foreign Application Priority Data

May 15, 2020 (KR) .................. 10-2020-0058633
May 26, 2020 (KR) .................. 10-2020-0063267

(56) References Cited

U.S. PATENT DOCUMENTS

| | | | |
|---|---|---|---|
| 2014/0321382 | A1 | 10/2014 | Guan |
| 2019/0253220 | A1* | 8/2019 | Kim .................. H04W 72/046 |
| 2019/0373450 | A1* | 12/2019 | Zhou .................. H04W 76/27 |
| 2022/0210800 | A1* | 6/2022 | Babaei .................. H04L 5/0092 |
| 2022/0360408 | A1* | 11/2022 | Jung .................. H04B 7/0628 |
| 2022/0361006 | A1* | 11/2022 | Xu .................. H04L 5/0023 |
| 2023/0052430 | A1* | 2/2023 | Kang .................. H04L 5/005 |

OTHER PUBLICATIONS

Huawei et al., Feature Summary of Enhancements on Multi-TRP/Panel Transmission, R1-1911425, 3GPP TSG RAN WG1 Meeting #98bis, Oct. 22, 2019, Chongqing, China.

3rd Generation Partnership Project; Technical Specification Group Radio Access Network; NR; Physical layer procedures for data (Release 15), 3GPP TS 38.214 V15.7.0, Sep. 28, 2019, Sophia Antipolis, France.

Huawei et al., Enhancements on multi-TRP/panel transmission, R1-1910073, 3GPP TSG RAN WG1 Meeting #98bis, Oct. 5, 2019, Chongqing, China.

Samsung, Enhancements on Multi-TRP/Panel Transmission, R1-1910493, 3GPP TSG RAN WG1 Meeting #98bis, Oct. 4, 2019, Chongqing, China.

International Search Report dated Jan. 29, 2021, issued in International Application No. PCT/KR2020/015658.

* cited by examiner

FIG. 9
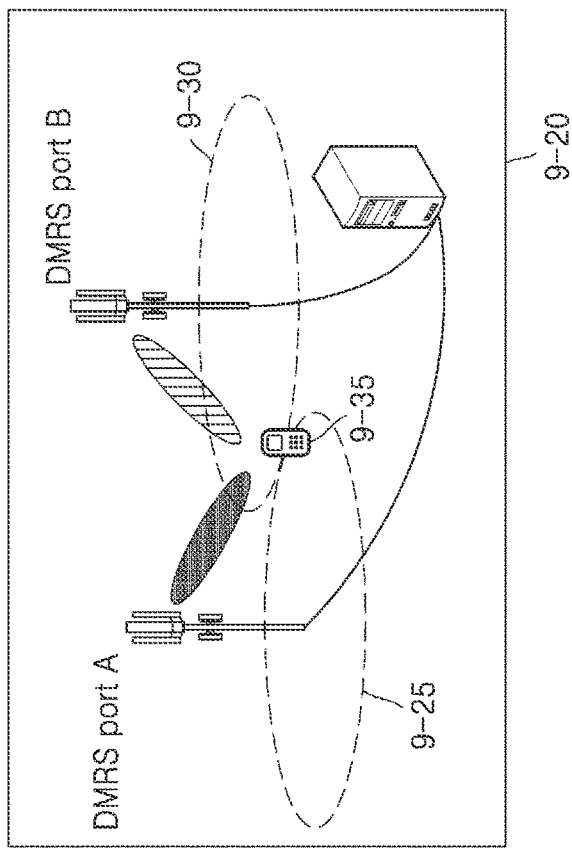
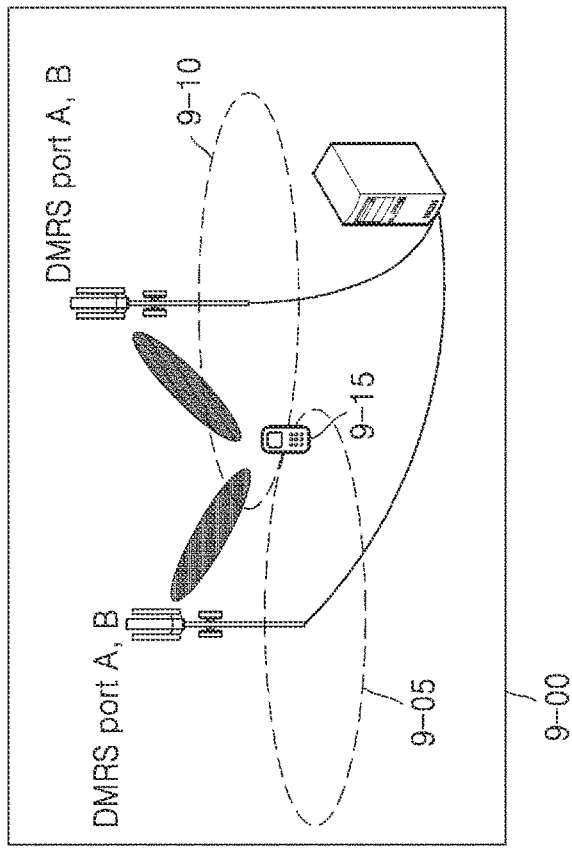

FIG. 10A

| R | Serving Cell ID | BWP ID | | Oct 1 |
|---|---|---|---|---|
| T7 | T6 | T5 | T4 | T3 | T2 | T1 | T0 | Oct 2 |
| T15 | T14 | T13 | T12 | T11 | T10 | T9 | T8 | Oct 2 |

10-00

$T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ — Oct N

| Serving Cell ID | CORESET ID | Oct 1 |
|---|---|---|
| CORESET ID | TCI state ID | Oct 2 |

10-50

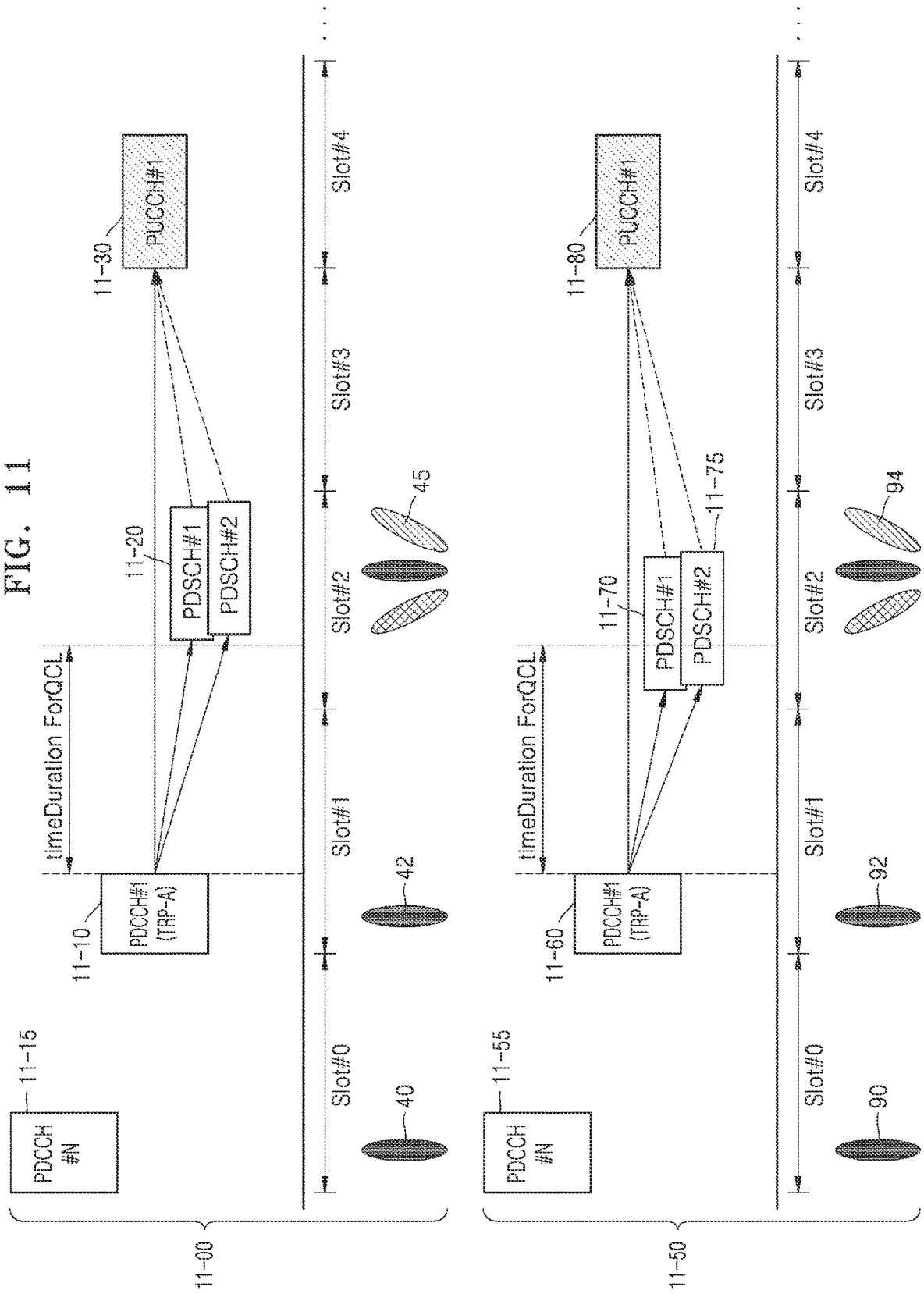

METHOD AND DEVICE FOR TRANSMITTING OR RECEIVING MULTIPLE DATA IN WIRELESS COOPERATIVE COMMUNICATION SYSTEM

TECHNICAL FIELD

The disclosure relates to a wireless communication system, and more particularly, to a method and device for transmitting or receiving multiple data in a wireless cooperative communication system.

BACKGROUND ART

In order to meet the increasing demand with respect to wireless data traffic after the commercialization of $4^{th}$ generation (4G) communication systems, efforts have been made to develop improved $5^{th}$ generation (5G) communication systems or pre-5G communication systems. For this reason, 5G communication systems or pre-5G communication systems are called 'beyond 4G network communication systems' or 'post long term evolution (LTE) systems'. In order to achieve a high data rate, consideration is given to implementing 5G communication systems in millimeter wave (mmW) frequency bands (e.g., 60 GHz bands). In order to reduce path loss of radio waves and increase a propagation distance of radio waves in millimeter wave frequency bands, in 5G communication systems, discussions are underway about technologies such as beamforming, massive multiple-input multiple-output (MIMO), full dimensional MIMO (FD-MIMO), array antenna, analog beamforming, and large scale antenna. Also, in order to improve networks of systems, in 5G communication systems, development of technologies such as evolved small cell, advanced small cell, cloud radio access network (cloud RAN), ultra-dense network, device-to-device (D2D) communication, wireless backhaul, moving network, cooperative communication, coordinated multi-points (CoMP), and interference cancellation is underway. Furthermore, in 5G communication systems, development of an advanced coding modulation (ACM) scheme such as hybrid frequency-shift keying (FSK) and quadrature amplitude modulation (QAM) modulation (FQAM) or sliding window superposition coding (SWSC) and an enhanced network access scheme such as filter-bank multi-carrier (FBMC), non-orthogonal multiple access (NOMA), or sparse code multiple access (SCMA) is underway.

The Internet is evolving from a human-centered connection network through which humans create and consume information to an Internet of Things (IoT) network through which distributed elements such as objects exchange and process information. Internet of Everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as sensor network, machine to machine (M2M) communication, or machine-type communication (MTC), has recently been studied. In an IoT environment, intelligent Internet technology (IT) services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology (IT) and various industries.

Various attempts have been made to apply 5G communication systems to IoT networks. For example, technology such as sensor network, M2M communication, or MTC is implemented by 5G communication technology such as beamforming, MIMO, or array antenna. The application of a cloud RAN as big data processing technology may also be considered as an example of convergence of 5G technology and IoT technology.

With the development of wireless communication systems as described above, there is a demand for a data transmission and reception scheme for network cooperative communication.

DESCRIPTION OF EMBODIMENTS

Technical Problem

According to an embodiment of the disclosure, a method by which a base station and a terminal determine default QCL in a wireless communication method is provided.

Also, according to an embodiment of the disclosure, a method by which a terminal and a base station determine default QCL based on MAC CE in Single/Multi-TRP is provided.

In order to solve the problem, a control signal processing method in a wireless communication system according to the disclosure includes: receiving a first control signal transmitted from a base station; processing the received first control signal; and transmitting a second control signal generated based on the processing, to the base station.

Solution to Problem

According to an embodiment of the disclosure, a method and device for transmitting or receiving one or more pieces of data between a transmission node and a terminal to perform cooperative communication in a wireless communication system may be provided.

The effects according to the disclosure are not limited thereto, and throughout the specification it will be clearly appreciated by those of ordinary skill in the art that there may be other effects that are not described herein.

BRIEF DESCRIPTION OF DRAWINGS

FIG. 9 is a diagram illustrating a configuration example of a cooperative communication antenna port according to an embodiment of the disclosure.

FIG. 10A is a diagram illustrating a structure of a MAC CE for TCI state activation of a UE-specific PDCCH according to the disclosure.

FIG. 11 is a diagram illustrating an example of single PDCCH-based cooperative communication according to an embodiment of the disclosure.

BEST MODE

Figure 1:
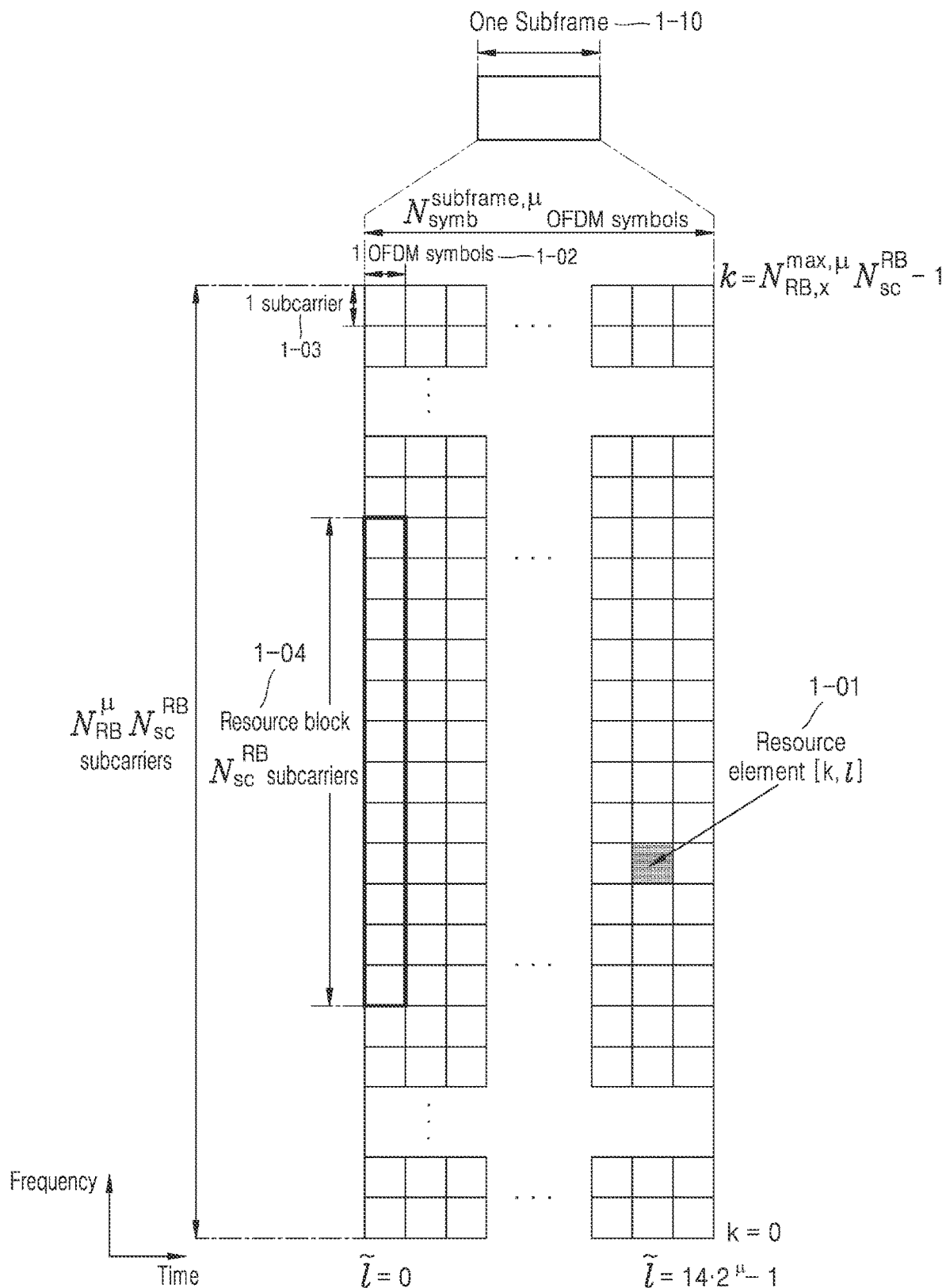
FIG. 1 is a diagram illustrating a time-frequency domain transmission structure of a Long Term Evolution (LTE) or an Evolved Universal Terrestrial Radio Access (E-UTRA), LTE-Advanced (LTE-A), NR or a similar wireless communication method thereto, according to an embodiment of the disclosure.

A method of receiving, by a terminal, a physical downlink shared channel (PDSCH) in a wireless communication system, according to an embodiment of the disclosure, includes: receiving, from a base station through higher layer signaling, configuration information as to whether information of a transmission configuration indication (TCI) field included in downlink control information (DCI) is to be applied; receiving, from the base station, at least one physical downlink control channel (PDCCH) for scheduling a first PDSCH and a second PDSCH transmitted from different base stations from each other; and when it is configured to apply the TCI field, and when a scheduling time offset between the at least one PDCCH and at least one of the first PDSCH and the second PDSCH is longer than or equal to a beam switching time limit, receiving each of the first PDSCH and the second PDSCH based on a quasi co-location (QCL) parameter of a TCI state indicated by a codepoint of a TCI field included in DCI transmitted through the at least one PDCCH.

In an embodiment, when the scheduling time offset is shorter than a beam switching time limit, the method may further include receiving each of the first PDSCH and the second PDSCH based on the QCL parameter used in reception of the at least one PDCCH.

In an embodiment, the QCL parameter used in reception of the at least one PDCCH may include a QCL parameter used in reception of a PDCCH in a CORESET associated with a search space having a lowest ControlResourceSET ID (CORESET ID) in a most recent slot.

In an embodiment, the beam switching time limit may be included in UE capability information and transmitted to the base station.

In an embodiment, the method may further include receiving, from the base station, a medium access control control element (MAC CE) including information related to at least one TCI state candidate for PDSCH, from among TCI states transmitted through higher layer signaling, wherein the TCI state indicated by the codepoint of the TCI field included in the DCI indicates one of the at least one TCI state candidate.

A method of transmitting, by a base station, a physical downlink shared channel (PDSCH) in a wireless communication system, according to an embodiment of the disclosure, includes: transmitting, to a terminal through higher layer signaling, configuration information as to whether information of a transmission configuration indication (TCI) field included in downlink control information (DCI) is to be applied; transmitting, to the terminal, a physical downlink control channel (PDCCH) for scheduling a plurality of PDSCHs transmitted from different base stations; and when it is configured to apply the TCI field, and when a scheduling time offset between the PDCCH and at least one of the PDSCHs is longer than or equal to a beam switching time limit, transmitting a PDSCH based on a quasi co-location (QCL) parameter of a TCI state indicated by a codepoint of a TCI field included in DCI transmitted through the PDCCH.

In an embodiment, the method may further include, when the scheduling time offset is shorter than the beam switching time limit, transmitting the PDSCH based on the QCL parameter used in transmitting the PDCCH.

In an embodiment, the QCL parameter used transmitting the at least one PDCCH may include a QCL parameter used in transmission of a PDCCH in a CORESET associated with a search space having a lowest CORESET ID in a most recent slot.

In an embodiment, the beam switching time limit may be included in UE capability information and received from the terminal.

In an embodiment, the method may further include transmitting, to the terminal, a MAC CE including information related to at least one TCI state candidate for a PDSCH, from among TCI states transmitted through higher layer signaling, wherein the TCI state indicated by the codepoint of the TCI field included in the DCI indicates one of the at least one TCI state candidate.

A method by a terminal for receiving a physical downlink shared channel (PDSCH) in a wireless communication system, according to an embodiment of the disclosure, the terminal including: a transceiver; and a controller configured to receive, from a base station through higher layer signaling, configuration information about whether information of a transmission configuration indication (TCI) field included in downlink control information (DCI) is to be applied, receive, from the base station, at least one physical downlink control channel (PDCCH) for scheduling a first PDSCH and a second PDSCH transmitted from different base stations from each other, and apply the TCI field, and controls to receive, when a scheduling time offset between the at least one PDCCH and at least one of the first PDSCH and the second PDSCH is longer than or equal to a beam switching time limit, each of the first PDSCH and the second PDSCH based on a quasi co-location (QCL) parameter of a TCI state indicated by a codepoint of a TCI field included in DCI transmitted though the at least one PDCCH.

In an embodiment, the controller may be further configured to, when the scheduling time offset is shorter than the beam switching time limit, receive each of the first PDSCH and the second PDSCH based on a QCL parameter used in reception of the at least one PDCCH.

In an embodiment, the QCL parameter used in reception of the at least one PDCCH may include a QCL parameter used in reception of a PDCCH in a CORESET associated with a search space having a lowest ControlResourceSET ID (CORESET ID) in a most recent slot.

In an embodiment, the controller may be further configured to receive, from the base station, information about at least one TCI state candidate for a PDSCH from among TCI states transmitted through higher layer signaling, wherein the TCI state indicated by the codepoint of the TCI field included in the DCI indicates one of the at least one TCI state candidate.

A base station for transmitting a physical downlink shared channel (PDSCH) in a wireless communication system, according to an embodiment of the disclosure, includes: a transceiver; and a controller configured to transmit, to a terminal through higher layer signaling, configuration information about whether information of a transmission configuration indication (TCI) field included in downlink control information (DCI) is to be applied, transmit, to the terminal, a physical downlink control channel (PDCCH) for scheduling a plurality of PDSCHs transmitted from different base stations from each other, and apply the TCI field, and controls to transmit, when a scheduling time offset between the PDCCH and at least one of the plurality of PDSCHs is longer than or equal to a beam switching time limit, a PDSCH based on a quasi co-location (QCL) parameter of a TCI state indicated by a codepoint of a TCI field included in DCI transmitted though the PDCCH.

MODE OF DISCLOSURE

Hereinafter, embodiments of the disclosure will be described in detail with reference to the attached drawings.

While describing embodiments of the disclosure, descriptions of techniques that are well known in the art and not directly related to the disclosure are omitted. This is to clearly convey the points of the disclosure by omitting an unnecessary explanation.

For the same reason, some elements in the attached drawings are exaggerated, omitted, or schematically illustrated. Also, a size of each element does not entirely reflect a real size of the element. In the drawings, the same or corresponding elements are denoted by the same reference numerals.

The advantages and features of the disclosure and methods of achieving them will become apparent with reference to embodiments of the disclosure described in detail below along with the attached drawings. The disclosure may, however, be embodied in many different forms and should not be construed as limited to embodiments of the disclosure set forth herein; rather these embodiments of the disclosure are provided so that this disclosure will be thorough and complete, and will fully convey the scope of the disclosure to one of ordinary skill in the art, and the scope of the disclosure is defined only by the accompanying claims. Throughout the disclosure, like reference numerals denote like elements.

It will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing apparatus, the instructions, which are executed via the processor of the computer or other programmable data processing apparatus generate means for implementing the functions specified in the flowchart block(s). These computer program instructions may also be stored in a computer-executable or computer-readable memory that may direct a computer or other programmable data processing equipment to function in a particular manner, such that the instructions stored in the computer-executable or computer-readable memory may produce a manufactured article including instruction means that perform the functions specified in the flowchart block(s). Because the computer program instructions may also be loaded onto a computer or other programmable data processing apparatus, a series of operational steps may be performed on the computer or other programmable apparatus to produce a computer implemented process, and thus the instructions executed on the computer or other programmable apparatus may provide steps for implementing the functions specified in the flowchart block(s).

Also, each block of the flowchart illustrations may represent a module, segment, or portion of code, which includes one or more executable instructions for implementing the specified logical function(s). Also, each block of the flowchart illustrations may represent a module, segment, or portion of code, which includes one or more executable instructions for implementing the specified logical function(s). For example, two blocks shown in succession may in fact be executed substantially concurrently or the blocks may sometimes be executed in the reverse order, depending upon the functionality involved.

The term "~ unit" used in the present embodiment refers to a software or hardware component, such as a field-programmable gate array (FPGA) or an application-specific integrated circuit (ASIC), which performs certain tasks. However, "~ unit" does not mean to be limited to software or hardware. The term "~ unit" may be configured to be in an addressable storage medium or configured to operate one or more processors. Thus, "~ unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and "~ units" may be combined into fewer components and "~ units" or further separated into additional components and "~ units". Further, components and "~ units" may be implemented to operate one or more central processing units (CPUs) in a device or a secure multimedia card. Also, a unit in an embodiment may include one or more processors.

Hereinafter, the operating principle of the disclosure will be described in detail with reference to the attached drawings. In the description of the disclosure, certain detailed explanations of related art are omitted when it is deemed that they may unnecessarily obscure the essence of the disclosure. The terms used in this specification are those terms in consideration of functions in regard to the disclosure, but the terms may vary according to the intention of those of ordinary skill in the art, precedents, or customs. Thus, the terms used in the specification should be understood based on the overall description of the disclosure. Hereinafter, a base station is an entity that allocates resources to a terminal and may include at least one of an eNode B, a Node B, a base station (BS), a radio access unit, a base station controller, and a node on a network. The terminal may include a user equipment (UE), a mobile station (MS), a terminal, a cellular phone, a smartphone, a computer, or a multimedia system capable of performing a communication function. The disclosure, however, is not limited to the above examples. Technology in which a terminal receives broadcast information from a base station in a wireless communication system will now be described. The disclosure relates to a communication method of converging a $5^{th}$ generation (5G) communication system for supporting a higher data rate than a $4^{th}$ generation (4G) system or a post-4G system with Internet of things (IoT) technology, and a system of the communication method. The disclosure may be applied to intelligent services based on 5G communication technology and IoT-related technology (e.g., smart home, smart building, smart city, smart car or connected car, health care, digital education, retail, security, and safety-related services).

In the following description, terms used to indicate broadcast information, terms used to indicate control information, terms related to communication coverage, terms used to indicate a state change, e.g., event, terms used to indicate network entities terms used to indicate messages, terms used to indicate constituent elements of a device, and the like are exemplified for convenience of explanation. Accordingly, the disclosure is not limited to the terms as used herein, and may use different terms to refer to the items having the same meaning in a technological sense.

Hereinafter, some terms and names defined in the $3^{rd}$ generation partnership project long term evolution (3GPP LTE) standard may be used for convenience of explanation. The disclosure is not, however, limited by the terms and definitions, and may be equally applied to any systems that conform to other standards.

A wireless communication system has developed beyond the initially provided voice-based service into a broadband wireless communication system that provides a high speed and high quality packet data service, like communication standards such as high-speed packet access (HSPA) of $3^{rd}$ generation partnership project (3GPP), long term evolution (LTE) or evolved universal terrestrial radio access (E-UTRA), LTE-advanced (LTE-A), high-rate packet data (HRPD) of 3GPP2, ultra-mobile broadband (UMB), and 802.16e of Institute of Electrical and Electronics Engineers (IEEE).

As a representative example of the broadband wireless communication systems, LTE systems employ orthogonal frequency division multiplexing (OFDM) for a downlink (DL), and employs single carrier-frequency division multiple access (SC-FDMA) for an uplink (UL). The uplink is a radio link through which a terminal (e.g., a user equipment (UE) or a mobile station (MS)) transmits data or a control signal to a base station (BS) (e.g., an eNode B), and the downlink is a radio link through which the base station transmits data or a control signal to the terminal. In the multi-access scheme described above, time-frequency resources for carrying data or control information are allocated and operated in a manner to prevent overlapping of the resources, i.e., to establish orthogonality between the resources so as to identify data or control information of each user.

As post-LTE systems, 5G systems need to support services capable of simultaneously reflecting and satisfying various requirements of users, service providers, etc. Services considered for 5G communication systems include enhanced mobile broadband (eMBB), massive machine type communication (mMTC), and ultra-reliable low-latency communication (URLLC).

According to some embodiments, eMBB may aim to provide a higher data rate than a data rate supported by LTE, LTE-A, or LTE-Pro. For example, the eMBB service in the 5G systems needs to provide a peak data rate of 20 gigabits per second (Gbps) for a downlink and a peak data rate of 10 Gbps for an uplink in view of a single base station. Simultaneously, eMBB may be able to provide an increased user perceived data rate of a UE. To satisfy these requirements, the 5G systems require various enhanced transmission/reception technologies including enhanced multiple-input and multiple-output (MIMO). In addition, it is possible to satisfy the data rate required by the 5G communication system by using a frequency bandwidth wider than 20 MHz in a frequency band of 3 to 6 GHz or 6 GHz or more, instead of the 2 GHz band currently used by LTE.

At the same time, the mMTC service is considered for the 5G systems to support application services such as the Internet of things (IoT). The mMTC service is required to, for example, support access by a large number of terminals within a cell, enhance terminal coverage, increase battery time, and reduce the cost of a terminal in order to efficiently provide the IoT service. The IoT service provides a communication function by using a variety of sensors attached to various devices, and thus needs to support a large number of terminals within a cell (e.g., 1,000,000 terminals/km$^2$). In addition, because terminals supporting mMTC are likely to be located in a dead zone not covered by a cell, e.g., a basement of a building, due to service characteristics, the mMTC service may require a wider coverage compared to other services provided by the 5G systems. The terminals supporting mMTC need to be low-priced, and may require a very long battery life time, because batteries are not frequently replaceable.

Finally, the URLLC which is a cellular-based wireless communication service used for mission-critical purposes needs to provide communication providing ultra-low latency and ultra-high reliability as a service used in remote control for robots or machinery, industrial automation, unmanaged aerial vehicles, remote health care, or emergency alert. For example, the URLLC service needs to satisfy an air interface latency less than 0.5 milliseconds and, at the same time, requires a packet error rate equal to or less than $10^{-5}$. Therefore, for the URLLC service, the 5G systems need to provide a smaller transmit time interval (TTI) compared to other services and, at the same time, may be required to allocate a wide resource in a frequency band. However, the mMTC, URLLC, and eMBB are examples of different service types, and service types to which the disclosure is applied are not limited thereto.

The services considered in the 5G communication systems described above may be converted with each other and provided based on one framework. In other words, for efficient resource management and control, services may be integrated, controlled, and transmitted via one system instead of being independently operated.

Also, although embodiments of the disclosure will be described based on an LTE, LTE-A, LTE Pro, or NR system, the embodiments of the disclosure may be applied to other communication systems having a similar technical background or channel type. The embodiments of the disclosure may be applied to other communication systems through some modifications without departing from the scope of the disclosure based on determination by one of ordinary skill in the art.

The disclosure relates to a method and device for repeatedly transmitting data and a control signal between multiple transmission nodes and a terminal, which perform cooperative communication, to increase communication reliability.

According to the disclosure, when network cooperative communication is used in a wireless communication system, reliability of terminal reception data/control signals may be improved.

Hereinafter, a frame structure of a 5G system is described in detail with reference to the drawings.

FIG. 1 is a diagram illustrating a time-frequency domain transmission structure of LTE, LTE-A, NR or a wireless communication system similar thereto, according to an embodiment of the disclosure.

FIG. 1 is a diagram illustrating a basic structure of a time-frequency domain, which is a radio resource domain in which a data or control channel is transmitted, in a 5G system. In FIG. 1, the horizontal axis indicates a time domain, and the vertical axis indicates a frequency domain. A basic resource unit in the time-frequency domain is a resource element (RE) 1-01 and may be defined by one orthogonal frequency division multiplexing (OFDM) symbol 1-02 in a time domain and one subcarrier 1-03 in a frequency domain. $N_{SC}^{RB}$ (e.g., 12) consecutive REs in the frequency domain may configure one resource block (RB) 1-04.

Figure 2:
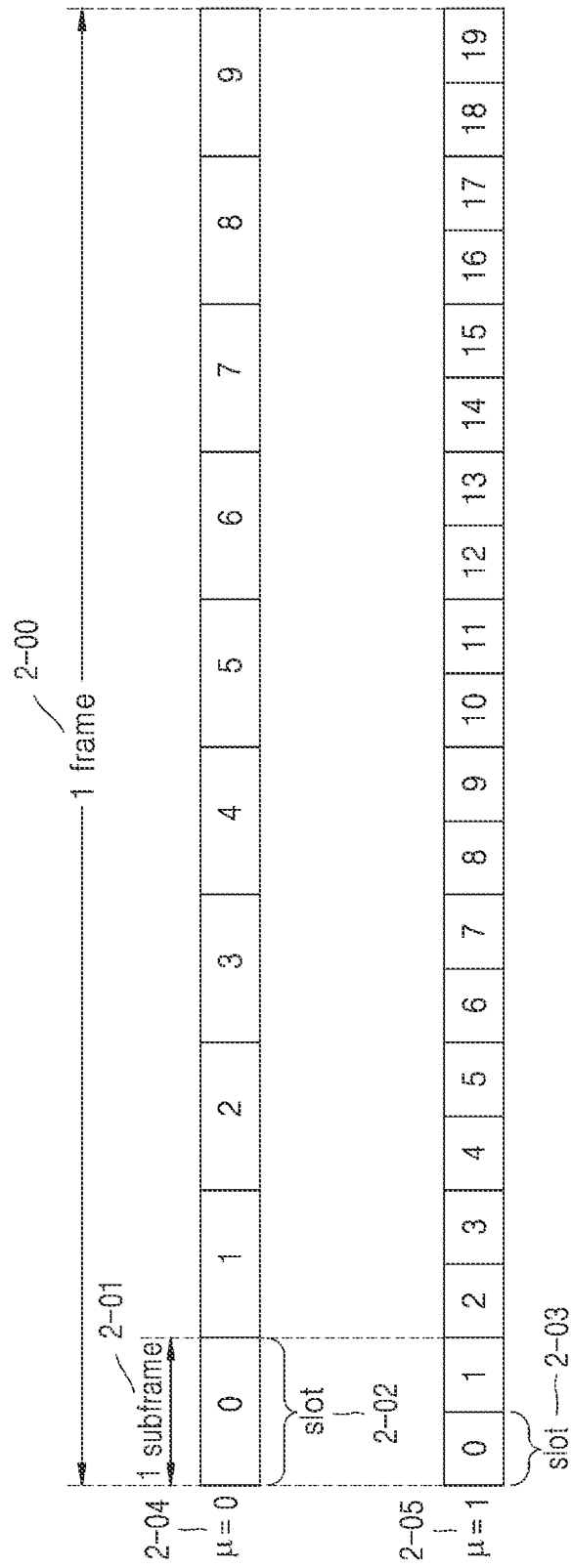
FIG. 2 is a diagram illustrating a frame, subframe, and slot structure in $5^{th}$ generation (5G), according to an embodiment of the disclosure.

FIG. 2 is a diagram illustrating a frame, subframe, and slot structure in 5G, according to an embodiment of the disclosure.

FIG. 2 is a diagram illustrating a slot structure considered in a 5G system. In FIG. 2, illustrated is an example of structures of a frame 2-00, a subframe 2-01, and slot 2-02. One frame 2-00 may be defined as 10 ms. One subframe 2-01 may be defined as 1 ms, and thus, one frame 2-00 may include a total of 10 subframes 2-01. Also, one slot 2-02 or 2-03 may be defined as 14 OFDM symbols (i.e., the number of symbols per slot ($N_{symb}^{slot}$)=14). One subframe 2-01 may include one or more slots 2-02 or 2-03, and the number of slots 2-02 or 2-03 per subframe 2-01 may vary according to a subcarrier spacing configuration value μ (2-04 and 2-05). In the example of FIG. 2, the subcarrier spacing configuration values are 0 and 1, i.e., μ=0 (204) and μ=1 (205). In the case of μ=0 (2-04), one subframe 2-01 may include one slot 2-02, and in the case of μ=1 (2-05), one subframe 2-01 may include two slots 2-03. That is, the number of slots per subframe ($N_{slot}^{subframe,\mu}$) may vary according to the subcarrier spacing configuration value μ, and the number of slots per frame ($N_{slot}^{frame,\mu}$) may accordingly vary. $N_{slot}^{subframe,\mu}$ and $N_{slot}^{frame,\mu}$ based on the subcarrier spacing value μ may be defined as shown in Table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |

TABLE 1-continued

| μ | $N_{symb}^{slot}$ | $N_{slot}^{frame,\mu}$ | $N_{slot}^{subframe,\mu}$ |
|---|---|---|---|
| 3 | 14 | 80 | 8 |
| 4 | 14 | 160 | 16 |
| 5 | 14 | 320 | 32 |

In an NR system, one component carrier (CC) or serving cell may be configured with up to 250 or more RBs. Accordingly, when a terminal always receives an entire serving cell bandwidth as in the LTE system, power consumption of the terminal may be severe, and to solve this, a base station may configure one or more bandwidth parts (BWPs) to the terminal to support the terminal to change a reception area in a cell. In the NR system, the base station may configure an 'initial BWP' that is a bandwidth of a CORESET #0 (or common search space (CSS)) to the terminal via a master information block (MIB). Then, the base station may configure the initial BWP of the terminal via RRC signaling, and notify one or more pieces of BWP configuration information that may be indicated via downlink control information (DCI) later. Next, the base station may notify about a BWP ID via the DCI to indicate to the terminal which band to use. When the terminal does not receive the DCI from a currently assigned BWP for a specific period of time, the terminal may return to a 'default BWP' and try to receive the DCI.

Figure 3:
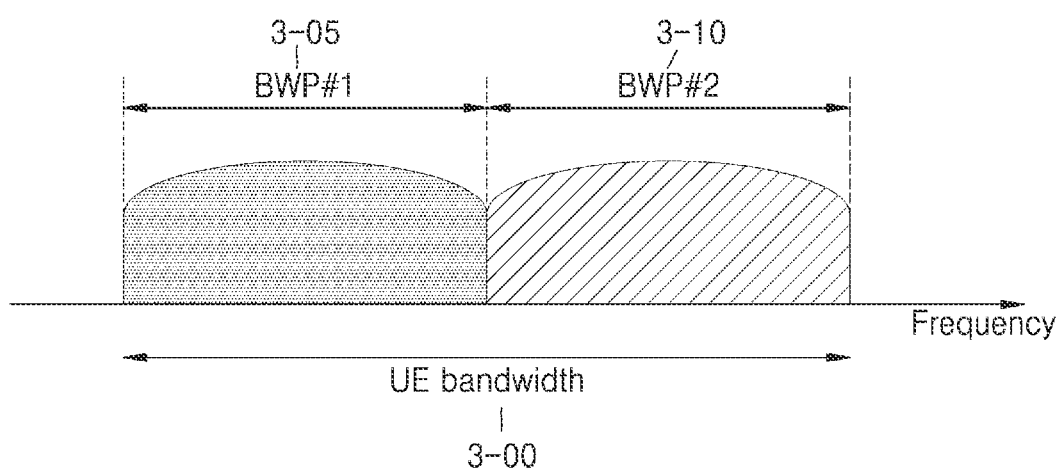
FIG. 3 is a diagram illustrating a configuration example of a bandwidth part (BWP) in a wireless communication system according to an embodiment of the disclosure.

FIG. 3 is a diagram illustrating an example of configuring a bandwidth part in a wireless communication system, according to an embodiment of the disclosure.

FIG. 3 is a diagram illustrating a configuration example of a bandwidth part in a 5G communication system. Referring to FIG. 3, a terminal bandwidth 3-00 may be configured in two BWPs, i.e., a BWP #1 3-05 and a BWP #2 3-10. A base station may configure one or more BWPs to a terminal and may configure pieces of information as below as shown in Table 2 for each BWP.

TABLE 2

| | |
|---|---|
| Configuration information 1 | bandwidth of bandwidth part (number of PRBs constituting bandwidth part) |
| Configuration information 2 | A frequency position of a bandwidth part (Examples of such information may include an offset value with respect to a reference point, and examples of the reference point may include, for example, a central frequency of a subcarrier, a synchronization signal, a synchronization signal raster.) |
| Configuration information 3 | numerology of BWP (for example, subcarrier spacing, a cyclic prefix (CP) length, etc.) |
| Others | |

In addition to configuration information of Table 2, various parameters related to a BWP may be configured for the terminal. The pieces of information described above may be transmitted by a base station to a terminal via higher layer signaling, for example, RRC signaling. At least one BWP from among the configured one or more BWPs may be activated. Whether the configured BWP is to be activated may be semi-statically transmitted from the base station to the terminal through RRC signaling or may be dynamically transmitted through a medium access control (MAC) control element (CE) or downlink control information (DCI).

A configuration of a BWP supported by the 5G systems described above may be used for various purposes.

For example, when a bandwidth supported by the terminal is smaller than a system bandwidth, it may be supported via the configuration of a BWP. For example, by configuring a frequency location (configuration information 2) of a BWP in Table 2 to the terminal, the terminal may transmit/receive data at a specific frequency location in the system bandwidth.

As another example, the base station may configure a plurality of BWPs to the terminal for a purpose of supporting different numerologies. For example, to support data transmission/reception using both subcarrier spacing of 15 kHz and subcarrier spacing of 30 kHz for a terminal, two BWPs may be configured to respectively use the subcarrier spacings of 15 kHz and 30 kHz. Frequency division multiplexing (FDM) may be performed on different BWPs, and when data is to be transmitted/received in a specific subcarrier spacing, a BWP configured at the corresponding subcarrier spacing may be activated.

As another example, the base station may configure BWPs having different sizes of bandwidths to the terminal for a purpose of reducing power consumption of the terminal. For example, when the terminal supports a very large bandwidth, for example, a bandwidth of 100 MHz, and always transmits/receives data in the corresponding bandwidth, very large power consumption may occur. In particular, it is very inefficient in terms of power consumption for the terminal to monitor an unnecessary downlink control channel for a large bandwidth of 100 MHz in a situation where there is no traffic. Accordingly, the base station may configure a BWP of a relatively small bandwidth, for example, a BWP of 20 MHz, to the terminal for a purpose of reducing the power consumption of the terminal. In a situation where there is no traffic, the terminal may perform a monitoring operation in a BWP of 20 MHz, and when data is generated, the terminal may transmit/receive the data by using a BWP of 100 MHz according to an instruction of the base station.

Figure 4:
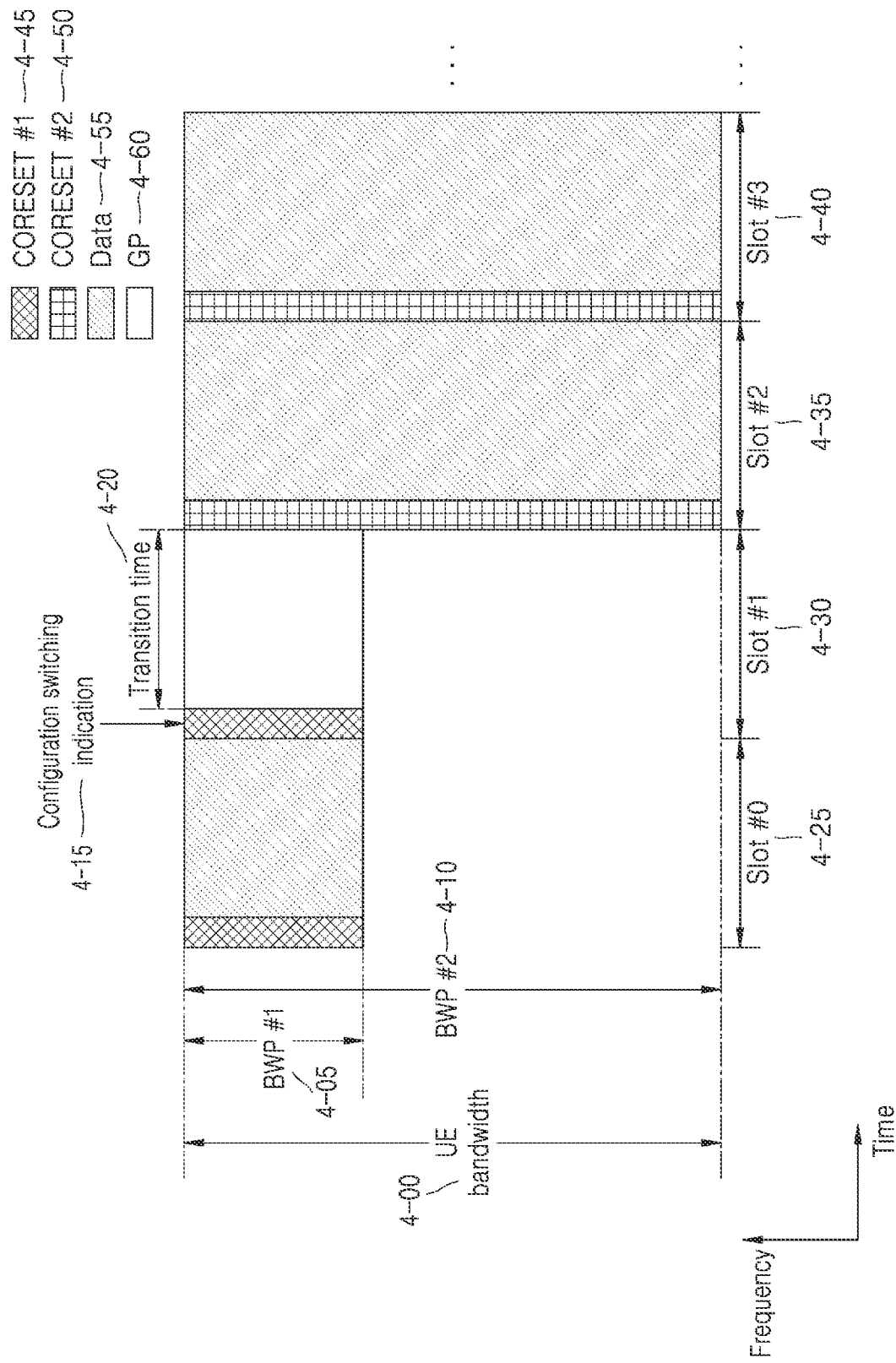
FIG. 4 is a diagram illustrating an example of indicating and switching a bandwidth part in a wireless communication according to an embodiment of the disclosure.

FIG. 4 is a diagram illustrating an example of indicating and switching a BWP in a wireless communication system, according to an embodiment of the disclosure.

FIG. 4 is a diagram illustrating a method of switching a dynamic configuration of a BWP. Referring to FIG. 4, as described with reference to Table 2, a base station may configure one or more BWPs to a terminal, and information about a bandwidth of a BWP, a frequency location of the BWP, and numerology of the BWP may be notified to the terminal via configuration for each BWP. In FIG. 4, an example is illustrated, in which two BWPs, that is, BPW #1 4-05 and BWP #2 4-10 are configured in a UE bandwidth part 4-00 for one terminal. Among the configured bandwidths, one or more BWPs may be activated, and in FIG. 4, an example in which one BWP is activated may be considered. In FIG. 4, the BWP #1 4-02 is activated among the configured BWPs in a slot #0 4-25, and the terminal may monitor a physical downlink control channel (PDCCH) in a core resource set #1 4-45 configured in the BWP #1 4-05 and transmit/receive data 4-55 in the BWP #1 4-05. A control resource set on which the terminal receives PDCCH may vary depending on which one of the configured BWPs is activated, and accordingly, a bandwidth in which the terminal monitors PDCCH may vary.

The base station may additionally transmit, to the terminal, an indicator for switching the configuration for BWP. Here, switching of the configuration for BWP may be considered to be the same as an operation of activating a specific BWP (for example, switching activation from a BWP A to a BWP B). The base station may transmit a configuration switching indicator to the terminal from a specific slot, and the terminal may determine a BWP to be activated by applying a configuration switched according to the configuration switching indicator from a specific time after receiving the configuration switching indicator from the base station and perform the monitoring on the PDCCH on a core resource set configured in the activated BWP.

In FIG. 4, the base station may transmit, to the terminal from a slot #1 4-30, a configuration switching indicator 4-15 indicating to switch the activated BWP from the existing BWP #1 4-05 to the BWP #2 4-10. After receiving the indicator, the terminal may activate the BWP #2 4-10 according to content of the indicator. Here, a transition time 4-20 for switching of BWP may be required, and accordingly, a time when the activated BWP is switched and applied may be determined. In FIG. 4, the transition time 4-20 of one slot is required after the configuration switching indicator 4-15 is received. Data transmission/reception may not be performed in the transition time 4-20 (4-60). Accordingly, the BWP #2 4-10 may be activated in a slot #2 4-35, and thus an operation of transmitting/receiving a control channel and data may be performed in the corresponding BWP #2.

The base station may pre-configure one or more BWPs for the terminal via higher layer signaling (for example, RRC signaling) and the configuration switching indicator 4-15 may indicate activation in a method of mapping with one of BWP configurations pre-configured by the base station. For example, an indicator of $\log_2 N$ bits may select and indicate one of N pre-configured BWPs. Table 3 below is an example of indicating configuration information for a BWP by using a 2-bit indicator.

TABLE 3

| indicator value | bandwidth part configuration |
| --- | --- |
| 00 | bandwidth part configuration A configured by higher layer signaling |
| 01 | bandwidth part configuration B configured by higher layer signaling |
| 10 | bandwidth part configuration C configured by higher layer signaling |
| 11 | bandwidth part configuration D configured by higher layer signaling |

The configuration switching indicator 4-15 for the BWP described above may be transmitted from the base station to the terminal via MAC CE signaling or L1 signaling (for example, common DCI, group-common DCI, or terminal-specific DCI). From which time point the BWP activation is to be applied according to the configuration switching indicator 4-15 for the BWP described above with reference to FIG. 4 depends on the following. From which time point a configuration switch is to be applied depends on a pre-defined value (for example, after receiving a configuration switching indicator, it may be applied from after the N (≥1) slot), or may be configured by the base station to the terminal via higher layer signaling (for example, RRC signaling) or may be partially included in the content of the configuration switching indicator 4-15 and transmitted. Alternatively, the time point may be determined in a combination of the above methods. After receiving the configuration switching indicator 4-15 for the BWP, the terminal may apply the switched configuration from a time point when the switched configuration is obtained via the above method.

A downlink control channel in the 5G communication system will now be described in detail with reference to related drawings.

Figure 5:
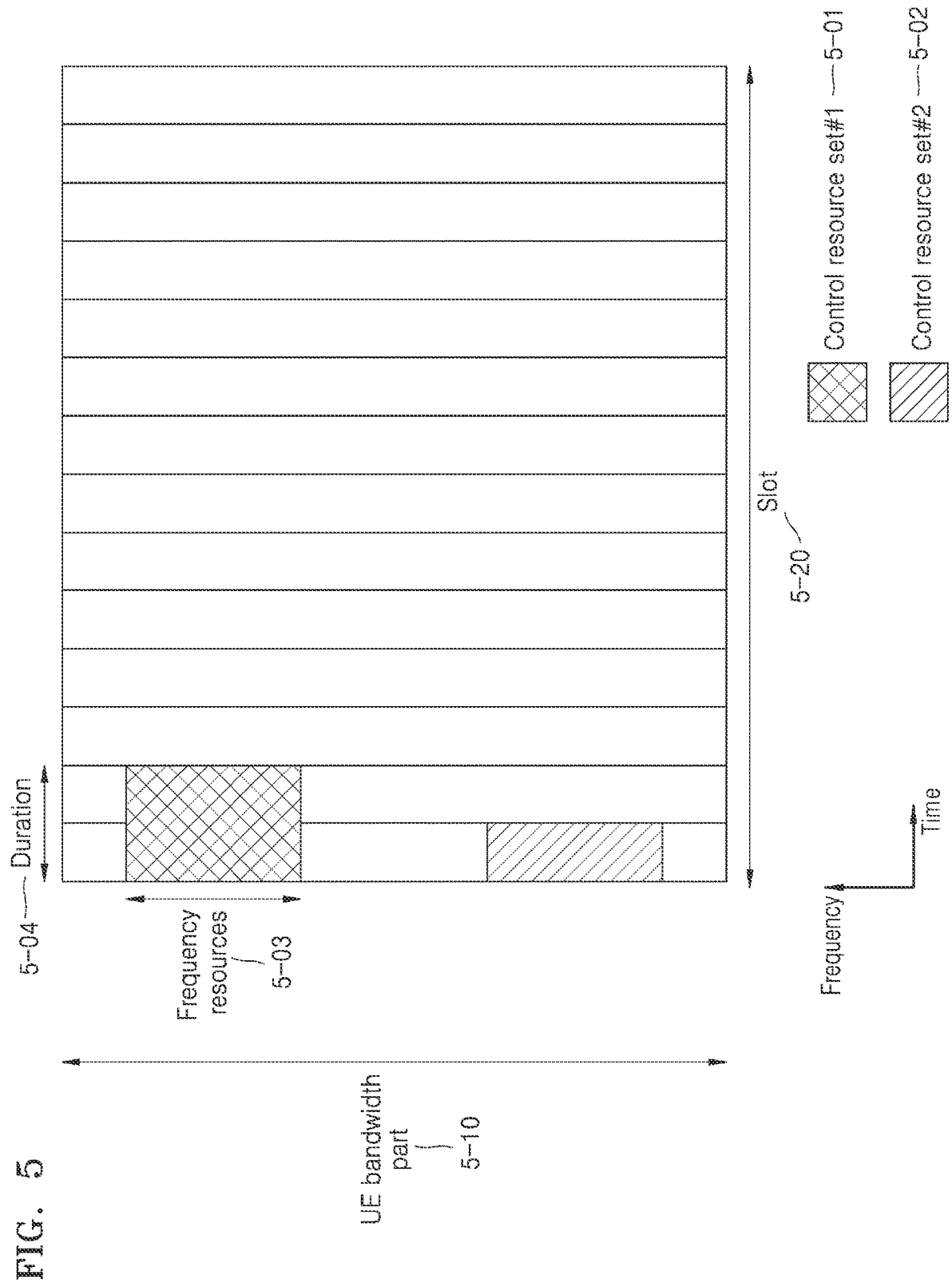
FIG. 5 is a diagram illustrating an example of configuring a control resource set for a downlink control channel in a wireless communication system according to an embodiment of the disclosure.

FIG. 5 is a diagram illustrating an example of configuring a control resource set for a downlink control channel in a wireless communication system according to an embodiment of the disclosure.

FIG. 5 is a diagram illustrating an example of a control resource set (CORESET) in which a downlink control channel is transmitted in a wireless communication system. Referring to FIG. 5, illustrated is an example in which two CORESETs, CORESET #1 5-10 and CORESET #2 5-20, are configured in a BWP 5-01 of the terminal on a frequency domain and a slot 5-02 on a time domain. The CORESETs 5-01 and 5-02 may be configured on a particular frequency resource 5-03 in the entire UE BWP 5-10 on the frequency domain. The CORESETs 5-01 and 5-02 may be configured with one or more OFDM symbols on the time domain, and may be defined by a CORESET duration 5-04. In the example of FIG. 5, the CORESET #1 5-01 is configured to have a CORESET duration of two symbols, and the CORESET #2 5-02 is configured to have a CORESET duration of one symbol.

The base station may configure the CORESET of the 5G for the terminal through higher layer signaling (e.g., system information, master information block (MIB), or radio resource control (RRC) signaling). Configuring the terminal with the CORESET refers to providing the terminal with information such as a CORESET identity, a frequency location of the CORESET, a length of symbols of the CORESET, etc. Specifically, configuration information of Table 4 may be included.

TABLE 4

| | |
|---|---|
| ControlResourceset ::= | SEQUENCE { |
| -- Corresponds to L1 parameter 'CORESET-ID' | |
| controlResourceSetId | ControlResourceSetId, |
| ($identifier^{ControlResourceSet}$ (Identity)) | |
| frequencyDomainResources | BIT STRING (SIZE (45)), |
| ($allocation\ information^{frequency\ domain\ resource}$) | |
| duration | INTEGER (1..maxCoReSetDuration), |
| ($information^{time\ domian\ resource\ allocation}$) | |
| cce-REG-MappingType | CHOICE { |
| (CCE-to-REG $^{mapping\ method}$) | |
|   interleaved | SEQUENCE { |
|     reg-BundleSize | ENUMERATED (n2, n3, n6), |
|     (REG $_{bundle\ size}$) | |
|     precoderGranularity | ENUMERATED (sameAsREG- |
| bundle, allContiguousRBs), | |
|     interleaverSize | ENUMERATED (n2, n3, n6) |
|     shiftIndex | |
|     INTEGER (0..maxNrofPhysicalResourceBlocks-1) | |
|     ($interleaver\ shift$(Shift)) | |
|   }, | |
|   nonInterleaved | NULL |
| }, | |
| tci-StatesPDCCH | SEQUENCE(SIZE (1..maxNrofTCI- |
|   StatesPDCCH)) OF TCI-StateId | OPTIONAL, |
| ($QCL_{information}^{configuration}$) | |
| tci-PresentInDCI | ENUMERATED {enabled} |
| } | |

In Table 4, tci-StatesPDCCH (simply called a TCI state) configuration information may include information about one or more synchronization signal (SS)/physical broadcast channel (PBCH) block indexes having a quasi co-located (QCL) association with a demodulation reference signal (DMRS) transmitted in the corresponding CORESET or channel state information reference signal (CSI-RS) indexes.

In a wireless communication system, one or more different antenna ports from each other (which are replaceable by one or more channels, signals, or a combination thereof, and will be collectively referred to as different antenna ports from each other in the disclosure, for convenience of description below) may be associated with each other by a QCL configuration as below.

| | |
|---|---|
| QCL-Info ::= | SEQUENCE { (serving cell index via which QCL reference RS is |
|   cell | ServCellIndex transmitted) |
|   bwp-Id | BWP-Id (bandwidth part index via which QCL reference RS is transmitted) |

```
indicator indicating      CHOICE { (CSI-RS or one of SS/PBCH blocks as QCL reference RS
referenceSignal)
    csi-rs                NZP-CSI-RS-ResourceId,
    ssb                   SSB-Index
},
qcl-Type                  ENUMERATED (typeA, typeB, typeC, typeD), (QCL type indicator)
...
}
```

In detail, in a QCL configuration, two different antenna ports may be associated with each other by an association between a (QCL) target antenna port and a (QCL) reference antenna port, and when receiving a target antenna port, a terminal may apply (or assume) all or some of statistical characteristics of a channel measured from the reference antenna port (for example, large scale parameters of a channel, such as Doppler shift, Doppler spread, average delay, delay spread, average gain, spatial Rx (or Tx) parameters or a reception spatial filter coefficient or a transmission spatial filter coefficient of the terminal). The target antenna port refers to an antenna port for transmitting a channel or a signal configured by higher layer configuration including the QCL configuration or an antenna port for transmitting a channel or a signal, to which a TCI state indicating the QCL configuration is applied. The reference antenna port refers to an antenna port for transmitting a channel or a signal indicated (specified) by a referenceSignal parameter in the QCL configuration.

In detail, statistical characteristics of a channel defined by the QCL configuration (indicated by a parameter qcl-Type in the QCL configuration) may be classified as below according to a QCL type.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The QCL type is not limited to the above four types, but all possible combinations are not listed here in order not to obscure the gist of the description.

The QCL-TypeA is a QCL type in which a bandwidth and a transmission interval of a target antenna port are both sufficient with respect to a reference antenna port (that is, the number of samples and transmission band/time of the target antenna port on a frequency-domain and a time domain are more than the number of samples and transmission band/time of a reference antenna port) and thus all statistical characteristics that are measurable from the frequency and time axes may be referred to.

QCL-Type B is a QCL type which is used when a bandwidth of a target antenna port is sufficient to measure statistical characteristics, which are measurable from a frequency domain, that is, Doppler shifts, Doppler spreads.

QCL-Type C is a QCL type which is used when a bandwidth and a transmission interval of a target antenna port are insufficient to measure second-order statistics, that is, Doppler spreads and delay spreads, and thus used when only first-order statistics, that is, Doppler shifts, average delays may be referred to.

QCL-Type D is a QCL type which is configured when spatial reception filter values used when receiving a reference antenna port are usable when receiving a target antenna port.

A base station may configure or indicate up to two QCL configurations in a single target antenna port through a TCI state configuration as below.

```
TCI-State ::= SEQUENCE {
    tci-StateId      TCI-StateId, (TCI indicator)
    qcl-Type1        QCL-Info, (first one with respect to target antenna port to which
QCL )
configuration        corresponding TCI state is applied
    qcl-Type2        QCL-Info (second one with respect to target antenna port to which
                     corresponding TCI
QCL )                state is applied
configuration            OPTIONAL, -- Need R
    ...
}
```

Among the two QCL configurations included in one TCI state configuration, a first QCL configuration may be configured to one of QCL-TypeA, QCL-TypeB, and QCL-TypeC. Here, a configurable QCL type may be specified by a type of a target antenna port and a reference antenna port, which will be described in detail below. Also, among the two QCL configurations included in the one TCI state configuration, a second QCL configuration may be configured to QCL-TypeD, and may be omitted according to circumstances. However, this is merely an embodiment of the disclosure, and the first QCL configuration and the second QCL configuration may be configured to one of QCL-type A to QCL-type D according to circumstances.

Tables 4-1 to 4-5 below show valid TCI state configurations according to a type of a target antenna port.

Table 4-1 shows a valid TCI state configuration when a target antenna port is a CSI-RS for tracking (TRS). The TRS refers to an NZP CSI-RS in which a repetition parameter is not configured but trs-Info is configured as true among a CSI-RS. Configuration No. 3 in Table 4-1 may be used for aperiodic TRS.

TABLE 4-1

A valid TCI state configuration when a target antenna port is a CSI-RS for tracking (TRS).

| Valid TCI state Configuration | DL RS 1 | qcl-Type1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 4-2 shows a valid TCI state configuration when a target antenna port is a CSI-RS for CSI. The CSI-RS refers to an NZP CSI-RS in which a repetition parameter is not configured but trs-Info is also not configured as true among a CSI-RS.

TABLE 4-2

A valid TCI state configuration when a target antenna port is a CSI-RS for CSI.

| valid TCI state Configuration | DL RS 1 | qcl-Type1 | DL RS 2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 4-3 shows a valid TCI state configuration when a target antenna port is a CSI-RS for beam management (BM, meaning the same as a CSI-RS for L1 RSRP reporting). The CSI-RS for BM refers to an NZP CSI-RS in which a repetition parameter is configured and which has a value of On or Off, and in which trs-info is not configured as true among a CSI-RS.

TABLE 4-3

A valid TCI state configuration when a target antenna port is a CSI-RS for BM (for L1 RSRP reporting).

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 4-4 shows a valid TCI state configuration when a target antenna port is a PDCCH DMRS.

TABLE 4-4

A valid TCI state configuration when a target antenna port is a PDCCH DMRS.

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 4-5 shows a valid TCI state configuration when a target antenna port is a PDSCH DMRS.

TABLE 4-5

A valid TCI state configuration when a target antenna port is a PDSCH DMRS.

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In the representative QCL configuration methods according to Tables 4-1 to 4-5, a target antenna port and a reference antenna port for each operation are configured to "SSB"→"TRS"→"CSI-RS for CSI, or CSI-RS for BM, or PDCCH DMRS, or PDSCH DMRS" and operated. Through this, it is possible to help a reception operation of a terminal by associating the statistical characteristics that may be measured from an SSB and a TRS with each antenna port.

Methods of allocating time and frequency resources for data transmission in NR are described below.

In NR, specific frequency-domain resource allocation (FD-RA) methods as below may be provided in addition to frequency-domain resource candidate allocation through BWP indication.

Figure 6:
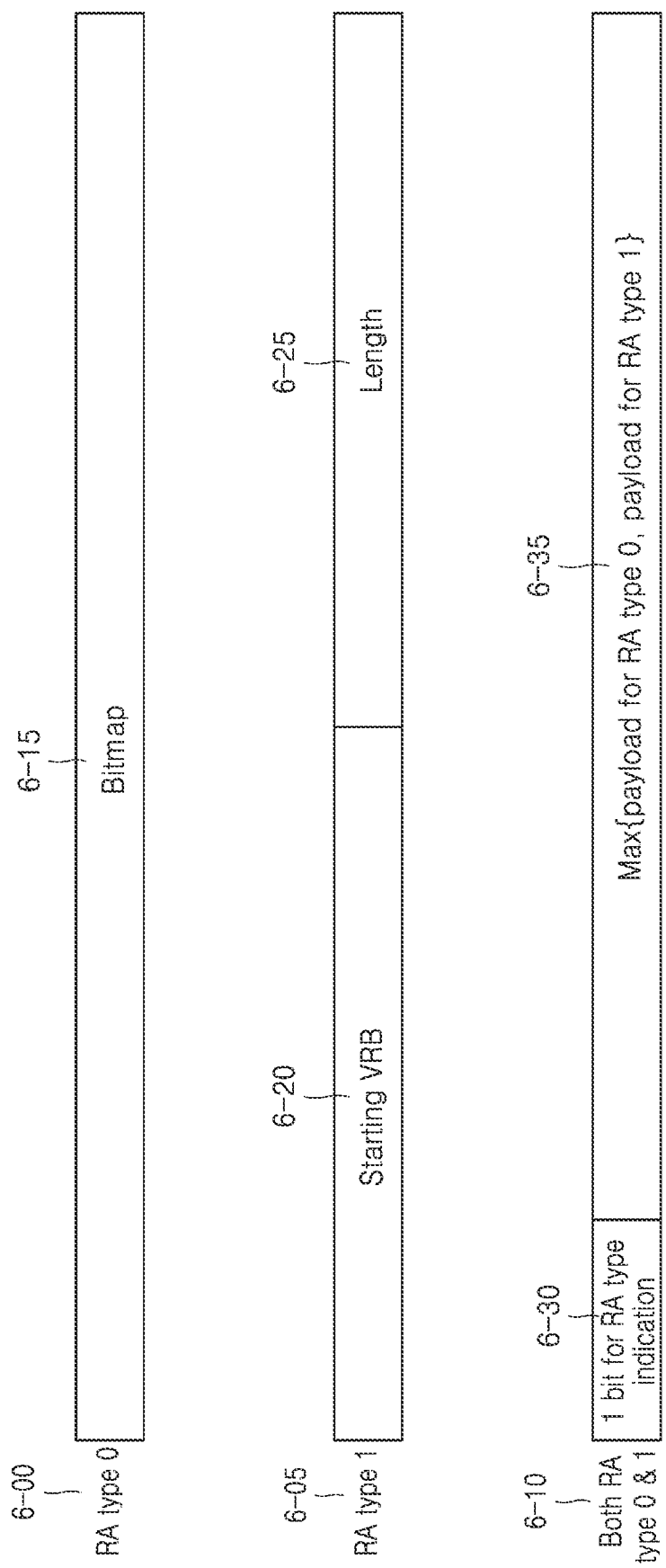
FIG. 6 is a diagram illustrating an example of PDSCH frequency-domain resource allocation in a wireless communication system according to an embodiment of the disclosure.

FIG. 6 is a diagram illustrating an example of PDSCH frequency-domain resource allocation in a wireless communication system according to an embodiment of the disclosure.

FIG. 6 is a diagram illustrating three frequency-domain resource allocation methods: type 0 (6-00), type 1 (6-05), and dynamic switch (dynamic switch) (6-10) configurable through a higher layer in NR.

Referring to FIG. 6, when a terminal is configured to use only resource type 0, through higher layer signaling (6-00), some downlink control information (DCI) for allocating PDSCH to the terminal has a bitmap consisting of NRBG bits. The conditions for the above will be described again later. Here, NRBG refers to the number of resource block groups (RBGs) determined as shown in Table 5 below according to a BWP size allocated by a BWP indicator and a higher layer parameter rbg-Size, and data is transmitted on RBG indicated as 1 by the bitmap.

TABLE 5

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the terminal is configured to use only resource type 1, through higher layer signaling (6-05), some DCI for allocating PDSCH to the terminal has frequency-domain resource allocation information consisting of $\lceil \log_2(N_{RB}^{DL,BWP}(N_{RB}^{DL,BWP}+1)/2)\rceil$ bits. The conditions for the above will be described again later. Through this, the base station may configure a starting VRB (6-20) and a length (6-25) of frequency domain resources continuously allocated therefrom.

When the terminal is configured to use both resource type 0 and resource type 1, through higher layer signaling (6-10), some DCI for allocating PDSCH to the terminal has frequency-domain resource allocation information consisting of bits among a greater value (6-35) among payloads for configuring resource type 0 (6-15) and payloads (6-20, 6-25) for configuring resource type 1. The conditions for the above will be described again later. Here, one bit may be added to the first part (MSB) of the frequency-domain resource allocation information in DCI, and when the bit is 0, it may be indicated that resource type 0 is used, and when the bit is 1, it may be indicated that resource type 1 is used.

Figure 7:
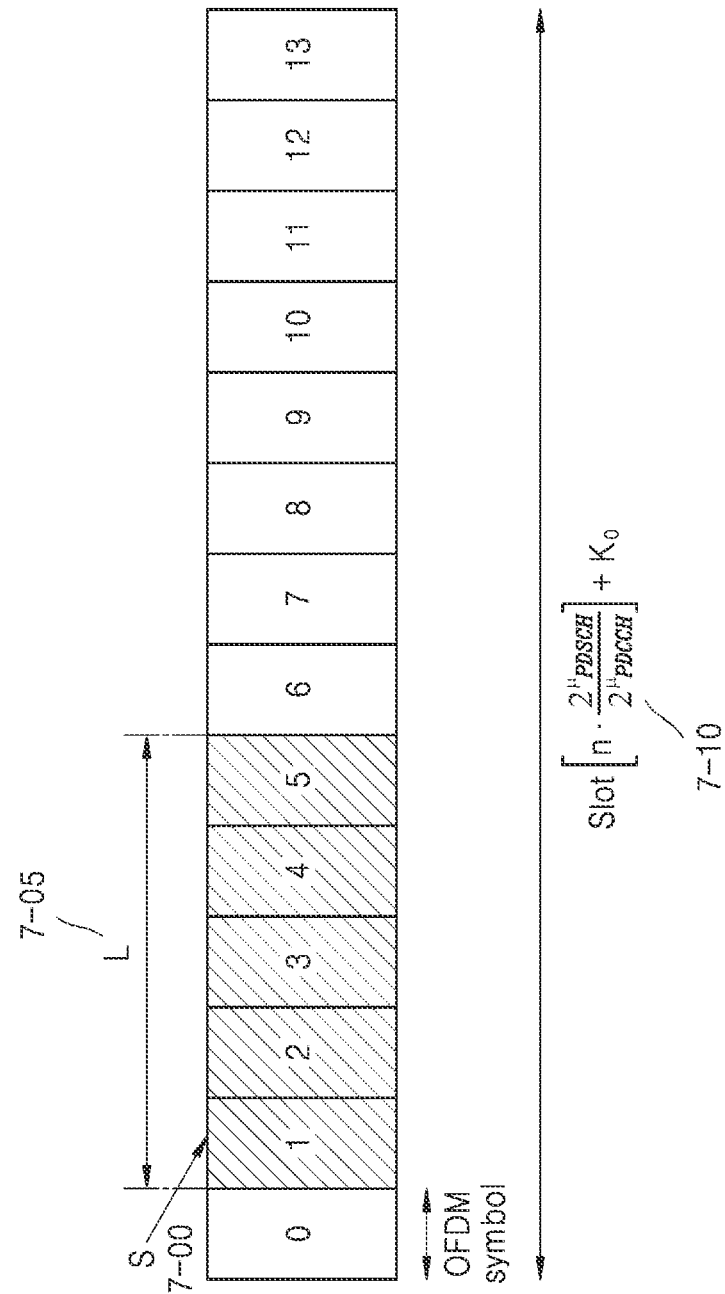
FIG. 7 is a diagram illustrating an example of physical downlink hared channel (PDSCH) time-domain resource allocation in a wireless communication system according to an embodiment of the disclosure.

FIG. 7 is a diagram illustrating an example of physical downlink hared channel (PDSCH) time-domain resource allocation in a wireless communication system according to an embodiment of the disclosure.

FIG. 7 is a diagram illustrating an example of time-domain resource allocation in NR. Referring to FIG. 7, the base station may indicate a time domain location of PDSCH resources, according to subcarrier spacing (SCS) ($\mu_{PDSCH}$, $\mu_{PDCCH}$) of a data channel and a control channel configured by using a higher layer, a scheduling offset $K_0$ value, and an OFDM symbol start position 7-00 and a length 7-05 in one slot dynamically indicated through DCI.

Figure 8:
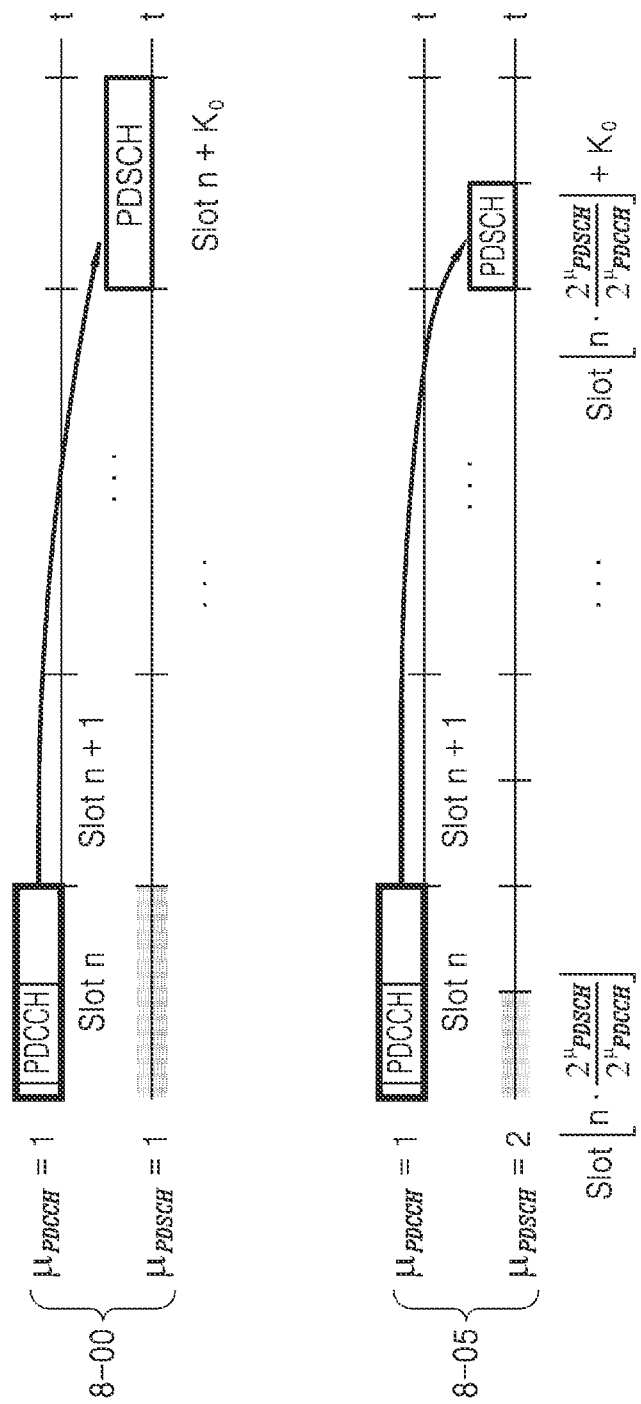
FIG. 8 is a diagram illustrating an example of time-domain resource allocation according to subcarrier spacings of a data channel and a control channel in a wireless communication system according to an embodiment of the disclosure.

FIG. 8 is a diagram illustrating an example of time-domain resource allocation according to subcarrier spacings of a data channel and a control channel in a wireless communication system according to an embodiment of the disclosure.

Referring to FIG. 8, when the subcarrier spacings of the data channel and the control channel are the same (8-00, $\mu_{PDCCH}=\mu_{PDCCH}$), the slot numbers for data and control are the same, and thus, scheduling offset occurs in the base station and the terminal in accordance with a predefined slot offset $K_0$. On the other hand, when the subcarrier spacings of the data channel and the control channel are different (8-05, $\mu_{PDSCH}\neq\mu_{PDCCH}$), the slot numbers for data and control are different, and thus, scheduling offset occurs in the base station and the terminal in accordance with the predefined slot offset $K_0$ based on a subcarrier spacing of a PDCCH.

In NR, for efficient control channel reception by a terminal, according to purpose, various forms of DCI formats are available as shown in Table 6 below.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

For example, the base station may use DCI format 0_0 or DCI format 0_1 to schedule a PDSH to one cell.

When DCI format 0_1 is transmitted together with CRC scrambled by cell radio network temporary identifier (C-RNTI), configured scheduling RNTI (CS-RNTI), or new-RNTI, DCI format 0_1 includes at least following information:

Identifier for DCI formats (1 bits): 1 is always configured for a DCI format indicator.

frequency domain resource assignment ($N_{RBG}$ bits or $\lceil \log_2(N_{RB}^{DL,BWP}(N_{RB}^{DL,BWP}+1)/2)\rceil$ bits): indicates frequency-domain resource allocation, and when DCI format 1_0 is monitored in UE specific search space, $N_{RB}^{DL,BWP}$ is a size of active DL BWP, and otherwise $N_{RB}^{DL,BWP}$ is a size of an initial DL BWP. $N_{RBG}$ refers to a number of a resource block groups. For a detailed method, refer to the frequency-domain resource allocation above.

time-domain resource assignment (0 to 4 bits): indicates time-domain resource allocation according to the above description.

VRB-to-PRB mapping (1 bit): When 0, non-interleaved is indicated, and when 1, interleaved VRP-to-PRB mapping is indicated.

Modulation and coding scheme (5 bits): indicates a modulation order and coding rate used in PDSCH transmission.

New data indicator (1 bit): indicates initial transmission or retransmission of PDSCH depending on toggle.

Redundancy version (2 bits): indicates redundancy version used in PDSCH transmission.

HARQ process number (4 bits): indicates HARQ process number used in PDSCH transmission.

Downlink assignment index (2 bits): DAI indicator

TPC command for scheduled PUCCH (2 bits): PUCCH power control indicator

PUCCH resource indicator (3 bits): is a PUCCH resource indicator and indicates one of 8 resources configured via a higher layer.

PDSCH-to-HARQ_feedback timing indicator (3 bits): is a HARQ feedback timing indicator and indicates one of 8 feedback timing offsets configured via a higher layer.

The DCI format 1_1 includes at least following pieces of information when transmitted together with a CRC scrambled according to a C-RNTI, CS-RNTI, or MCS-C-RNTI.

Identifier for DCI formats (1 bit): 1 is always configured for a DCI format indicator.

Carrier indicator (0 or 3 bits): indicates a CC (or cell) where PDSCH allocated by corresponding DCI is transmitted.

Bandwidth part indicator (0, 1, or 2 bits): indicates a BWP in which a PDSCH allocated by corresponding DCI is transmitted.

Frequency domain resource assignment (payload determined according to the frequency domain resource assignment): indicates frequency domain resource assignment, and $N_{RB}^{DL,BWP}$ is a size of an active DL BWP. For a detailed method, refer to the frequency-domain resource allocation above.

Time-domain resource assignment (0 to 4 bits): indicates time-domain resource allocation according to the above description.

VRB-to-PRB mapping (0 or 1 bit): When 0, non-interleaved is indicated, and when 1, interleaved VRP-to-PRB mapping is indicated. It is 0 bit when the frequency-domain resource allocation is configured to resource type 0.

PRB bundling size indicator (0 or 1 bit): It is 0 bit when a higher layer parameter prb-BundlingType is not configured or configured to 'static', and it is 1 bit when configured to 'dynamic'.

Rate matching indicator (0 or 1 or 2 bits): indicates a rate matching pattern.

ZP CSI-RS trigger (0 or 1 or 2 bits): an indicator triggering aperiodic ZP CSI-RS.

For transport block 1:

Modulation and coding scheme (5 bits): indicates a modulation order and coding rate used in PDSCH transmission.

New data indicator (1 bit): indicates initial transmission or retransmission of PDSCH depending on toggle.

Redundancy version (2 bits): indicates redundancy version used in PDSCH transmission.

For transport block 2:

Modulation and coding scheme (5 bits): indicates a modulation order and coding rate used in PDSCH transmission.

New data indicator (1 bit): indicates initial transmission or retransmission of PDSCH depending on toggle.

Redundancy version (2 bits): indicates redundancy version used in PDSCH transmission.

HARQ process number (4 bits): indicates HARQ process number used in PDSCH transmission.

Downlink assignment index (0 or 2 or 4 bits): DAI indicator

TPC command for scheduled PUCCH (2 bits): PUCCH power control indicator

PUCCH resource indicator (3 bits): is a PUCCH resource indicator and indicates one of 8 resources configured via a higher layer.

PDSCH-to-HARQ_feedback timing indicator (3 bits): is a HARQ feedback timing indicator and indicates one of 8 feedback timing offsets configured via a higher layer.

Antenna port (4, 5, or 6 bits): indicates a DMRS port and a CDM group without data.

Transmission configuration indication (0 or 3 bits): TCI indicator.

SRS request (2 or 3 bits): SRS transmission request indicator.

CBG transmission information (0, 2, 4, 6, or 8 bits): an indicator indicating whether code block groups in an allocated PDSCH are transmitted. 0 indicates that a corresponding CBG is not transmitted, and 1 indicates that the corresponding CBG is transmitted.

CBG flushing out information (0 or 1 bit): An indicator indicating contamination of previous CBGs, and 0 indicates possibility of contamination, and 1 indicates usable when receiving retransmission (combinable).

DMRS sequence initialization (0 or 1 bit): DMRS scrambling ID selection indicator.

The number of different sizes of pieces of DCI receivable by the terminal per slot in a corresponding cell is up to 4. The number of different sizes of pieces of DCI scrambled via C-RNTI receivable by the terminal per slot in a corresponding cell is up to 3.

Here, an antenna port indication may be indicated through Tables 7 to 10 below.

TABLE 7

Antenna port(s) (1000 + DMRS port), dmrs-Type = 1, maxLength = 1
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |

TABLE 7-continued

Antenna port(s) (1000 + DMRS port), dmrs-Type = 1, maxLength = 1
One Codeword:
Codeword 0 enabled,
Codeword 1 disabled

| Value | Number of DMRS CDM group(s) without data | DMRS port(s) |
|---|---|---|
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 8

| Antenna port(s) (1000 + DMRS port), dmrs-Type = 1, maxLength = 2 | | | | | | | |
|---|---|---|---|---|---|---|---|
| One Codeword: Codeword 0 enabled, Codeword 1 disabled | | | | Two Codewords: Codeword 0 enabled, Codeword 1 enabled | | | |
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0,1,2,3,4,6 | 2 |
| 2 | 1 | 0,1 | 1 | 2 | 2 | 0,1,2,3,4,5,6 | 2 |
| 3 | 2 | 0 | 1 | 3 | 2 | 0,1,2,3,4,5,6,7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0,1 | 1 | | | | |
| 8 | 2 | 2,3 | 1 | | | | |
| 9 | 2 | 0-2 | 1 | | | | |
| 10 | 2 | 0-3 | 1 | | | | |
| 11 | 2 | 0,2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0,1 | 2 | | | | |
| 21 | 2 | 2,3 | 2 | | | | |
| 22 | 2 | 4,5 | 2 | | | | |
| 23 | 2 | 6,7 | 2 | | | | |
| 24 | 2 | 0,4 | 2 | | | | |
| 25 | 2 | 2,6 | 2 | | | | |
| 26 | 2 | 0,1,4 | 2 | | | | |
| 27 | 2 | 2,3,6 | 2 | | | | |
| 28 | 2 | 0,1,4,5 | 2 | | | | |
| 29 | 2 | 2,3,6,7 | 2 | | | | |
| 30 | 2 | 0,2,4,6 | 2 | | | | |
| 31 | Reserved | Reserved | Reserved | | | | |

TABLE 9

Antenna port(s) (1000 + DMRS port), dmrs-Type = 2, maxLength = 1

| One codeword: Codeword 0 enabled, Codeword 1 disabled | | Two codewords: Codeword 0 enabled, Codeword 1 enabled | | |
|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

TABLE 10

Antenna port(s) (1000 + DMRS port), dmrs-Type = 2, maxLength = 2

| One codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0,1 | 1 | 2 | 2 | 0,1,2,3,6 | 2 |
| 3 | 2 | 0 | 1 | 3 | 2 | 0,1,2,3,6,8 | 2 |
| 4 | 2 | 1 | 1 | 4 | 2 | 0,1,2,3,6,7,8 | 2 |
| 5 | 2 | 2 | 1 | 5 | 2 | 0,1,2,3,6,7,8,9 | 2 |
| 6 | 2 | 3 | 1 | 6-63 | Reserved | Reserved | Reserved |
| 7 | 2 | 0,1 | 1 | | | | |
| 8 | 2 | 2,3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0,1 | 1 | | | | |
| 18 | 3 | 2,3 | 1 | | | | |
| 19 | 3 | 4,5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0,2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |

TABLE 10-continued

Antenna port(s) (1000 + DMRS port), dmrs-Type = 2, maxLength = 2

| | One codeword: Codeword 0 enabled, Codeword 1 disabled | | | Two Codewords: Codeword 0 enabled, Codeword 1 enabled | | |
|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 36 | 3 | 0,1 | 2 | | | | |
| 37 | 3 | 2,3 | 2 | | | | |
| 38 | 3 | 4,5 | 2 | | | | |
| 39 | 3 | 6,7 | 2 | | | | |
| 40 | 3 | 8,9 | 2 | | | | |
| 41 | 3 | 10,11 | 2 | | | | |
| 42 | 3 | 0,1,6 | 2 | | | | |
| 43 | 3 | 2,3,8 | 2 | | | | |
| 44 | 3 | 4,5,10 | 2 | | | | |
| 45 | 3 | 0,1,6,7 | 2 | | | | |
| 46 | 3 | 2,3,8,9 | 2 | | | | |
| 47 | 3 | 4,5,10,11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0,1 | 2 | | | | |
| 53 | 1 | 6,7 | 2 | | | | |
| 54 | 2 | 0,1 | 2 | | | | |
| 55 | 2 | 2,3 | 2 | | | | |
| 56 | 2 | 6,7 | 2 | | | | |
| 57 | 2 | 8,9 | 2 | | | | |
| 58-63 | Reserved | Reserved | Reserved | | | | |

Table 7 is a table used when dmrs-type is indicated as 1 and maxLength is indicated as 1. Table 8 is a table used when dmrs-type is indicated as 1 and maxLength is indicated as 2. When dmrs-type=2, maxLength=1, Table 9 is used to indicate a port of a DMRS being used, and when dmrs-type=2, maxLength=2, Table 10 is used to indicate a port of DMRS being used. In Tables 7 to 10, numbers 1, 2, and 3 indicated by the number of DMRS CDM group(s) without data refer to CDMR group {0}, {0, 1}, {0, 1, 2}, respectively. DMRS port(s) indicates indexes of ports being used, in an order. An antenna port indicates as DMRS port+1000. A CDM group of a DMRS is connected to a method of generating a DMRS sequence and an antenna port as shown in Tables 11 and 12. Table 11 shows parameters for using dmrs-type=1, and Table 12 shows parameters for using dmrs-type=2.

TABLE 11

Parameters for PDSCH DMRS dmrs-type = 1.

| | | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 12

Parameters for PDSCH DMRS dmrs-type = 2.

| | CDM group | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

A sequence of DMRS according to each parameter is determined by Equation 1 below.

$$d_{k,l}^{(p,\mu)} = \beta_{PDSCH}^{DMRS} w_f(k') w_t(l') r(2n + k') \quad \text{Equation 1}$$

$$k = \begin{cases} 2n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

When only one codeword is enabled in Table 7 and Table 8, rows 2, 9, 10, 11, and 30 are used only for single-user MIMO. That is, in this case, the terminal does not assume that other terminals are co-scheduled, and may not perform multi-user MIMO reception operations such as cancellation, nulling, or whitening of multi-user interference.

In Table 9 and Table 10, when only one codeword is enabled, rows 2, 10, and 23 are used only for single-user MIMO. That is, in this case, the terminal does not assume that other terminals are co-scheduled, and may not perform multi-user MIMO reception operations such as cancellation, nulling, or whitening of multi-user interference.

FIG. 9 is a diagram illustrating a configuration example of a cooperative communication antenna port according to an embodiment of the disclosure.

Referring to FIG. 9, an example of radio resource allocation for each TRP according to a joint transmission (JT) technique and situations is shown.

9-00 in FIG. 9 is a diagram illustrating coherent joint transmission (C-JT) supporting coherent precoding between each cell, TRP and/or beam.

In C-JT, transmission reception point (TRP) A 9-05 and TRP B 9-10 transmit the same data (PDSCH) and perform joint precoding in multiple TRPs. This may mean that TRP A 9-05 and TRP B 9-10 transmit the same DMRS ports (e.g., DMRS ports A and B in both TRPs) for transmission of the same PDSCH. In this case, the terminal may receive one piece of DCI information for receiving one PDSCH demodulated based on DMRS transmitted through DMRS ports A and B.

9-20 in FIG. 9 is a diagram illustrating non-coherent joint transmission (NC-JT) supporting non-coherent precoding between each cell, TRP and/or beam. In the case of NC-JT, different PDSCHs are transmitted from each cell, TRP, and/or beam, and individual precoding may be applied to each PDSCH. This may mean that TRP A 9-25 and TRP B 9-30 transmit different DMRS ports for transmission of different PDSCHs (e.g., DMRS port A from TRP A, DMRS port B from TRP B). In this case, the terminal may receive two types of DCI information for receiving PDSCH A demodulated based on DMRS transmitted through DMRS port A and PDSCH B demodulated based on DMRS transmitted through another DMRS port B.

In order to support NC-JT, which simultaneously provides data from two or more transmission points to one terminal, PDSCHs transmitted from two (or more) different transmission points need to be allocated through a single PDCCH, or PDSCHs transmitted from two or more different transmission points need to be allocated through multiple PDCCHs. The terminal may acquire a quasi co-location (QCL) association relationship between each reference signal or channel based on L1/L2/L3 signaling, and may efficiently estimate, based on the relationship, large scale parameters of each reference signal or channel. When a transmission point of a certain reference signal or channel is different, the large scale parameters are difficult to be shared with each other. Thus, when performing joint transmission, the base station needs to inform the terminal of quasi co-location information simultaneously about two or more transmission points through two or more TCI states. When non-coherent joint transmission is supported through multiple PDCCHs, that is, when two or more PDCCHs allocate two or more PDSCHs to the same serving cell and the same bandwidth part at the same time, the two or more TCI states may be allocated to each PDSCH or each of DMRS port through each PDCCH, respectively. On the other hand, when non-coherent joint transmission is supported through a single PDCCH, that is, when one PDCCH allocates two or more PDSCHs to the same serving cell and the same bandwidth part at the same time, the two or more TCI states are to be allocated to each PDSCH or each of DMRS port through the one PDCCH.

When it is assumed that DMRS ports allocated to the terminal at a specific time are divided into DMRS port group A transmitted from a transmission point A and DMRS port group B transmitted from a transmission point B, the two or more TCI states may be respectively connected to the DMRS port groups and enable channel estimation based on different QCL assumptions for each group. On the other hand, different DMRS ports may be code division multiplex-ed (CDM), frequency division multiplex-ed (FDM), or time domain multiplex-ed (TDM) in order to increase channel measurement accuracy and reduce transmission burden at the same time. Among them, when CDM-ed DMRS ports are collectively referred to as a CDM group, code-based multiplexing works well when the channel characteristics of each port are similar to the DMRS ports in the CDM group (that is, when the channel characteristics of each port are similar, the ports are easily distinguished according to orthogonal cover code (OCC)), it may be important to ensure that DMRS ports existing in the same CDM group do not have different TCI states from each other. The disclosure provides a method of indicating, to a terminal, a DMRS port and CDM group without data, to satisfy the above characteristics.

Meanwhile, in the disclosure, for convenience of description, a process of transmitting control information through a PDCCH may be expressed as transmitting the PDCCH, and a process of transmitting data through a PDSCH may be expressed as transmitting the PDSCH.

For convenience of descriptions, Table 7 to Table 12 are referred to as "first antenna port indication (or, antenna port indication according to the related art)", and Tables in which all or some of code points of Table 7 to Table 12 are corrected are referred to as a "second antenna port indication (new antenna port indication)". In addition, allocation of DRMS ports and CDM group without data is called DMRS allocation.

The terminal may determine the number of antenna ports used for PDSCH transmission, based on table indicating the DMRS port. In the case of DCI format 1_1, a Rel-15-based antenna port indication method may be based on an index having a length of 4 bits to 6 bits indicated in an antenna port field in DCI, and accordingly, an antenna port may be determined. The terminal may check information about the number and index of DMRS ports for the PDSCH, the number of front-load symbols, and the number of CDM groups based on an indicator (index) transmitted by the base station. In addition, a change in a dynamic beamforming direction may be determined based on information of a transmission configuration indication (TCI) field in DCI 1_1. When tci-PresentDCI is configured to 'enabled' in a higher layer, the terminal checks a TCI field of 3 bits information, and determine TCI states activated in a DL BWP or scheduled component carrier and a direction of a beam associated with a DL-RS. Conversely, when tci-PresentDCI is disabled, it may be considered that there is no change in the direction of the beam in beamforming.

In various embodiments of the disclosure, a scenario of allocating PDSCHs transmitted from two (or more) different transmission points through a single PDCCH is considered. A Rel-15 terminal receives a PDSCH stream including a single or multiple QCLed layers based on TCI information and antenna port information in a single PDCCH. On the other hand, a rel-16 terminal may receive data transmitted from multi-TRP or a plurality of base stations in C-JT/NC-JT format. In order to support the C-JT/NC-JT, the rel-16 terminal needs a basic higher layer configuration. In detail, for higher layer configuration, the terminal may receive C-JT/NC-JT related parameters or setting values, and a process of configuring each of the same is required.

First Embodiment

The disclosure proposes a separate DMRS port table for the purpose of transmitting and receiving C-JT/NC-JT transmission signaling to a base station and a terminal supporting C-JT/NC-JT. The proposed DMRS port table may be divided into a DMRS port table indicated by an antenna port field indicated based on DCI format 1_1 and into another, separate table. As a method of distinguishing from a DMRS port table proposed in rel-15, the base station and the terminal may configure in advance information about whether to support NC-JT transmission in a RRC configuration. That is, a field such as C-JT/NC-JT transmission=enabled/disabled may be configured through RRC configuration, and whether C-JT/NC-JT is supported may be checked based on the field.

When C-JT/NC-JT transmission=enabled is configured through a higher layer, a field to be used by the terminal may be indicated by using an existing antenna port field within DCI format 1_1. Alternatively, by using a separate field except for the antenna port field in DCI format 1_1, at least one piece of information among the specific DMRS port number, the number of DMRS CDM group(s) excluding data, the (maximum) number of front-loaded symbols, and DMRS-type information may be indicated with respect to NC-JT transmission.

Table 12-1 to Table 12-4 suggest DMRS ports such that DMRS ports transmitted from the same TRP are transmitted to the same CDM group, based on the CDM group described in Table 11. In Table 12-1 to Table 12-4, the left and right sides of the semicolon (;) are indicated to be divided into different TRP transmissions and different CDM group mappings, but may be omitted depending on the embodiment. Also, the order of values included in the table may be changed based on the semicolon (;). In addition, regarding the DMRS ports described in the table show a case in which up to two DMRS ports are supported for each of a first TRP and a second TRP. In addition, concepts such as basic DMRS port, type, and the number of frontloaded symbols described in Table 7 to Table 10 may be equally applied.

As shown in Table 12-1, the DMRS port table for C-JT/NC-JT may support other types of ports by distinguishing the same from ports that were not supported in rel-15.

For example, when the base station indicates entry (or may be expressed as a value) 0 to the terminal, the terminal may determine that the first TRP and the second TRP transmit a DMRS through DMRS port 0 and DMRS port 2. In addition, the terminal identifying that the number of each port is one may determine that single layer transmission is performed from the first TRP and the second TRP.

When the base station indicates entry 1 to the terminal, the terminal may determine that the first TRP and the second TRP transmit a DMRS through DMRS port 1 and DMRS port 3. In addition, the terminal identifying that the number of each port is one may determine that single layer transmission is performed from the first TRP and the second TRP. Although the port number of entry 1 is different from that of entry 0, entry 1 is functionally similar to entry 0 and may be regarded as overlapping with entry 0 and thus omitted from the table.

When the base station indicates entry 2 to the terminal, the terminal may determine that the first TRP transmits a DMRS through DMRS ports 0 and 1 and that the second TRP transmits a DMRS through DMRS port 2. In addition, the terminal identifying that the number of each ports are two and one, respectively, may determine that 2 layer transmission is performed by the first TRP and 1 layer transmission is performed by the second TRP.

When the base station indicates entry 3 to the terminal, the terminal may determine that the first TRP transmits a DMRS through DMRS port 0, and the remaining one second TRP transmits a DMRS through DMRS ports 2 and 3. In addition, the terminal identifying that the number of each port is one and two may determine that single layer transmission is performed by the first TRP and 2 layers transmission is performed by the remaining second TRP.

The operations of the base station and the terminal for entries 4 and 5 may be easily understood from entries 2 and 3 above. Although entry 4 and entry 5 have different port numbers from entry 2 and entry 3, they are functionally similar, and thus may be omitted from the table.

When the base station indicates entry 6 to the terminal, the terminal may determine that the first TRP transmits a DMRS through DMRS ports 0 and 1 and that the second TRP transmits a DMRS through DMRS ports 2 and 3. In addition, the terminal identifying that the number of each port is two may determine that 2 layer transmission is performed by the first TRP and 2 layer transmission is performed by the remaining second TRP.

Table 12-1 lists embodiments in an entry format among various cases in which the base station and the terminal communicate with each other, and all or some of the seven entries may be applied in an actual system. In addition, another table composed of at least one entry among the entries included in the table 12-1 may be used. In addition, Table 12-1 describes a case in which the base station transmits one codeword to the terminal, and Table 12-1 may also be similarly applied to a case where two or more codewords are transmitted.

Table 12-2 describes a case that differs, as maxLength=2, from the same DMRS type 1 described in Table 12-1. Referring to Table 7 to Table 8, the DMRS port configuration for C-JT/NC-JT may be mapped to DMRS ports 0 to 3 in the same form as maxLength=1.

Table 12-3 is a DMRS port table for C-JT/NC-JT transmission of DMRS type 2, which is different from DMRS type 1 described in Table 12-1. Table 12-3 supports up to 12 DMRS ports, which is a structure suitable for MU-MIMO type.

For example, when the base station indicates entry 1 to the terminal, the terminal may determine that the first TRP and the second TRP transmit a DMRS through DMRS port 0 and DMRS port 2, respectively. In addition, the terminal identifying that the number of each port is one may determine that single layer transmission is performed from each of the first TRP and the second TRP. Entries in Table 12-3 show at once a case where the number of DMRS CDM groups is 2 and 3, and an indication of 2 and 3 in separate entries is not excluded here. The above embodiments are listed in an entry format, and some or all of 14 entries may be applied in an actual system. For example, a table may be determined by including some of the entries including only 0, 2, 3, 6, 7, 9, 10, and 13. In addition, the order of the entries in the above embodiment is only an embodiment and does not limit the disclosure. In addition, the above table describes a case in which the base station transmits one codeword to the terminal, and the table may be similarly applied to a case where two or more codewords are transmitted.

Table 12-4 describes a case that differs, as maxLength=2, from the same DMRS type 2 described in Table 12-3. Referring to Table 7 to Table 8, in the DMRS port configuration for C-JT/NC-JT, a total of 2 to 4 DMRS ports are allocated, and at least one DMRS port is allocated for each CDM group. According to the number of front-loaded symbols, when the number of front-loaded symbols is one, DMRS ports are allocated from among DMRS ports 0 to 3 (the same as Table 12-3 and thus omitted), and when the number of front-loaded symbols is two, DMRS ports are allocated from among DMRS ports 0 to 7. When a total of two DMRS ports are used, frequency domain orthogonal cover codes (OCC) of each CDM group must be the same.

Meanwhile, time domain OCCs of each CDM group may be the same or different. For example, DMRS ports 0 and 2 using the same time domain OCC may be used simultaneously in each of the CDM groups {0,1}, and DMRS ports 0 and 6 using different time domain OCCs may also be used simultaneously. When a total of three or more DMRS ports are used, the time domain OCC applied to each of the CDM groups {0,1} may be the same or different. The above embodiments are listed in an entry format, and some or all of 28 entries may be applied in an actual system.

For example, a table may be determined by including some of the entries including only entries of 0, 2, 3, 6, 7, 9, 10, 13 or 0, 2, 3, 6, 7, 9, 10, 13, 14, 16, 17, 20, 23, 24, and 27. In addition, the order of the entries in the above embodiment is only an embodiment and does not limit the disclosure. In addition, the above table describes a case in which the base station transmits one codeword to the terminal, and the table may be similarly applied to a case where two or more codewords are transmitted.

TABLE 12-1

DMRS indication table for antenna port(s) (1000 + DMRS port), dmrs-Type = 1, maxLength = 1
One Codeword (dmrs-Type = 1, maxLength = 1)

| Entries | Number of DMRS CDM group(s) without data | DMRS port(s) | Number of front-load symbols |
|---|---|---|---|
| 0 | 2 | 0; 2 | 1 |
| 1 | 2 | 1; 3 | 1 |
| 2 | 2 | 0, 1; 2 | 1 |
| 3 | 2 | 0; 2, 3 | 1 |
| 4 | 2 | 1; 2, 3 | 1 |
| 5 | 2 | 0, 1; 3 | 1 |
| 6 | 2 | 0, 1; 2, 3 | 1 |

TABLE 12-2

DMRS indication table for antenna port(s) (1000 + DMRS port), dmrs-Type = 1, maxLength = 2
One Codeword (dmrs-Type = 1, maxLength = 2)

| Entries | Number of DMRS CDM group(s) without data | DMRS port(s) | Number of front-load symbols |
|---|---|---|---|
| 0 | 2 | 0; 2 | 2 |
| 1 | 2 | 1; 3 | 2 |
| 2 | 2 | 0, 1; 2 | 2 |
| 3 | 2 | 0; 2, 3 | 2 |
| 4 | 2 | 1; 2, 3 | 2 |
| 5 | 2 | 0, 1; 3 | 2 |
| 6 | 2 | 0, 1; 2, 3 | 2 |

TABLE 12-3

DMRS indication table for antenna port(s) (1000 + DMRS port), dmrs-Type = 2, maxLength = 1
One Codeword (dmrs-Type = 2, maxLength = 1)

| Entries | Number of DMRS CDM group(s) without data | DMRS port(s) | Number of front-load symbols |
|---|---|---|---|
| 0 | 2 | 0; 2 | 1 |
| 1 | 2 | 1; 3 | 1 |
| 2 | 2 | 0, 1; 2 | 1 |
| 3 | 2 | 0; 2, 3 | 1 |
| 4 | 2 | 1; 2, 3 | 1 |
| 5 | 2 | 0, 1; 3 | 1 |
| 6 | 2 | 0, 1; 2, 3 | 1 |
| 7 | 3 | 0; 2 | 1 |
| 8 | 3 | 1; 3 | 1 |
| 9 | 3 | 0, 1; 2 | 1 |
| 10 | 3 | 0; 2, 3 | 1 |
| 11 | 3 | 1; 2, 3 | 1 |
| 12 | 3 | 0, 1; 3 | 1 |
| 13 | 3 | 0, 1; 2, 3 | 1 |

TABLE 12-4

DMRS indication table for antenna port(s) (1000 + DMRS port), dmrs-Type = 2, maxLength = 2
One Codeword (dmrs-Type = 2, maxLength = 2)

| Entries | Number of DMRS CDM group(s) without data | DMRS port(s) | Number of front-load symbols |
|---|---|---|---|
| 0 | 2 | 0; 2 | 2 |
| 1 | 2 | 1; 3 | 2 |
| 2 | 2 | 0, 1; 2 | 2 |
| 3 | 2 | 0; 2, 3 | 2 |
| 4 | 2 | 1; 2, 3 | 2 |
| 5 | 2 | 0, 1; 3 | 2 |
| 6 | 2 | 0, 1; 2, 3 | 2 |
| 7 | 3 | 0; 2 | 2 |
| 8 | 3 | 1; 3 | 2 |
| 9 | 3 | 0, 1; 2 | 2 |
| 10 | 3 | 0; 2, 3 | 2 |
| 11 | 3 | 1; 2, 3 | 2 |
| 12 | 3 | 0, 1; 3 | 2 |
| 13 | 3 | 0, 1; 2, 3 | 2 |
| 14 | 2 | 6; 8 | 2 |
| 15 | 2 | 7; 9 | 2 |
| 16 | 2 | 6, 7; 8 | 2 |
| 17 | 2 | 6, 8; 9 | 2 |
| 18 | 2 | 7; 8, 9 | 2 |
| 19 | 2 | 6; 7, 9 | 2 |
| 20 | 2 | 6, 7; 8, 9 | 2 |
| 21 | 3 | 6; 8 | 2 |
| 22 | 3 | 7; 9 | 2 |
| 23 | 3 | 6, 7; 8 | 2 |
| 24 | 3 | 6, 8; 9 | 2 |
| 25 | 3 | 7; 8, 9 | 2 |
| 26 | 3 | 6; 7, 9 | 2 |
| 27 | 3 | 6, 7; 8, 9 | 2 |

Second Embodiment

In Table 13-1, as a method, by a base station, of indicating a DMRS port to a terminal for C-JT/NC-JT transmission, a method of using a codepoint of a reserved bit on the existing rel-15 is proposed. As shown in Table 7, in the Rel-15 DMRS port table, fields of 0 to 11 are used, and fields of 12 to 15 are not used as reserved bits. In an embodiment of the disclosure, as shown in Table 13-1, a DMRS port for joint transmission transmitted from two TRPs may be indicated by utilizing four codepoints of 12 to 15 in the DMRS port table. As described above, when the same reserved bits are used, the base station and the terminal do not need to allocate separate fields, and accordingly, DCI resources may be used more efficiently.

For example, when the base station indicates entry 12 to the terminal, the terminal may determine that the first TRP and the second TRP transmit a DMRS through DMRS port 0 and DMRS port 2. In addition, the terminal identifying that the number of each port is one may determine that single layer transmission is performed from the first TRP and the second TRP.

As another example, when the base station indicates entry 13 to the terminal, the terminal may determine that the first TRP transmits a DMRS through DMRS ports 0 and 1 and that the second TRP transmits a DMRS through DMRS port 2. In addition, the terminal identifying that the number of each port is two and one may determine that 2 layer transmission is performed by the first TRP and 1 layer transmission is performed by the second TRP.

As another example, when the base station indicates entry 14 to the terminal, the terminal determines that the first TRP transmits a DMRS through DMRS port 0, and the remaining one second TRP transmits a DMRS through DMRS ports 2 and 3. In addition, the terminal identifying that the number of each port is one and two may determine, from the TRP, that single layer transmission is performed by the first TRP and 2 layers transmission is performed by the remaining second TRP.

As another example, when the base station indicates entry 15 to the terminal, the terminal determines that the first TRP transmits a DMRS through DMRS ports 0, 1, and the remaining second TRP transmits a DMRS through DMRS ports 2 and 3. In addition, the terminal identifying that the number of each port is two may determine that 2 layer transmission is performed by the first TRP and 2 layer transmission is performed by the remaining second TRP.

Here, the terminal configured as C-JT/NC-JT transmission=enabled in a higher layer may check the residual codepoints of the existing antenna port field in DCI format 1_1 to determine, in a dynamic way, whether C-JT/NC-JT is performed. That is, when antenna port fields in DCI format 1_1 are 12 to 15, the terminal may check the number of TRPs used for transmission of PDSCH scheduled in DCI, the number of layers to be transmitted, the number of DMRS DCM groups without data, the number of front-loaded symbols, or the like. The above embodiments are listed in an entry format, and some or all of four entries may be applied in an actual system. The order of the entries in the above embodiment is only an embodiment and does not limit the disclosure.

As an example, Table 13-2 to Table 13-4 are embodiments in which some of DMRS ports additionally generated in Table 12-2 to Table 12-4 are added to Table 8 to Table 10 defined in the rel-15 standard, and here, overlapping DMRS ports are omitted to reduce bits size as much as possible. The omission is only an embodiment, and the table may be completed by additionally utilizing some or all of the DMRS ports shown in Table 12-1 to Table 12-4. In addition, the base station may schedule joint transmission to a rel-16 NC-JT terminal as shown in Table 12-1 to Table 13-4 and at the same time schedule single port transmission to a rel-15 terminal to the same DMRS port to perform a downlink MU-MIMO operation.

As another example, when DMRS port indexes are the same in some entries of Table 13-1 to Table 13-4, the overlapping indexes may be omitted. That is, in Table 13-1, entries 12, 13, and 15 for NC-JT transmission have the same port index as entries 11, 9, and 10, and thus may be omitted.

Also, in Table 13-2, entries 31, 32, and 34 for NC-JT transmission have the same port index as entries 11, 9, and 10, and thus may be omitted. Also, in Table 13-3, entries 24, 25, 27, 29, and 31 for NC-JT transmission have the same port index as entries 23, 9, 10, 29, 22 and thus may be omitted. Also, in Table 13-3, entries 24, 25, 27, 29, and 31 for NC-JT transmission have the same port index as entries 23, 9, 10, 29, 22 and thus may be omitted. Also, in Table 13-4, entries 58, 59, 61, 63, and 65 for NC-JT transmission have the same port index as entries 23, 9, 10, 20, and 22 and thus may be omitted. When the index is omitted, overlapping entries may be omitted based on one of the assumption that at least different CDM groups are not transmitted within the same port for NC-JT, the assumption that the terminal is able to distinguish DMRS ports for NC-JT by indicating whether NC-JT is performed in a TCI field, and the assumption that DMRS ports may be distinguished based on reception of a MAC CE message and reception of a DCI.

TABLE 13-1

DMRS indication table for antenna port(s) (1000 + DMRS port), dmrs-Type = 1, maxLength = 1
One Codeword:
Codeword 0 enabled,
Codeword 1 disabled

| Entries | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12 | 2 | 0; 2 |
| 13 | 2 | 0, 1; 2 |
| 14 | 2 | 0; 2, 3 |
| 15 | 2 | 0, 1; 2, 3 |

TABLE 13-2

DMRS indication table for antenna port(s) (1000 + DMRS port), dmrs-Type = 1, maxLength = 2
One Codeword:
Codeword 0 enabled,
Codeword 1 disabled

| Entries | Number of DMRS CDM group(s) without data | DMRS port(s) | Number of front-load symbols |
|---|---|---|---|
| 0 | 1 | 0 | 1 |
| 1 | 1 | 1 | 1 |
| 2 | 1 | 0, 1 | 1 |
| 3 | 2 | 0 | 1 |
| 4 | 2 | 1 | 1 |
| 5 | 2 | 2 | 1 |
| 6 | 2 | 3 | 1 |
| 7 | 2 | 0, 1 | 1 |
| 8 | 2 | 2, 3 | 1 |
| 9 | 2 | 0-2 | 1 |
| 10 | 2 | 0-3 | 1 |
| 11 | 2 | 0, 2 | 1 |
| 12 | 2 | 0 | 2 |
| 13 | 2 | 1 | 2 |
| 14 | 2 | 2 | 2 |

TABLE 13-2-continued

DMRS indication table for antenna port(s) (1000 + DMRS port), dmrs-Type = 1, maxLength = 2
One Codeword:
Codeword 0 enabled,
Codeword 1 disabled

| Entries | Number of DMRS CDM group(s) without data | DMRS port(s) | Number of front-load symbols |
|---|---|---|---|
| 15 | 2 | 3 | 2 |
| 16 | 2 | 4 | 2 |
| 17 | 2 | 5 | 2 |
| 18 | 2 | 6 | 2 |
| 19 | 2 | 7 | 2 |
| 20 | 2 | 0, 1 | 2 |
| 21 | 2 | 2, 3 | 2 |
| 22 | 2 | 4, 5 | 2 |
| 23 | 2 | 6, 7 | 2 |
| 24 | 2 | 0, 4 | 2 |
| 25 | 2 | 2, 6 | 2 |
| 26 | 2 | 0, 1, 4 | 2 |
| 27 | 2 | 2, 3, 6 | 2 |
| 28 | 2 | 0, 1, 4, 5 | 2 |
| 29 | 2 | 2, 3, 6, 7 | 2 |
| 30 | 2 | 0, 2, 4, 6 | 2 |
| 31 | 2 | 0; 2 | 1 |
| 32 | 2 | 0, 1; 2 | 1 |
| 33 | 2 | 0; 2, 3 | 1 |
| 34 | 2 | 0, 1; 2, 3 | 1 |
| 35 | 2 | 0; 2 | 2 |
| 36 | 2 | 0, 1; 2 | 2 |
| 37 | 2 | 0; 2, 3 | 2 |
| 38 | 2 | 0, 1; 2, 3 | 2 |
| 39 | Reserved | Reserved | Reserved |

TABLE 13-3

DMRS indication table for antenna port(s) (1000 + DMRS port), dmrs-Type = 2, maxLength = 1
One codeword:
Codeword 0 enabled,
Codeword 1 disabled

| Entries | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 3 | 0 |
| 12 | 3 | 1 |
| 13 | 3 | 2 |
| 14 | 3 | 3 |
| 15 | 3 | 4 |
| 16 | 3 | 5 |
| 17 | 3 | 0, 1 |
| 18 | 3 | 2, 3 |
| 19 | 3 | 4, 5 |
| 20 | 3 | 0-2 |
| 21 | 3 | 3-5 |
| 22 | 3 | 0-3 |
| 23 | 2 | 0, 2 |
| 24 | 2 | 0; 2 |
| 25 | 2 | 0, 1; 2 |
| 26 | 2 | 0; 2, 3 |
| 27 | 2 | 0, 1; 2, 3 |
| 28 | 3 | 0; 2 |
| 29 | 3 | 0, 1; 2 |
| 30 | 3 | 0; 2, 3 |
| 31 | 3 | 0, 1; 2, 3 |

TABLE 13-4

DMRS indication table for antenna port(s) (1000 + DMRS port), dmrs-Type = 2, maxLength = 2
One codeword:
Codeword 0 enabled,
Codeword 1 disabled

| Value | Number of DMRS CDM group(s) without data | DMRS port(s) | Number of front-load symbols |
|---|---|---|---|
| 0 | 1 | 0 | 1 |
| 1 | 1 | 1 | 1 |
| 2 | 1 | 0,1 | 1 |
| 3 | 2 | 0 | 1 |
| 4 | 2 | 1 | 1 |
| 5 | 2 | 2 | 1 |
| 6 | 2 | 3 | 1 |
| 7 | 2 | 0,1 | 1 |
| 8 | 2 | 2,3 | 1 |
| 9 | 2 | 0-2 | 1 |
| 10 | 2 | 0-3 | 1 |
| 11 | 3 | 0 | 1 |
| 12 | 3 | 1 | 1 |
| 13 | 3 | 2 | 1 |
| 14 | 3 | 3 | 1 |
| 15 | 3 | 4 | 1 |
| 16 | 3 | 5 | 1 |
| 17 | 3 | 0,1 | 1 |
| 18 | 3 | 2,3 | 1 |
| 19 | 3 | 4,5 | 1 |
| 20 | 3 | 0-2 | 1 |
| 21 | 3 | 3-5 | 1 |
| 22 | 3 | 0-3 | 1 |
| 23 | 2 | 0,2 | 1 |
| 24 | 3 | 0 | 2 |
| 25 | 3 | 1 | 2 |
| 26 | 3 | 2 | 2 |
| 27 | 3 | 3 | 2 |
| 28 | 3 | 4 | 2 |
| 29 | 3 | 5 | 2 |
| 30 | 3 | 6 | 2 |
| 31 | 3 | 7 | 2 |
| 32 | 3 | 8 | 2 |
| 33 | 3 | 9 | 2 |
| 34 | 3 | 10 | 2 |
| 35 | 3 | 11 | 2 |
| 36 | 3 | 0,1 | 2 |
| 37 | 3 | 2,3 | 2 |
| 38 | 3 | 4,5 | 2 |
| 39 | 3 | 6,7 | 2 |
| 40 | 3 | 8,9 | 2 |
| 41 | 3 | 10,11 | 2 |
| 42 | 3 | 0,1,6 | 2 |
| 43 | 3 | 2,3,8 | 2 |
| 44 | 3 | 4,5,10 | 2 |
| 45 | 3 | 0,1,6,7 | 2 |
| 46 | 3 | 2,3,8,9 | 2 |
| 47 | 3 | 4,5,10,11 | 2 |
| 48 | 1 | 0 | 2 |
| 49 | 1 | 1 | 2 |

TABLE 13-4-continued

DMRS indication table for antenna port(s) (1000 + DMRS port), dmrs-Type = 2, maxLength = 2
One codeword:
Codeword 0 enabled,
Codeword 1 disabled

| Value | Number of DMRS CDM group(s) without data | DMRS port(s) | Number of front-load symbols |
|---|---|---|---|
| 50 | 1 | 6 | 2 |
| 51 | 1 | 7 | 2 |
| 52 | 1 | 0,1 | 2 |
| 53 | 1 | 6,7 | 2 |
| 54 | 2 | 0,1 | 2 |
| 55 | 2 | 2,3 | 2 |
| 56 | 2 | 6,7 | 2 |
| 57 | 2 | 8,9 | 2 |
| 58 | 2 | 0;2 | 1 |
| 59 | 2 | 0,1;2 | 1 |
| 60 | 2 | 0;2,3 | 1 |
| 61 | 2 | 0,1;2,3 | 1 |
| 62 | 3 | 0;2 | 1 |
| 63 | 3 | 0,1;2 | 1 |
| 64 | 3 | 0;2,3 | 1 |
| 65 | 3 | 0,1;2,3 | 1 |
| 66 | 2 | 0;2 | 2 |
| 67 | 2 | 0,1;2 | 2 |
| 68 | 2 | 0;2,3 | 2 |
| 69 | 2 | 0,1;2,3 | 2 |
| 70 | 3 | 0;2 | 2 |
| 71 | 3 | 0,1;2 | 2 |
| 72 | 3 | 0;2,3 | 2 |
| 73 | 3 | 0,1;2,3 | 2 |
| 74-127 | reserved | reserved | reserved |

The terminal may support data transmitted from multi-TRP or a plurality of base stations in the form of C-JT/NC-JT. A terminal supporting C-JT/NC-JT may receive C-JT/NC-JT related parameters or setting values in higher layer configuration, and configure RRC parameters of the terminal based on the received parameters or setting values. For higher layer configuration, the terminal may utilize a UE capability parameter tci-StatePDSCH. Here, the UE capability parameter tci-StatePDSCH defines TCI states for the purpose of PDSCH transmission, and the number of TCI states may be configured to 4, 8, 16, 32, 64, 128 in FR1 and 64, 128 in FR2, and among the configured numbers, a maximum of 8 states that can be indicated by 3 bits of a TCI field of DCI through a MAC CE message could be configured. A maximum value of 128 refers to a value indicated by maxNumberConfiguredTCIstatesPerCC in the tci-StatePDSCH parameter included in capability signaling of the terminal. As described above, a series of configuration procedures from higher layer configuration to MAC CE configuration may be applied to a beamforming indication or a beamforming change command for at least one PDSCH in one TRP.

Various embodiments of the disclosure describe how the terminal may activate/deactivate a TCI state through different MAC CE signalings such as rel-15 and rel-16 by the base station. In particular, as in DCI format 1_1, when a PDSCH is allocated for a certain terminal, a TCI field may be used to dynamically support a direction indication of beamforming or a direction change command of beamforming.

A direction indication of beamforming or a direction change command of beamforming refers to an operation applied when the terminal that has identified TCI states field information in DCI format 1_1 receives a PDSCH in downlink after a predetermined period of time, and the direction denotes a beamforming configuration direction corresponding in association with a DL RS of QCLed base station/TRP.

First, the base station or the terminal may determine to use a Rel-15 MAC CE for the Rel-15 DCI format and to use a Rel-16 MAC CE for the Rel-16 DCI format, respectively. As such, different solutions are proposed according to a method of distinguishing each MAC CE structure of rel-15 and MAC CE structure of rel-16.

FIG. 10A is a diagram illustrating a structure of a MAC CE for TCI state activation of a UE-specific PDCCH according to the disclosure.

FIG. 10A illustrates a MAC CE structure for TCI state activation of Rel-15-based UE-specific PDCCH according to the disclosure.

The meaning of each field in the MAC CE and possible configurable values for each field are as below.

- Serving Cell ID (serving cell identifier): This field indicates the identity of the Serving Cell for which the MAC CE applies. The length of the field is 5 bits:

- CORESET ID(CORESET identifier ): This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits:

- TCI State ID(Tranmssionconfiguration indication identifier): This field indicates foe TCI state identified by TCI-StateId as specified in TS 38.331 [5] applicable to the Control Resource Set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci-StatesPDCCH-toReleaseList in the controlResourceSetidentified by the indicated CORESET ID. The length of the field is 7 bits.

Also, 10-50 of FIG. 10A illustrates a MAC CE structure for TCI state activation/deactivation of Rel-15 based UE-specific PDCCH.

The meaning of each field in the MAC CE and possible configurable values for each field are as below.

- Serving Cell ID (serving cell identifier): This field indicates the identity of the Serving Cell for which the MAC CE applies. The length of the field is 5 bits:
- BWP ID(Bandwidth Part identifier ): This field indicates a DL BWP for which the MAC CE applies as the codepoint of the DCI bandwidth part indicator field as specified in TS 38.212 [9]. The length of the BWP ID field is 2 bits:
- Ti ( TCI state identifier i): If there is a TCI state with TCI-StateId i as specified in TS 38.331 [5], this field indicates the activation/deactivation status of the TCI state with TCI-StateId i, otherwise MAC entity shall ignore the Ti field The Ti field is set to 1 to indicate that the TCI state with TCI-StateId i shall be activated and mapped to the codepoint of the DCI Transmission Configuration Indication field, as specified in TS 38.214 [7]. The Ti field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with Ti field set to 1, i.e. the first TCI State with Ti field set to 1 shall be mapped to the codepoint value 0, second TCI State with Ti field set to 1 shall be mapped to the codepoint value 1 and so on. The maximum number of activated TCI states is 8:
- R (redundant bit): Reserved bit, set to 0.

The MAC CE of Rel-16 may be configured in a form in which a MAC CE message of rel-15 is partially extended. According to the present embodiment, all TC States activated by rel-15 MAC CE may be proposed to be included within TCI states activated by rel-16 MAC CE.

Figure 10B:
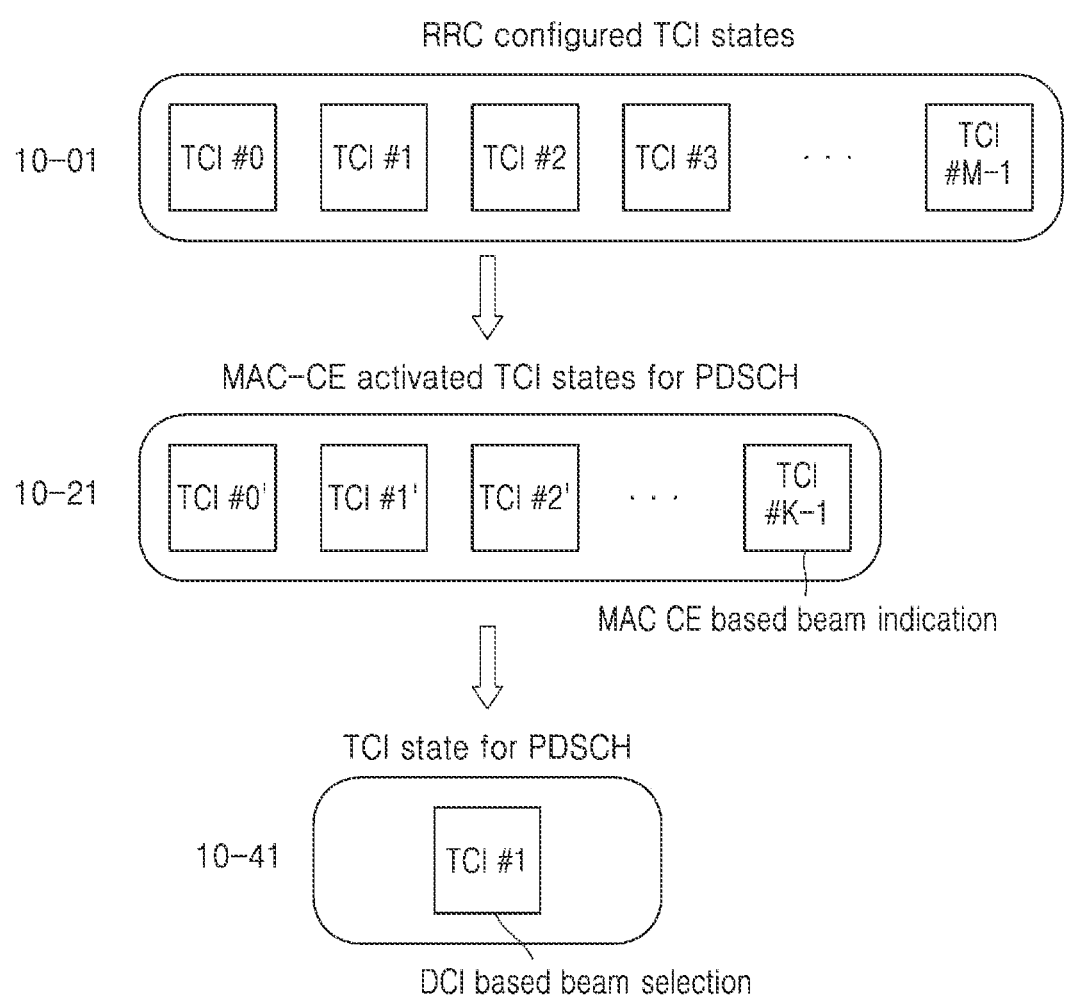
FIG. 10B is a diagram illustrating an example related to transmission configuration indication (TCI) states configuration and beamforming indication, according to an embodiment of the disclosure.

As an example, as shown in FIG. 10B, the base station may determine all TCI states of RRC configured TCI states (10-01) of rel-15 as M as TCI #0, TCI #1, TCI #2, . . . , TCI #M−1, and select TCI #0', TCI #1', TCI #2', . . . , TCI #K−1 as a subset (10-21) of TCI states selected by the MAC CE of rel-15. On the other hand, the base station and the terminal supporting rel-16 may separately configure RRC configured TCI states supporting rel-16 or use the RRC configured TCI states configured in rel-15 as it is. The RRC configured TCI states supporting rel-16 may include some or all of the RRC configured TCI states set in rel-15. When M=128, the TCI states of rel-16 may be greater than or equal to 128. When the base station or terminal extends the number of TCI states supported by rel-15, in proportion to the number of base stations/TRPs operating in C-JT/NC-JT in rel-16, and when operating by two TRPs, a maximum of 256 TCI states may be configured. Here, the rel-16 MAC CE may include some or all of the TCI states supported by MAC CE of rel-15, in RRC configured TCI states for rel-16 use. In detail, when the rel-16 MAC CE includes all of the TCI states supported by the MAC CE of rel-15 and extends in proportion to the number of base stations/TRPs operating in C-JT/NC-JT in rel-16, and when operating by two TRPs, up to 2K TCI states may be configured.

Table 14 shows details of tci-StatePDSCH parameters described in the above embodiment. In detail, an FR2 mandatory value of parameter maxNumberConfiguredTCIstatesPerCC may be modified from 64 to 128 or 256 or may be separately added as 64, 128 or 256 for the purpose of C-JT/NC-JT.

TABLE 14

| Definitions for parameters | Per | M | FDD-TDD DIFF | FR1-FR2 DIFF |
|---|---|---|---|---|
| tci-StatePDSCH<br>Defines support of TCI-States for PDSCH. The capability signalling comprises the following parameters:<br>maxNumberConfiguredTCIstatesPerCC indicates the maximum number of configured TCI-states per CC for PDSCH. For FR2, the UE is mandated to set the value to ~~64~~ 128. For FR1, the UE is mandated to set these values to the maximum number of allowed SSBs in the supported band;<br>maxNumberActiveTCI-PerBWP indicates the maximum number of activated TCI-states per BWP per CC, including control and data. If a UE reports X active TCI state(s), it is not expected that more than X active Q CL type D assumption(s) for any PDSCH and any CORESETs for a given BWP of a serving cell become active for the UE. | Band | Yes | No | NO |

Note
the UE is required to track only the active TCI states.

As an example, a base station or terminal supporting Rel-15 and rel-16 may configure maximum values for rel-15 and rel-16 respectively to configure TCI states through a MAC CE, to thereby configure the number of TCI state to a value equal to or less than the configured maximum values. As a method of configuring the number of TCI states to a value equal to or less than the maximum values, various embodiments as below may be proposed.

The number of TCI states activated by MAC CE messages of Rel-15 and rel-16 may be configured by a UE capability value reported by the terminal. According to another example, the number of TCI states activated by the MAC CE messages of rel-15 and rel-16 may be determined as a value preconfigured by the base station. According to another example, the number of TCI states activated by the MAC CE messages of rel-15 and rel-16 may be determined as values previously agreed between the base station and the terminal.

As an example, as shown in FIG. 10B, the base station and the terminal may determine all TCI states of RRC configured all TCI states (11-01) of RRC configured TCI states of rel-15 to M as TCI #0, TCI #1, TCI #2, . . . , TCI #M−1, and select a subset (11-20) of TCI states selected by the MAC CE of rel-15 and arrange TCI #0', TCI #1', TCI #2', . . . , TCI #K−1. When TCI #0 is selected among the M TCI states, TCI #0 may be arranged in TCI #0'. Here, for example, a maximum value of K for the base station and the terminal supporting rel-15 is configured or determined as 8, and a maximum value of K for the base station and the terminal supporting rel-16 may also be configured as 8. When the maximum value is configured as 8, the base station may indicate the terminal to select a beam for PDSCH through a DCI based beam selection operation in one CORESET. The selection of the beam may be determined by checking TCI field information 10-41 in DCI from among up to eight. TCI field #1 indicated in FIG. 10B may be selected as a value of 0 to 7. For example, when a TCI field in DCI is indicated as 000, it may be determined that TCI #0'(TCI #I=TCI #0') is indicated among TCI #0', TCI #1', TCI #2', TCI #3', TCI #4', TCI #5', TCI #6', TCI #7'. Although a case where the maximum value is configured as 8 (K=8) is described in the above embodiment, the maximum value may also be configured to be a value less than 8. Although a case where the maximum value K of MAC CE for Rel-15 and the maximum value K of MAC CE for rel-16 are the same is described in the above embodiment, the maximum values may be configured to be different values.

As another example, when extended in proportion to the number of base stations/TRPs operating in C-JT/NC-JT, and when operating by two TRPs, the maximum value of K for the base station and the terminal supporting rel-16 may be configured to be 16. When the maximum value is configured to be 16, the base station may indicate the terminal to select one or two or more beams for a PDSCH through a DCI based beam selection operation in one CORESET. #I selected and indicated by the base station may be selected as a value of 0 to 15 when K is 16. Although a case where the maximum value is configured to 16 (K=16) is described in the above embodiment, the maximum value may be configured to be a value less than 16.

Table 15 shows the characteristics of UE capability reporting parameters for QCL-TypeD "PDSCH beam switching (or timeDurationForQCL, UE capa 2-2)" and "Max number of downlink RS resources used for QCL type-D in the active TCI states and active spatial relation info (or UE capa 2-62)". Referring to Table 15, the terminal may report, to the base station, through timeDurationForQCL, a time interval required for changing a reception beam from a minimum of 7 symbols to a maximum of 28 symbols, based on a 60 kHz subcarrier spacing (SCS), or a time interval required for changing a reception beam from a minimum of 14 symbols to a maximum of 28 symbols, based on a 120 kHz subcarrier spacing (SCS). 60 kHz and 120 kHz SCSs are values that may be configured only in FR2, and according to Table 15, timeDurationForQCL is also available only in FR2. In addition, the terminal may inform the base station of how many downlink reference signals may be used as reference RSs for QCL type-D of an activated TCI state, through "UE capa 2-62". For example, when a value of the "UE capa 2-62" is 1, this may be interpreted as meaning that there is one reference RS of QCL type-D in the activated TCI state, and dynamic change to QCL-type D, that is, a reception beam, cannot be made. On the other hand, when the value of "UE capa 2-62" is 2 or more, this may be interpreted as meaning that there are two or more reference RSs of QCL type-D in the activated TCI state, and thus, dynamic change to QCL type-D, that is, a reception beam, may be made.

TABLE 15

| 2-2 | PDSCH beam switching | 1) Time duration (definition follows clause 5.1.5 in TS 38.214), Xi, to determine and apply spatial QCL information for corresponding PDSCH reception. Time duration is defined counting from end of last symbol of PDCCH to beginning of the first symbol of PDSCH. Xi is the number of OFDM symbols, i is the index of SCS, 1 = 1, 2, corresponding to 60, 120 kHz SCS. | Applicable only to FR2 | Mandatory with capability signaling for FR2 Candidate value set for X1 is {7, 14, 28}, Candidate value set for X2, {14, 28} |
|---|---|---|---|---|
| 2-62 | Max number of downlink RS resources used for QCL type-D in the active TCI sates and active spatial relation info | Max number of downlink RS resources in the active TCI states and active spatial relation info per CC | FR1/FR2 | Optional with capability-signaling Candidate value set; {1, 2, 4, 8, 14} |

The Rel-15-based base station may allocate data in consideration of a scheduling time offset t_so from a point in time when reception of the PDCCH in the CORESET is completed to a point in time when the PDSCH scheduled by the PDCCH is transmitted. The scheduling time offset t_so refers to a duration from a last symbol (or a next symbol thereto) of the PDCCH allocating the PDSCH to a previous symbol at which a PDSCH transmitting data in a corresponding slot indicated by k0 described with reference to FIG. 8 starts. The scheduling time offset t_so may determine a start symbol of the PDSCH based on a Start and Length Indicator (SLIV) index configured in startSymbolAndLength (0 to 127) of PDSCH-TimeDomainResourceAllocation configured in a higher layer. The application of the beamforming may vary for each terminal according to the capability of the terminal, and the capability is transmitted to the base station as a timeDurationForQCL value in an RRC configuration process with the base station. In the disclosure, the timeDurationForQCL may be referred to as a time interval for the terminal to apply QCL or a QCL application time interval.

Basically, the terminal may perform operations as below according to the scheduling time offset t_so and the value of timeDurationForQCL based on the capability of the terminal to be configured in a higher layer.

When tci-PresentinDCI is not configured to 'enabled' in higher layer configuration, the terminal may check whether a scheduling offset/scheduling timing offset between PDCCH and PDSCH is greater than or equal to timeDurationForQCL reported by as a UE capability report, regardless of DCI format.

When tci-PresentinDCI is configured to 'enabled' in the higher layer configuration and the terminal receives DCI format 1_1 from the base station, the terminal may assume that the TCI field exists in the corresponding DCI and check whether the scheduling time offset between the PDCCH and the PDSCH is greater than or equal to the timeDurationForQCL reported by the UE capability.

When the scheduling offset/scheduling timing offset between the PDCCH and the PDSCH is less than timeDurationForQCL, the terminal may determine a DMRS port of the received PDSCH based on a QCL parameter used in a CORESET associated with a monitored search space having a lowest CORESET ID in a most recent slot.

Also, for example, when the scheduling offset/scheduling timing offset between the PDCCH and the PDSCH is greater than or equal to timeDurationForQCL, the terminal applies a QCL assumption that is the same as the CORESET used in transmission of the PDCCH, to the corresponding PDSCH DMRS port.

As another example, when the scheduling offset/scheduling timing offset between the PDCCH and the PDSCH is greater than or equal to timeDurationForQCL, the terminal applies a QCL assumption indicated by a TCI field in the corresponding PDCCH (DCI) to a corresponding PDSCH DMRS port. On the other hand, when any TCI state among the TCI states configured to the terminal "for all BWPs" does not include QCL-TypeD, the terminal may obtain a QCL assumption according to DCI and a TCI state that is always indicated regardless of an interval between PDSCHs allocated by the DCI.

FIGS. 11, 12, 13 and 14 are diagrams illustrating a structure of a PDCCH transmitted according to at least one CORESET and a search space configured by the base station.

FIGS. 11, 12, 13 and 14 describe an embodiment in which the base station transmits a first PDCCH within one CORESET (e.g., a first CORESET or PDCCH #1) as in FIG. 8. In detail, the first PDCCH transmitted by TRP-A may schedule one or more PUCCH resources and at least two PDSCHs. DMRS ports of different CDM groups may be applied to each of the PDSCHs transmitted by the base station, and DMRS transmission symbols transmitted together with each PDSCH may be located in the same symbol.

The base station applies the same beam direction of the PDCCH beam direction (TCI-states) in a specific CORESET transmitted by the base station for a certain terminal, unless there is a separate update by a MAC CE. In FIGS. 11, 12, 13 and 14, an Nth PDCCH (PDCCH #N) transmitted by the base station/TRP A shows a PDCCH in a CORESET associated with a monitored search space having a lowest CORESET ID in a most recent slot. That is, when the terminal does not receive a PDCCH beam switching update message, a QCL parameter used in reception of the Nth PDCCH in the CORESET associated with the monitored search space having the lowest CORESET ID in the most recent slot is equally applied also to reception of the first PDCCH. The Nth PDCCH is an embodiment that is transmitted in a different search space in the same CORESET and has been described as being transmitted in a previous slot of the first PDCCH, but transmission in other search spaces of the same slot is not limited.

In FIGS. 11, 12, 13 and 14, the first PDCCH or a second PDCCH indicates allocation of a first PDSCH and a second PDSCH for NC-JT transmission, in which case beamforming directions of the PDSCHs may be changed according to beamforming information configured in a higher layer, TCI information of DCI within the first PDCCH or the second PDCCH, antenna port information or RNTI information, or the like. The terminal may check a beamforming direction changed by the base station based on the received beamforming information and DCI information.

For example, in FIG. 11, a beamforming direction of the first PDCCH may be different from a beamforming direction of the first PDSCH and the second PDSCH for NC-JT transmission. As another example, the beamforming direction of the first PDCCH may coincide with the beamforming direction of the first PDSCH or the second PDSCH for NC-JT transmission. As another example, the base station may configure the beamforming directions of the first PDSCH and the second PDSCH to be different from each other in consideration of a spatial beamforming gain.

FIG. 11 proposes an operation of the base station and the terminal according to a relationship between timeDurationForQCL and a scheduling offset including a duration between a last symbol of the first PDCCH received by the terminal and a start symbol of the PDSCHs or the number of symbols.

In the disclosure, a scheduling timing offset is defined as the number of symbols between a last symbol of a PDCCH and a start symbol of a PDSCH corresponding to the PDCCH, but the embodiment of the disclosure is not limited thereto, and may be variously defined as a predefined number of symbol units or slot units.

Embodiment 1-1

As an example, the base station may not support NC-JT-based transmission in which a single PDCCH is scheduled for a terminal, in which tci-PresentinDCI is not configured to 'enabled'. That is, the base station may allocate only one PDSCH in one PDCCH for a terminal in which tci-PresentinDCI is not configured to 'enabled'. As a result, when the base station schedules a single PDCCH for a certain terminal and allocates two or more, a plurality of PDSCHs thereto, NC-JT-based transmission may be performed only when the tci-PresentinDCI is configured to 'enabled' in the terminal. However, it may be possible to perform NC-JT-based transmission by scheduling with multi-PDCCH, and a related description thereto will be additionally described with reference to Embodiment 5-1.

As another example, the base station may indicate a terminal, in which tci-PresentinDCI is not configured to 'enabled', NC-JT-based transmission scheduled by a single PDCCH, by using antenna port information in the single PDCCH. In detail, the base station may indicate to the terminal DMRS-related information mapped to different CDM groups in the antenna port information, to thereby inform about a plurality of pieces of PDSCH-related information to be transmitted by the base station.

Embodiment 1-2

The base station may support NC-JT-based transmission by scheduling DCI format 1_1 by a single PDCCH to the terminal in which tci-PresentinDCI is configured to 'enabled'. In addition, the base station may perform data transmission to the terminal in consideration of the scheduling time offset t_so between a single PDCCH and a plurality of PDSCHs in the NC-JT-based transmission.

11-00 of FIG. 11 shows a case where the value of t_so scheduled by the base station is 14 or more. When a calculated value of t_so is 14 or more, the base station may determine and operate by using at least one of methods proposed below.

For example, the base station may perform, to a certain terminal in which tci-PresentinDCI is configured to 'enabled', for NC-JT-based transmission, transmission of a first PDCCH 11-10 (DCI format 1_1) and transmission of a first PDSCH 11-20 and a second PDSCH 11-25 allocated by the first PDCCH 11-10. Here, the base station may transmit both the first PDSCH 11-20 and the second PDSCH 11-25 based on the scheduling algorithm of the base station without considering the timeDurationForQCL of the terminal. For example, the base station may indicate a beamforming direction in which the PDSCHs are transmitted, by using TCI information and antenna port information in DCI of the first PDCCH 11-10. In this case, the capability of the terminal is not considered in scheduling.

As another example, when it is determined that the terminal is able to receive at least one PDSCH, based on timeDurationForQCL information of the terminal and the indicated TCI state-related information of the first PDSCH and the second PDSCH, the base station may transmit to the terminal, for NC-JT-based transmission of a certain terminal, the first PDCCH and the first PDSCH and the second PDSCH allocated by the first PDCCH.

As another example, when it is determined, based on timeDurationForQCL information of the terminal and the indicated TCI state-related information of the first PDSCH and the second PDSCH, that the terminal is able to receive the two PDSCHs, the base station may transmit to the terminal, for NC-JT-based transmission of a certain terminal, the first PDCCH and the first PDSCH and the second PDSCH allocated by the first PDCCH.

Embodiment 2-1

For example, when tci-PresentinDCI is not configured to 'enabled', the terminal may not expect NC-JT-based transmission. That is, when tci-PresentinDCI is not configured to 'enabled' or when DCI format 1_0 is received, the terminal may consider that only one PDSCH corresponding to one PDCCH is transmitted. For example, the terminal may determine that a beamforming direction of the first PDCCH and a beamforming direction of a PDSCH indicated by the first PDCCH are the same.

As another example, when tci-PresentinDCI is not configured to 'enabled', the terminal may determine whether to perform NC-JT transmission, based on antenna port information included in DCI. That is, the antenna port information may include information about whether the base station transmits a single PDSCH or a plurality of PDSCHs. For example, the terminal may determine that the beamforming direction of the first PDCCH and at least one direction of the first PDSCH and the second PDSCH indicated by the first PDCCH are the same. Alternatively, the terminal may determine that the beamforming direction of the first PDCCH and the directions of the first PDSCH and the second PDSCH indicated by the first PDCCH are a TCI state that is configured as default.

Embodiment 2-2

When the terminal receives, from the base station, a message in which tci-PresentinDCI is configured to 'enable', and DCI format 1_1 of the first PDCCH, the terminal may calculate the scheduling time offset t_so and compare the same with the UE capability parameter timeDurationForQCL (e.g., S14) reported to the base station.

11-00 of FIG. 11 shows a case where the value of t_so calculated by the terminal is 14 or more. When the value of t_so is 14 or more, the terminal may determine and operate by using at least one of methods proposed below.

For example, assuming that a TCI field exists in corresponding DCI, the terminal may respectively apply QCL parameters (sets) of TCI states indicating a direction of beamforming for at least one PDSCH indicated by a codepoint of the TCI.

As another example, when the information indicated by the codepoint of the TCI includes one TCI state, the terminal may assume that TCI states for one PDSCH among the two PDSCHs are the same as the TCI of the PDCCH. The terminal may receive data by applying QCL parameters for the first PDSCH and the second PDSCH based on the information of the configured TCI field.

11-50 of FIG. 11 shows a case where the t_so value between the PDCCH and PDSCHs transmitted by the base station is less than 14. When the value of t_so is less than 14, the base station may determine and operate by using at least one of methods proposed below.

Embodiment 3-1

In the present embodiment, when the base station does not configure tci-PresentinDCI to 'enable', the base station may operate in the same manner as in Embodiment 1-1.

Embodiment 3-2

In the present embodiment, an operation when the base station configures tci-PresentinDCI to 'enable' and transmits DCI format 1_1 of the first PDCCH will be described.

For example, without considering the timeDurationForQCL of the terminal for NC-JT-based transmission of a certain terminal, the base station may transmit, based on a scheduling algorithm of the base station, both the first PDCCH and the first PDSCH and the second PDSCH allocated by the first PDCCH. For example, the base station may indicate a beamforming direction in which the PDSCHs are transmitted, by using TCI information and antenna port information in DCI, which are transmitted through the first PDCCH. In this case, the capability of the terminal is not considered in scheduling. As another example, for NC-JT-based transmission of a certain terminal, with respect to transmission of the first PDCCH and the first PDSCH and the second PDSCH allocated by the first PDCCH, when it is determined that the terminal is not able to receive at least one PDSCH, based on timeDurationForQCL information of the terminal and the indicated TCI state-related information of the first PDSCH and the second PDSCH, the base station may transmit, to the terminal, only a PDSCH that may be received (e.g., PDSCH #1). As another example, with respect to transmission of the first PDCCH and transmission of the first PDSCH and the second PDSCH allocated by the first PDCCH for NC-JT-based transmission of a certain terminal, when it is determined that the terminal is not able to receive at least one PDSCH, based on timeDurationForQCL information of the terminal and the indicated TCI state-related information of the first PDSCH and the second PDSCH, the base station may transmit at least one of the first PDSCH and the second PDSCH based on a TCI state that the terminal is able to receive (e.g., a TCI state used to receive PDCCH #1 or PDCCH #N) by considering timeDurationForQCL of the terminal. As another example, with respect to transmission of the first PDCCH and transmission of the first PDSCH and the second PDSCH allocated by the first PDCCH for NC-JT-based transmission of a certain terminal, when it is determined that the terminal is not able to receive at least one PSCH in consideration of only the timeDurationForQCL information of the terminal, the base station may not perform transmission of all PDSCHs (e.g., PDSCH #1, PDSCH #2) that were intended to be transmitted by the PDCCH.

When the terminal receives, from the base station, a message in which tci-PresentinDCI is configured to 'enable', and DCI format 1_1 of the first PDCCH, the terminal may calculate the scheduling time offset t_so and compare the same with the UE capability parameter timeDurationForQCL (e.g., S14) reported to the base station.

11-50 of FIG. 11 shows a case where the value of t_so calculated by the terminal is less than 14. When the value of t_so is less than 14, the terminal may determine and operate by using at least one of methods proposed below.

Embodiment 4-1

When the value of the scheduling time offset t_so calculated by the UE is less than the UE capability parameter timeDurationForQCL (e.g., S14) reported to the base station, the terminal may not expect the base station to transmit based on NC-JT.

For example, when the timeDurationForQCL required for the terminal to apply a TCI state-related QCL parameter indicating a beamforming direction for a PDSCH is not satisfied, the terminal may skip all PDSCH reception operations indicated in a PDCCH. As another example, when the timeDurationForQCL required for the terminal to apply the TCI state-related QCL parameter indicating the beamforming direction for the PDSCH is not satisfied, the terminal may equally apply a QCL parameter that is used to receive an Nth PDCCH in a CORESET associated with a monitored search space having a lowest CORESET ID in a most recent slot, for reception of a first PDSCH or a second PDSCH. In detail, the terminal may perform decoding by applying the QCL parameter to both the first PDSCH and the second PDSCH. As a result, when the base station has performed NC-JT transmission to which different beamforming directions are applied, the terminal may expect that reception of only one of the two PDSCHs is selectively successful.

Embodiment 4-2

When the value of the scheduling time offset t_so calculated by the terminal is less than the UE capability parameter timeDurationForQCL (e.g., S14) reported to the base station, the terminal may not expect the base station to transmit based on single transmission.

For example, when the timeDurationForQCL required for the terminal to apply the TCI state-related QCL parameter indicating the beamforming direction for the PDSCH is not satisfied, the terminal may use a QCL parameter used to receive an Nth PDCCH in a CORESET associated with a monitored search space having a lowest CORESET ID in a most recent slot. Thus, the terminal may receive data from a PDSCH allocated to a lowest/highest resource RB from among the first PDSCH and the second PDSCH (e.g., the first PDSCH/the second PDSCH), and may use the QCL parameter here. As another example, when the timeDurationForQCL required for the terminal to apply the TCI state-related QCL parameter indicating the beamforming direction for the PDSCH is not satisfied, the terminal may apply a QCL parameter used to receive an Nth PDCCH in the CORESET associated with the monitored search space having the lowest CORESET ID in the most recent slot, both to the first PDSCH or the second PDSCH. Also, a DMRS port configuration for reception of the first PDSCH and the second PDSCH may be received based on antenna port information within DCI.

In the above embodiments, the terminal expects that one default QCL is configured in NC-JT transmission based on single PDCCH within one CORESET.

In addition, in NC-JT based on single PDCCH within one CORESET, the terminal may expect that two or more default QCLs are configured. The configuration of two or more default QCLs means that the terminal may apply a QCL parameters to two PDSCHs (e.g., the first PDSCH and the second PDSCH) based on information previously configured by the base station. The QCL parameter to be applied may be intrinsically or extrinsically configured by DCI information (e.g., antenna port information and TCI information), MAC CE, or RRC information indicated to the terminal.

For example, when the base station configures at least two or more default QCLs per one CORESET or one PDCCH-config, a beamforming direction of each TRP based on at least two or more default QCLs may be configured to be the same on the side of the terminal which performs a reception operation. Alternatively, the plurality of TRPs may configure a TCI state of each TRP on the assumption that the same beamforming is performed on the terminal side. Here, the terminal may determine that the TCI states are the same based on MAC CE or RRC information that are intrinsically or extrinsically configured by the base station, and may perform a reception operation based thereon. The TCI states may be the same or different from each other in consideration of a location and a channel of the TRP. That is, the terminal may perform reception beamforming in the same direction by applying a QCL parameter to two PDSCHs (e.g., the first PDSCH and the second PDSCH).

As another example, when the base station configures at least two or more default QCLs per one CORESET or one PDCCH-config, the base station may configure two or more default QCLs to match each other. That is, although two default QCLs are configured explicitly, they may be configured to indicate the same beamforming direction. Here, the terminal may perform the same beamforming by checking the same TCI states configured by the base station. Alternatively, the terminal may perform a reception operation based on one TCI state assuming that a plurality of TCI states for the default QCL, configured in the base station are identical to each other. That is, the terminal may perform reception beamforming in the same direction by applying a QCL parameter that is equally configured to two PDSCHs (e.g., the first PDSCH and the second PDSCH).

Meanwhile, the base station may sequentially configure at least two or more default QCLs for each one CORESET or one PDCCH-config. Alternatively, in some cases, there may be a state in which two or more default QCLs are not completely configured, but only one default QCL is configured.

As an example, the base station may configure a default QCL for the first PDSCH and may or may not configure a default QCL for the second PDSCH later. When a default QCL for the second PDSCH is not configured, and when only the default QCL for the first PDSCH, configured in one serving cell, PDCCH-config or CORESET (group) is configured for each TRP, the terminal may determine that the default QCL for the second PDSCH is identical to that of the first PDSCH. Alternatively, the terminal may determine that the default QCL for the second PDSCH is unnecessary and thus determine that the second PDSCH is not scheduled within the scheduling time offset. Alternatively, the terminal may determine that transmission of the second PDSCH will not be performed. In other words, when the base station does not configure at least two default QCLs, the terminal may assume that at least two or more, a plurality of PDSCHs will not be transmitted within one slot from single-DCI-based multi-TRP, and after at least two default QCLs are configured, the terminal may determine that at least two or more, a plurality of PDSCHs will be transmitted within one slot from the plurality of TRPs.

Figure 12:
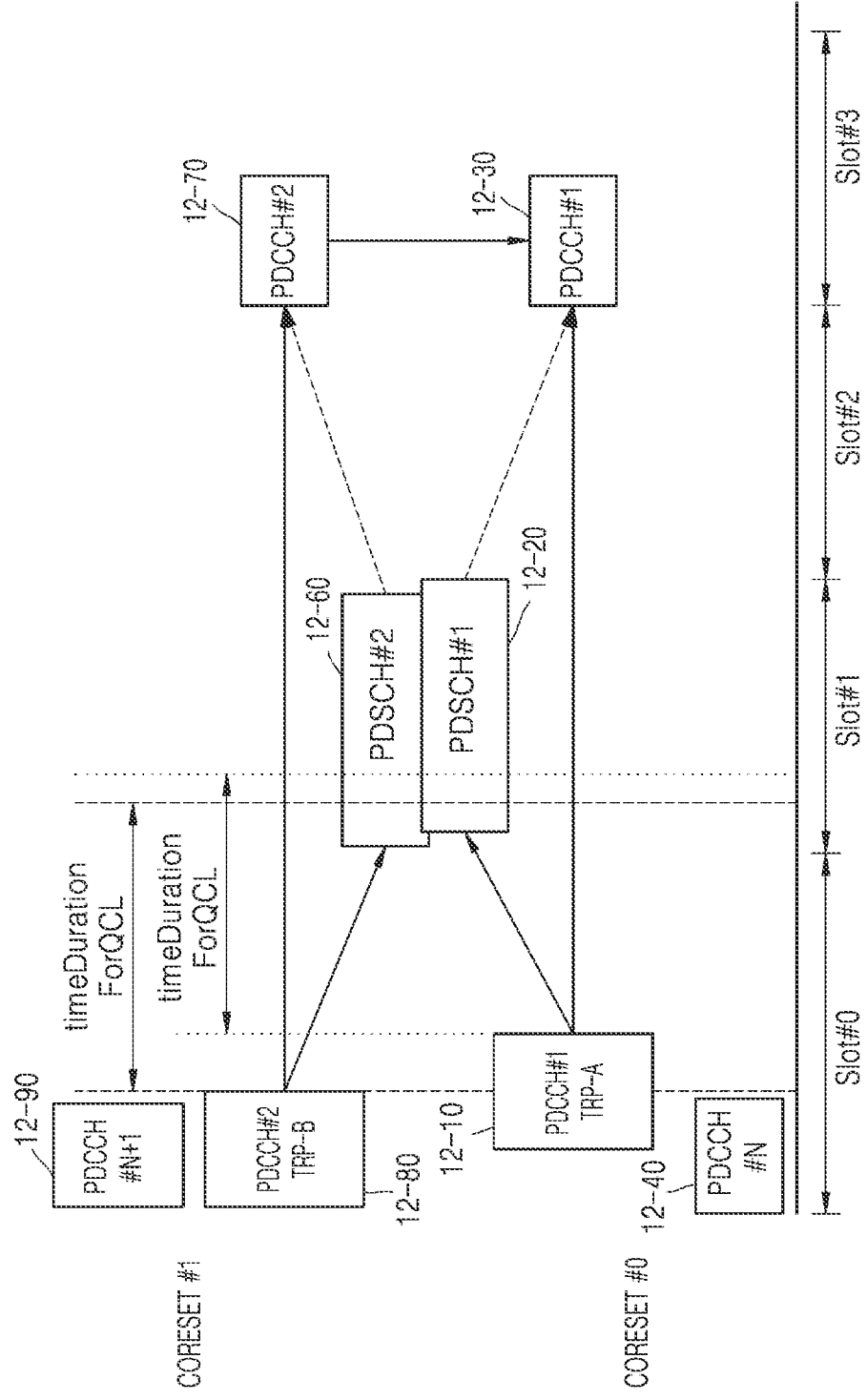
FIG. 12 is a diagram illustrating an example of multiple PDCCH-based cooperative communication according to an embodiment of the disclosure.

FIG. 12 illustrates an embodiment in which the base station transmits a first PDCCH within one CORESET (e.g., CORESET #0 or PDCCH #1), and additionally transmits a second PDCCH within another CORESET (e.g., CORESET #1 or PDCCH #2).

In detail, the first PDCCH transmitted from TRP-A may schedule one or more PUCCH resources (first PUCCH) and one or more PDSCHs (first PDSCH), and the second PDCCH transmitted from TRP-B may schedule one or more PUCCH resources (second PUCCH) and one or more PDSCHs (second PDSCH). DMRS ports of different CDM groups may be applied to each of the PDSCHs transmitted by the base station, and DMRS transmission symbols transmitted together with each PDSCH may be located on the same symbol. Although it is assumed that the PDSCHs are transmitted on the same symbol, the disclosure is not limited to being transmitted on the same symbol.

In addition, the plurality of CORESETs may be separately configured by the base station for multi-DCI-based NC-JT transmission. Alternatively, the plurality of CORESETs may be configured in a set form such as a CORESET group, and may be indicated based on a higher layer or L1/L2 signaling for a terminal supporting NC-JT.

For example, the base station may configure one CORESET group including at least one CORESET(s) to a certain terminal for multi-DCI-based NC-JT-based transmission. In detail, the base station may configure a certain terminal with four CORESETs in one CORESET group, and thus the terminal may receive two PDCCHs by monitoring the configured CORESETs, and receive allocated PDSCHs from the received PDCCHs. As illustrated in FIG. 12, one CORESET group (e.g., CORESET group #0) may be configured from the base station to a certain terminal, and from among up to five CORESETs (e.g., CORESET #0 to CORESET #4) included in the CORESET group, the terminal may monitor CORESET #0 and CORESET #1 for the purpose of NC-JT. Here, a CORESET to be monitored by the terminal in the CORESET group may be configured by the base station or may be determined according to the terminal's configuration or arbitrarily, which may also be applied to other embodiments of the disclosure.

As another example, the base station may configure a certain terminal with at least two or more CORESET groups including at least one CORESET(s) for multi-DCI-based NC-JT-based transmission. For example, the base station may configure two CORESET groups for a certain terminal, and may configure or indicate CORESET(s) in one CORESET group or each CORESET group among the configured CORESET groups. Accordingly, the terminal may receive two PDCCHs by monitoring the configured CORESET(s) and receive allocated PDSCHs by the received PDCCHs. As illustrated in FIG. 12, two CORESET groups (e.g., CORESET group #0, CORESET group #1) may be configured from the base station to a certain terminal, and from among the CORESETs in the CORESET group, the terminal may monitor CORESET #1 in CORESET group #0 and CORESET #1 in CORESET group #1 for the purpose of NC-JT. Here, a CORESET to be monitored by the terminal in the CORESET group may be configured by the base station or may be determined according to the terminal's configuration or arbitrarily.

The CORESET #0 may include a first PDCCH and an Nth PDCCH, and the CORESET #1 may include a second PDCCH and an N+1th PDCCH. CORESETs configured for each CORESET group may be different from each other (e.g., CORESET group #0 includes CORESET #0 and #2, CORESET group #1 includes CORESET #1, #3, #5), and a total number of CORESETs configured to all CORESET groups may be within a maximum number of CORESETs that may be configured for a terminal, that is, within a maximum number of CORESETs reported by UE capability. In the above embodiment, the maximum number of CORESETs may be 5 or less.

The base station applies the same beam direction as the PDCCH beam direction (TCI-states) in a specific CORESET transmitted by the base station for a certain terminal, unless there is a separate update by the MAC CE.

FIG. 12 illustrates PDCCHs in a CORESET associated with a monitored search space having a lowest CORESET ID in a most recent slot of each of CORESETs of an Nth PDCCH (PDCCH #N)/N+1th PDCCH (PDCCH #N+1) transmitted by TRP-A/TRP-B. That is, when the terminal does not receive a PDCCH beam switching update message, the terminal may equally apply a QCL parameter used in reception of the Nth PDCCH/N+1th PDCCH in the CORESET associated with the monitored search space having the lowest CORESET ID in the most recent slot, also to reception of the first PDCCH/the second PDCCH.

The Nth PDCCH (PDCCH #N)/N+1th PDCCH (PDCCH #N+1) are an embodiment that is transmitted in the same CORESET from different search spaces, and are described as being transmitted from the same slot of the first PDCCH/the second PDCCH, but may also be transmitted from other search spaces of a previous slot.

The first PDCCH and the second PDCCH may indicate allocation of the first PDSCH and the second PDSCH for NC-JT transmission, respectively, and in this case, a beamforming direction of the PDSCHs may be changed according to a beamforming direction configured in a higher layer, TCI information of DCI within the first PDCCH and the second PDCCH, antenna port information, or RNTI information or the like. The terminal may check the beamforming direction changed by the base station based on the received beamforming information and DCI information.

For example, the beamforming direction of the first PDCCH may be different from the beamforming direction of the first PDSCH for NC-JT transmission, and the beamforming direction of the second PDCCH may be all different from the beamforming direction of the second PDSCH for NC-JT transmission.

As another example, the beamforming direction of the first PDCCH may coincide with the beamforming direction of the first PDSCH for NC-JT transmission, or the beamforming direction of the second PDCCH may coincide with the beamforming direction of the second PDSCH for NC-JT transmission.

As another example, the base station may configure the beamforming directions of the first PDSCH and the second PDSCH to be different from each other in consideration of a spatial beamforming gain.

Figure 13:
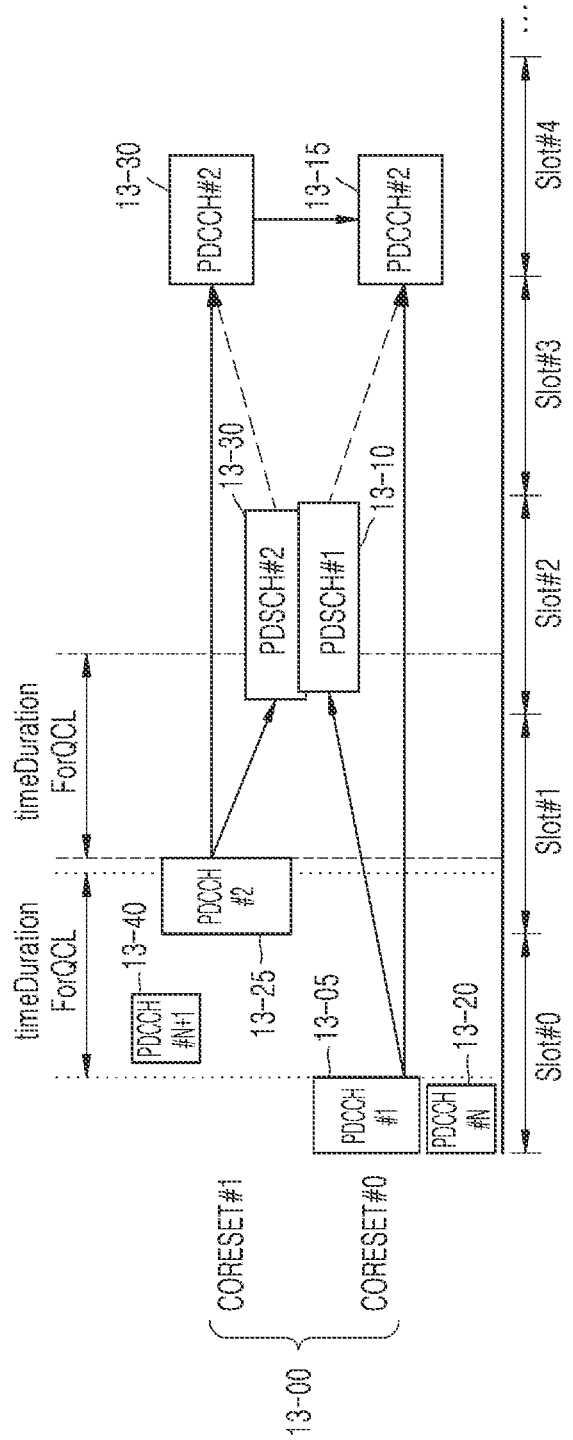
FIG. 13 is a diagram illustrating an example of multiple PDCCH-based cooperative communication according to another embodiment of the disclosure.
Figure 14:
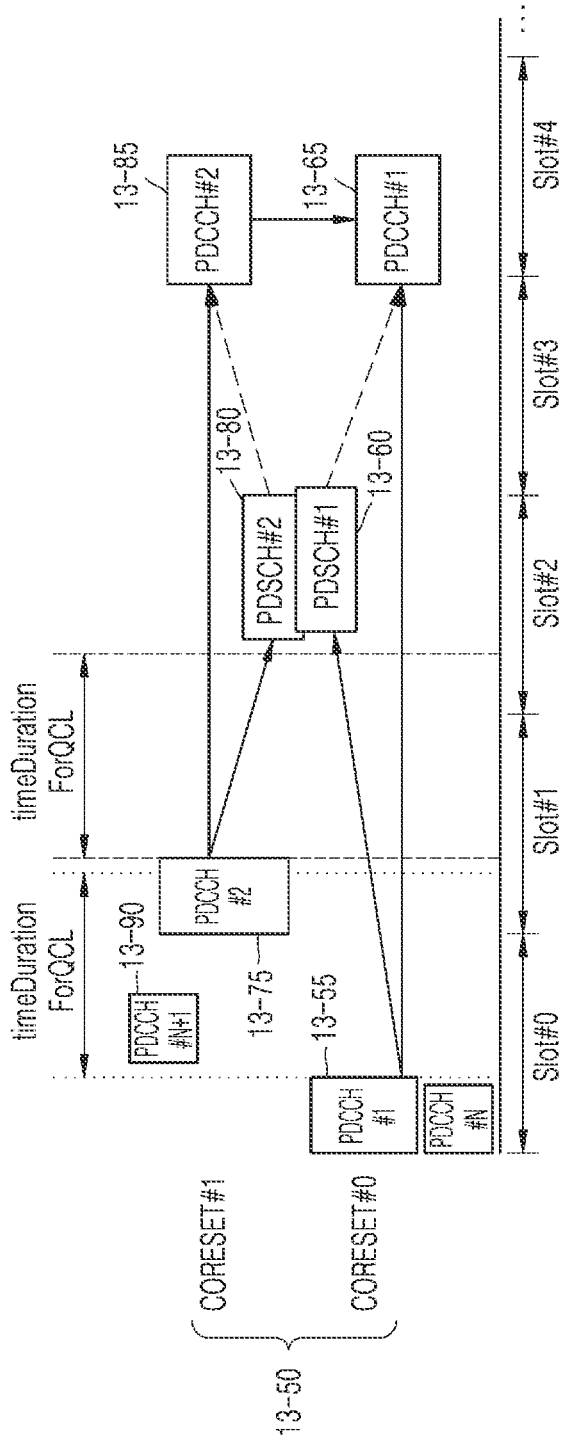
FIG. 14 is a diagram illustrating an example of multiple PDCCH-based cooperative communication according to another embodiment of the disclosure.

FIGS. 12, 13, and 14 propose operations of the base station and the terminal according to a relationship between timeDurationForQCL and a scheduling timing offset, which is a duration between a last symbol of the first PDCCH and a start symbol of the first PDSCH, received by the terminal, and a relationship between timeDurationForQCL and a scheduling timing offset, which is a duration between a last symbol of the second PDCCH and a start symbol of the second PDSCH.

Embodiment 5-1

When tci-PresentinDCI is not configured to 'enabled' for a certain terminal, for NC-JT-based transmission, the base station may schedule without considering the scheduling time offset t_so and the timeDurationForQCL reported by the UE capability report.

Embodiment 5-2

For example, when tci-PresentinDCI is not configured to 'enabled' for a certain terminal, for NC-JT-based transmission, the base station may schedule without considering the scheduling time offset t_so and the timeDurationForQCL reported by the UE capability report. The base station may determine whether to change the first PDSCH and second PDSCH transmission beams, which are based on NC-JT, without considering the capability of the terminal. Accordingly, the base station may transmit the PDSCHs based on TCI field information of the PDCCH which allocates the first PDSCH and the second PDSCH. As another example, when tci-PresentinDCI is not configured to 'enabled' for a certain terminal, for NC-JT-based transmission, the base station may schedule by considering the scheduling time offset t_so and the timeDurationForQCL reported by the UE capability report. The base station may determine the beam direction of the PDSCHs according to whether to change the first PDSCH and second PDSCH transmission beams, which are based on NC-JT.

For example, a case as shown in FIG. 12 is described below, in which the base station configures, to a terminal for the purpose of NC-JT, CORESET #0 in CORESET group #0 and CORESET #1 in CORESET group #1 among the two CORESET group #0, CORESET group #1 (e.g., CORESET group #0 includes CORESETs #0, #2, CORESET group #1 includes CORESETs #1, #3, #5), and a change in beams of the first PDSCH and the second PDSCH among the PDSCHs to be transmitted in association with the PDCCH in the CORESETs occurs. Here, the base station may perform at least one of an operation of comparing a first scheduling time offset, which is a duration between the first PDCCH and the first PDSCH in which a change in a beam of the PDSCH beam occurs to a certain terminal, with timeDurationForQCL, or an operation of comparing a second scheduling time offset, which is a duration between the second PDCCH and the second PDSCH, with timeDurationForQCL. Accordingly, the base station may operate as below when the first scheduling time offset and the second scheduling time offset, in both of which the beam switching occurs are less than timeDurationForQCL.

In an embodiment, a QCL parameter used in transmission of the Nth PDCCH in the CORESET associated with the monitored search space having the lowest CORESET ID (e.g., CORESET #0 and CORESET #1) in the most recent slot in each CORESET group (e.g., CORESET group #0, CORESET group #1) may be applied to transmission of the first PDSCH, and a QCL parameter used in transmission of the N+1th PDCCH may be equally applied to transmission of the second PDSCH, respectively.

In detail, in FIG. 12, when PDSCH #1 is scheduled from CORESET group #0, a QCL parameter used for PDCCH #N corresponding to the monitored search space for the most recent slot and the lowest CORESET ID in a corresponding CORESET group is used for transmission of PDSCH #1. On the other hand, when PDSCH #2 is scheduled from CORESET group #1, similarly to the above description, the QCL parameter used for PDCCH #N+1 is used for transmission of PDSCH #2. That is, the base station may configure two CORESET groups for NC-JT, and may make each CORESET group correspond to each TRP. A QCL assumption for each PDSCH may be referred from a corresponding lowest CORESET-ID in the CORESET group.

In another embodiment, a QCL parameter used in transmission of the Nth PDCCH in the CORESET associated with the monitored search space having the lowest CORESET ID (e.g., CORESET #0) in the most recent slot in the lowest CORESET group (e.g., CORESET group #0) may be equally applied to the transmission of the first PDSCH and the second PDSCH, respectively.

In another embodiment, a QCL parameter used in transmission of the Nth PDCCH in the CORESET associated with the monitored search space having the lowest CORESET ID (CORESET #0) in the most recent slot in the lowest CORESET group (CORESET group #0) may be applied to the transmission of the first PDSCH, and transmission of the second PDSCH may be dropped or not performed. That is, transmission of the PDSCH may be prioritized according to the lowest CORESET ID.

As another example, the base station may configure a CORESET for the purpose of NC-JT, within one CORESET group #0 (e.g., CORESET group #0 includes CORESET #0 and CORESET #1) (CORESET #0 and CORESET #1 in FIG. 12), and a case is described, in which a beam switching of the first PDSCH and the second PDSCH occurs among PDSCHs to be transmitted in association with the PDCCH in the CORESETs. Here, the base station may compare a first scheduling time offset, which is a duration between the first PDCCH and the first PDSCH, in which a change in a beam of the PDSCH occurs to a certain terminal, with timeDurationForQCL, and compare a second scheduling time offset, which is a duration between the second PDCCH and the second PDSCH, with timeDurationForQCL. Accordingly, the base station may operate as in various embodiments below when the first scheduling time offset and the second scheduling time offset, in both of which the beam switching of the PDSCH occurs, are less than timeDurationForQCL.

In an embodiment, the base station may apply a QCL parameter used in transmission of the Nth PDCCH in the CORESET associated with the monitored search space based on information about the lowest CORESET ID (e.g., CORESET #0) or a next lowest ID (e.g., CORESET #1) in the most recent slot in each CORESET group (e.g., CORESET group #0), to transmission of the first PDSCH, or a QCL parameter used in transmission of the N+1th PDCCH equally to transmission of the second PDSCH, respectively.

In another embodiment, the base station may equally apply the QCL parameter used in transmission of the Nth PDCCH in the CORESET associated with the monitored search space based on information about the lowest ID (e.g., CORESET #0) in the most recent slot in the CORESET group (e.g., CORESET group #0), in which a beam switching occurs, to transmission of the first PDSCH or the second PDSCH, in which a beam switching has occurred, respectively.

In another embodiment, the base station may apply the QCL parameter used in transmission of the Nth PDCCH in the CORESET associated with the monitored search space based information about the lowest ID (e.g., CORESET #0) in the most recent slot in the CORESET group (e.g., CORESET group #0), in which a beam switching occurs, to transmission of the first PDSCH, and may drop or not perform transmission of the second PDSCH. That is, transmission of the PDSCH may be prioritized according to the lowest CORESET ID.

In addition, in the above embodiment, it has been described that the CORESET group (e.g., CORESET group #0 includes CORESET #0 and CORESET #2) exists, but in some cases, only a CORESET may exist without the concept or configuration of a CORESET group, and in such solutions, only the CORESET group is excluded from the above description, and it may be obvious that the description is interpreted based on a description of the CORESET ID.

Although a case with the lowest CORESET/CORSET group ID are described in the plurality of embodiments described above, extension to a case of a highest CORESET/ CORSET group ID may also be considered.

As another example, when a beam switching of at least one PDSCH among the PDSCHs to be transmitted occurs, the base station may perform, to a certain terminal, at least one of an operation of comparing a first scheduling time offset, which is a duration between the first PDCCH and the first PDSCH, with timeDurationForQCL, or an operation of comparing a second scheduling time offset, which is a duration between the second PDCCH and the second PDSCH, with timeDurationForQCL, and when both the first or second scheduling time offsets are less than timeDurationForQCL and the timeDurationForQCL is a certain value (e.g., s7), the base station may select one of the QCL parameters used in transmission of the Nth PDCCH and the N+1 PDCCH to apply a common beam direction of the first PDSCH and the second PDSCH. The selection method specifically may include a method of selecting a lowest/ highest CORESET ID, selecting a PDCCH index allocated in a most recent search space, or selecting a longest time difference by considering a time difference between the PDSCH and transmission of a PUCCH for transmitting ACK/NACK of the PDSCH. According to implementations, the plurality of PDSCHs may be transmitted from TRP-A or TRP-B.

When the terminal receives, from the base station, a message in which tci-PresentinDCI is configured to 'enable' and receives, from the base station, DCI format 1_1 of the first PDCCH, the terminal may calculate the scheduling time offset t_so and compare the same with UE capability parameter timeDurationForQCL (e.g., S14) reported to the base station. FIG. 12 illustrates a case where both values of t_so1 and t_so2 calculated by the terminal are less than 14. When the calculated value of t_so is less than 14, the terminal may determine and operate by a method proposed below.

Embodiment 6-1

For example, when tci-PresentinDCI is configured to 'enabled' from the base station and the terminal receives DCI format 1_1 of the first PDCCH or the second PDCCH, and all of the calculated scheduling time offset values t_so are less than the UE capability parameter timeDurationForQCL reported to the base station (e.g., S14), the terminal may not expect the NC-JT-based transmission of the base station. For example, when timeDurationForQCL required to apply the TCI state related QCL parameter indicating a beamforming direction for the PDSCH is not satisfied, the terminal may skip all PDSCH reception operations indicated in the PDCCH.

As another example, when the timeDurationForQCL required to apply the TCI state-related QCL parameter indicating a beamforming direction for the first PDSCH and the second PDSCH, in which a beam switching occurs, is not all satisfied, the terminal may operate as below to correspond to Embodiment 5-2. The terminal may be configured with a plurality of CORESET groups, and in the present embodiment, it is assumed that the first PDSCH is allocated in association with the PDCCH in the CORESET in CORESET group #0, and the second PDSCH is allocated in association with the PDCCH in the CORESET in the CORESET group #1.

In an embodiment, the terminal may apply information about a first QCL parameter used in transmission of the Nth PDCCH in the CORESET associated with the monitored search space having the lowest CORESET ID (e.g., CORESET #0 and CORESET #1) in the most recent slot in the CORESET group (e.g., CORESET group #0, CORESET group #1) in which a beam switching occurs, to reception of the first PDSCH, and information about a second QCL parameter used in reception of the N+1th PDCCH, to reception of the second PDSCH. In detail, the terminal may perform decoding by applying the information about the QCL parameters to each of the first PDSCH and the second PDSCH.

In another embodiment, the terminal may apply information about the first QCL parameter used in reception of the Nth PDCCH in the CORESET associated with the monitored search space having the lowest CORESET ID (e.g., CORESET #0) in a lowest CORESET group from among CORESET groups in which a beam switching occurs (e.g., CORESET group #0, CORESET group #1), to reception of both the first PDSCH and the second PDSCH.

In another embodiment, the terminal may apply information about the first QCL parameter used in reception of the Nth PDCCH in the CORESET associated with the monitored search space having the lowest CORESET ID (e.g., CORESET #0) in the lowest CORESET group from among CORESET groups in which a beam switching occurs (e.g., CORESET group #0, CORESET group #1), to reception of the first PDSCH, and may drop or not perform reception of the second PDSCH. That is, reception of the PDSCH may be prioritized according to the lowest CORESET ID.

As another example, when timeDurationForQCL required to apply the TCI state-related QCL parameter indicating a beamforming direction for the first PDSCH and the second PDSCH in which a beam switching occurs is not all satisfied, the terminal may operate as below to correspond to Embodiment 5-2. The terminal may be configured with a plurality of CORESET groups, and in the present embodiment, it is assumed that the first PDSCH and the second PDSCH are allocated in association with a PDCCH in CORESET group #0 (e.g., CORESET group #0 includes CORESET #0 to CORESET #4).

In an embodiment, the terminal may apply a QCL parameter used in reception of an Nth PDCCH in the CORESET associated with the monitored search space based on the lowest ID (e.g., CORESET #0) or the next lowest ID (e.g., CORESET #1) in the most recent slot in the CORESET group in which a beam switching occurs (e.g., CORESET group #0), to reception of the first PDSCH, and a QCL parameter used in reception of the N+1th PDCCH may be equally applied to reception of the second PDSCH transmission, respectively. In detail, when PDSCH #1 is scheduled from CORESET group #0 in FIG. 12, the terminal uses a QCL parameter used for PDCCH #N corresponding to the monitored search space for the most recent slot and the lowest CORESET ID in a corresponding CORESET group, in reception of PDSCH #1. On the other hand, when PDSCH #2 is scheduled from CORESET group #1, similarly to the above description, the terminal uses the QCL parameter used for PDCCH #N+1, in reception of PDSCH #2.

In another embodiment, the terminal may equally apply the QCL parameter used in transmission of the Nth PDCCH in the CORESET associated with the monitored search space based on information about the lowest ID (e.g., CORESET #0) in the most recent slot in the CORESET group (e.g., CORESET group #0), in which a beam switching occurs, to transmission of the first PDSCH or/and the second PDSCH, in which a beam switching has occurred, respectively.

In another embodiment, the base station may apply the QCL parameter used in transmission of the Nth PDCCH in the CORESET associated with the monitored search space based on information about the lowest ID (e.g., CORESET #0) in the most recent slot in the CORESET group (e.g., CORESET group #0), in which a beam switching occurs, to reception of the first PDSCH, and may drop or not perform reception of the second PDSCH. That is, reception of the PDSCH may be prioritized according to the lowest CORESET ID.

Although a case with the lowest CORESET ID is described in the plurality of embodiments described above, extension to a case of a highest CORESET ID may also be considered.

In addition, in the above embodiment, it has been described that the CORESET group (e.g., CORESET group #0 includes CORESET #0 to CORESET #4) exists, but in some cases, only a CORESET may exist without the concept or configuration of a CORESET group, and in such solutions, only the CORESET group is excluded from the above description, and it may be obvious that the description is interpreted based on a description of the CORESET ID.

As another example, when all of timeDurationForQCL required for the terminal to apply the TCI state-related QCL parameter indicating a beamforming direction for the first PDSCH and the second PDSCH is not satisfied, the terminal may select at least one of information about a first QCL parameter and information about a second QCL parameter used in reception of an Nth PDCCH within a CORESET associated with the monitored search space having the lowest CORESET ID in the most recent slot in each CORESET, and apply the same to both the first PDSCH and the second PDSCH and perform decoding. The selection method may specifically include determining to select a lowest/highest CORESET ID from among a plurality of CORESETs, selecting a PDCCH index allocated in the most recent search space, or selecting a longest time difference by considering a time difference between the PDSCH and transmission of a PUCCH for transmitting ACK/NACK of the PDSCH. According to implementations, the plurality of PDSCHs may be transmitted from TRP-A or TRP-B.

Embodiment 6-2

As an example, when tci-PresentinDCI is not configured to 'enabled' by the base station or DCI format 1_0 is received from the base station, the terminal may receive a plurality of PDSCHs that are based on NC-JT transmission, without considering the scheduling time offset t_so and timeDurationForQCL reported by the UE capability report. That is, when tci-PresentinDCI is not configured to 'enabled' or when DCI format 1_0 is received from the base station, the terminal may consider that only one PDSCH corresponding to one PDCCH is transmitted. For example, the terminal may determine that a beamforming direction of a first PDCCH is the same as a beamforming direction of a first PDSCH indicated by the first PDCCH, and a beamforming direction of a second PDCCH is the same as a beamforming direction of a second PDSCH indicated by the second PDCCH.

As another example, when tci-PresentinDCI is not configured to 'enabled' by the base station, the terminal may determine that NC-JT transmission-based PDSCH transmission is not supported.

13-00 of FIG. 13 illustrates a case in which one of values of t_so1 and t_so2 calculated by the terminal is less than 14. According to the present embodiment, when the value t_so2 among the plurality of t_so is less than 14, the base station and the terminal may determine and operate according to methods proposed below.

Embodiment 7-1

When tci-PresentinDCI is not configured to 'enabled' for a certain terminal like in Embodiment 5-1, for NC-JT-based transmission, the base station may schedule without considering the scheduling time offset t_so and timeDurationForQCL reported by the UE capability report.

Embodiment 7-2

For example, when tci-PresentinDCI is configured to 'enabled' for a certain terminal like in Embodiment 5-2, for NC-JT-based transmission, the base station may schedule without considering the scheduling time offset t_so and the timeDurationForQCL reported by the UE capability report.

As another example, when tci-PresentinDCI is not configured to 'enabled' for a certain terminal, for NC-JT-based transmission, the base station may schedule by considering the scheduling time offset t_so and the timeDurationForQCL reported by the UE capability report. The base station may determine the beam direction of the PDSCHs according to whether to change the first PDSCH and second PDSCH transmission beams, which are based on NC-JT.

For example, a case as shown in FIG. 13 is described below, in which the base station configures, for the purpose of NC-JT, CORESET #0 in CORESET group #0 and CORESET #1 in CORESET group #1 among the two CORESET group #0, CORESET group #1 (e.g., CORESET group #0 includes CORESETs #0, #2, CORESET group #1 includes CORESETs #1, #3, #5), as a CORESET of a terminal, and a beam switching of the first PDSCH and the second PDSCH occurs from among the PDSCHs to be transmitted in association with the PDCCH in the CORESETs. Here, the base station may perform at least one of an operation comparing at least one of an operation of comparing the first scheduling time offset t_so1, which is a duration between the first PDCCH and the first PDSCH, with timeDurationForQCL, or an operation of comparing a second scheduling time offset t_so2, which is a duration between the second PDCCH and the second PDSCH, and timeDurationForQCL. When an offset value of one of the first and second scheduling time offsets is less than timeDurationForQCL, the base station may operate as below. In the present embodiment, it is assumed that t_so2 is less than timeDurationForQCL.

In an embodiment, the base station may apply, to transmission of the second PDSCH, a QCL parameter that is used in transmission of the N+1th PDCCH in the CORESET group (e.g., CORESET group #1), in which the offset value is less than timeDurationForQCL in each CORESET group (e.g., CORESET group #0, CORESET group #1) and in the CORESET associated with the monitored search space having the lowest CORESET ID (e.g., CORESET #1) in the most recent slot based on the CORESET ID in the group.

In detail, when PDSCH #2 is scheduled from CORESET group #1 in FIG. 13, a QCL parameter used for PDCCH #N+1 corresponding to the monitored search space for the most recent slot and the lowest CORESET ID in the corresponding CORESET group is used in transmission of PDSCH #2.

In another embodiment, the base station may apply a QCL parameter used in transmission of the Nth PDCCH in a CORESET associated with the monitored search space having the lowest CORESET ID (e.g., CORESET #0) in the most recent slot in the lowest CORESET group (CORESET group #0) from among CORESET groups (e.g., CORESET group #0, CORESET group #1), to transmission of the second PDSCH.

In another embodiment, the base station may apply a QCL parameter to a beam direction of the PDSCH (second PDSCH) scheduled in the CORESET (e.g., CORESET #1) in the CORESET group (e.g., CORESET group #1) of the CORESET group (e.g., CORESET group #1) of which the offset value is less than timeDurationForQCL, according to a beamforming direction indicated by a CORESET (e.g., CORESET #0) in the CORESET group (e.g., CORESET group #0) in which the offset value is greater than or equal to timeDurationForQCL, that is, according to information about a TCI field indicated by the second PDCCH. Here, when the direction of the beam is not changed in the first PDCCH, the base station may apply the QCL parameter of the first PDCCH (or the first PDSCH) to the second PDSCH.

In another embodiment, the base station may compare t_so1 with timeDurationForQCL or t_so2 with timeDurationForQCL to a certain terminal, regardless of each CORESET group, and when one of t_so1 and t_so2 is less than timeDurationForQCL, the base station may not transmit (stop or skip) a PDSCH (second PDSCH) scheduled in the CORESET (e.g., CORESET #1) in which the offset value is less than timeDurationForQCL.

As another example, a case is described, in which the base station may configure a CORESET (CORESET #0 and CORESET #1) for the purpose of NC-JT within one CORESET group #0 (e.g., CORESET group #0 includes CORESET #0 and CORESET #1), and a beam switching of at least one PDSCH among PDSCHs occurs among PDSCHs to be transmitted in association with the PDCCH in the CORESET. Here, the base station may perform at least one of an operation of comparing a first scheduling time offset, which is a duration between the first PDCCH and the first PDSCH in which a beam switching of a PDSCH occurs, with timeDurationForQCL, or an operation of comparing a second scheduling time offset, which is a duration between the second PDCCH and the second PDSCH, with timeDurationForQCL. When the first scheduling time offset and the second scheduling time offset in which the beam switching of the PDSCH occurs are less than timeDurationForQCL, the base station may operate in the following various embodiments.

In an embodiment, the base station may apply a QCL parameter used in transmission of the Nth PDCCH in a CORESET associated with the monitored search space having the lowest CORESET ID (e.g., CORESET #0) in the most recent slot based on a CORESET ID in which the offset value is less than timeDurationForQCL, in the CORESET group (CORESET #0), to transmission of the second PDSCH.

In another embodiment, the base station may apply a QCL parameter used in transmission of the Nth PDCCH in a CORESET associated with the monitored search space having the lowest CORESET ID (e.g., CORESET #0) in the most recent slot in the lowest CORESET group (CORESET group #0) from among the CORESET groups (e.g., CORESET group #0), to transmission of the second PDSCH.

In another embodiment, for NC-JT transmission, the base station may apply a QCL parameter to a beam direction of the PDSCH (second PDSCH) scheduled in a CORESET (e.g., CORESET #1) in which the offset value is less than timeDurationForQCL, according to a beamforming direction indicated by a CORESET (e.g., CORESET #0), in which the offset value is greater than or equal to timeDurationForQCL, that is, according to information of a TCI field indicated by the second PDCCH. Here, when the base station does not change the direction of the beam in the first PDCCH, the QCL parameter of the first PDCCH (or the first PDSCH) may be applied to the second PDSCH.

In another embodiment, for NC_JT transmission, the base station may compare t_so1 with timeDurationForQCL or t_so2 with timeDurationForQCL to a certain terminal, regardless of each CORESET group, and when one of t_so1 and t_so2 is less than timeDurationForQCL, the base station may not transmit a PDSCH (second PDSCH) scheduled in the CORESET (e.g., CORESET #1) in which the offset value is less than timeDurationForQCL.

In addition, in the above embodiment, it has been described that the CORESET group (e.g., CORESET group #0 includes CORESET #0 and CORESET #2) exists, but in some cases, only a CORESET may exist without the concept or configuration of a CORESET group, and in such solutions, only the CORESET group is excluded from the above description, and it may be obvious that the description is interpreted based on a description of the CORESET ID.

Although a case with the lowest CORESET/CORSET group ID are described in the plurality of embodiments described above, extension to a case of a highest CORESET/CORSET group ID may also be considered.

Embodiment 8-1

When tci-PresentinDCI is configured to 'enabled' from the base station and the terminal receives DCI format 1_1 of the first PDCCH or the second PDCCH, and the calculated scheduling time offset t_so value reported to the base station is less than the UE capability parameter timeDurationForQCL (e.g., S14), reported to the base station, in one CORESET, the terminal may not expect the NC-JT-based transmission of the base station. For example, when a value of t_so1 is equal to or greater than 14, and a value of t_so2 is less than 14, the terminal may determine that the base station does not perform NC-JT-based transmission. That is, when the timeDurationForQCL required to apply a TCI state-related QCL parameter indicating a beamforming direction for the second PDSCH is not satisfied, the terminal may skip a reception operation of the second PDSCH indicated by the second PDSCH.

Embodiment 8-2

When tci-PresentinDCI is configured to 'enabled' from the base station and the terminal receives DCI format 1_1 of the first PDCCH or the second PDCCH from the base station, and a value of scheduling time offset t_so calculated in one CORESET is less than UE capability parameter timeDurationForQCL (e.g., S14) reported to the base station, the terminal may consider NC-JT-based transmission by the base station in accordance with Embodiment 7-2 as below. The terminal may be configured with a plurality of CORESET groups, and in the present embodiment, it is assumed that the first PDSCH is allocated in association with the PDCCH in the CORESET in CORESET group #0, and the second PDSCH is allocated in association with the PDCCH in the CORESET in the CORESET group #1.

In an embodiment, when the value of t_so1 in CORESET in CORESET group #0 is 14 or more and the value of t_so2 in CORESET in CORESET group #1 is less than 14, the terminal may determine that the base station performs NC-JT-based transmission. That is, when timeDurationForQCL required to apply a QCL parameter related to a TCI state indicating beamforming direction for the second PDSCH is not satisfied, the terminal may override, to transmission of the second PDSCH, a QCL parameter that is used in reception of the N+1th PDCCH in the CORESET group (e.g., CORESET group #1), in which the value of t_so2 is less than timeDurationForQCL and in the CORESET associated with the monitored search space having the lowest CORESET ID (e.g., CORESET #1) in the most recent slot based on the CORESET ID.

In another embodiment, when the value of t_so1 in a CORESET in CORESET group #0 is 14 or more and the value of t_so2 in the CORESET in CORESET group #1 is less than 14, the terminal may determine that the base station performs NC-JT-based transmission. That is, the terminal may apply a QCL parameter used in reception of the Nth PDCCH in the CORESET associated with the monitored search space having the lowest CORESET ID (e.g., CORESET #0) in the most recent slot in the lowest CORESET group (CORESET #0) from among CORESET groups (e.g., CORESET group #0, CORESET group #1), to reception of the second PDSCH.

In another embodiment, when the value of t_so1 in the CORESET in CORESET group #0 is 14 or more and the value of t_so2 in the CORESET in CORESET group #1 is less than 14, the terminal may determine that the base station performs NC-JT-based transmission. That is, the terminal may apply a QCL parameter to a beam direction of the PDSCH (second PDSCH) scheduled in a CORESET (e.g., CORESET #1) among CORESET groups (e.g., CORESET group #1), in which the offset value is less than timeDurationForQCL, according to a beamforming direction indicated by a CORESET (e.g., CORESET #0) in the CORESET group (e.g., CORESET group #0) in which the offset value is greater than or equal to timeDurationForQCL, that is, according to information of a TCI field indicated by the second PDCCH. Here, when the base station does not change the direction of the beam in the first PDCCH, the terminal may apply the QCL parameter of the first PDCCH (or the first PDSCH) to the second PDSCH.

In another embodiment, the base station may compare t_so1 with timeDurationForQCL or t_so2 with timeDurationForQCL to a certain terminal, regardless of each CORESET group, and when one of t_so1 and t_so2 is less than timeDurationForQCL, the base station may not transmit a PDSCH (second PDSCH) scheduled in the CORESET (e.g., CORESET #1) in which the offset value is less than timeDurationForQCL.

As another example, when tci-PresentinDCI is configured to 'enabled' from the base station and the terminal receives DCI format 1_1 of the first PDCCH or the second PDCCH from the base station, and a value of scheduling time offset t_so calculated in one CORESET is less than UE capability parameter timeDurationForQCL (e.g., S14) reported to the base station, the terminal may consider NC-JT-based transmission by the base station in accordance with Embodiment 7-2 as below. A CORESET (e.g., CORESET #0 and CORESET #1) for the purpose of NC-JT within one CORESET group #0 (e.g., CORESET group #0 includes CORESET #0 to CORESET #4) may be configured in the terminal, and a case in which a beam switching of at least one PDSCH among PDSCHs occurs among PDSCHs to be transmitted in association with the PDCCH in the CORESETs is described. However, the disclosure is not limited thereto, and the number of CORESETs set in the terminal may be changed according to the configuration of the base station.

In an embodiment, the terminal may apply a QCL parameter used in reception of the Nth PDCCH in the CORESET associated with the monitored search space having the lowest CORESET ID (e.g., CORESET #0) in the most recent slot based on a CORESET ID in which the offset value is less than timeDurationForQCL, in the configured CORESET group (CORESET #0), to reception of the second PDSCH.

In another embodiment, the terminal may apply a QCL parameter used in reception of the Nth PDCCH in the CORESET associated with the monitored search space having the lowest CORESET ID (e.g., CORESET #0) in the most recent slot in the lowest CORESET group (CORESET group #0) from among CORESET groups (e.g., CORESET group #0), to reception of the second PDSCH.

In another embodiment, for NC-JT transmission, the terminal may apply a QCL parameter to a beam direction of the PDSCH (second PDSCH) scheduled in a CORESET (e.g., CORESET #1) in which the offset value is less than timeDurationForQCL, according to a beamforming direction indicated by a CORESET (e.g., CORESET #0) in which the offset value is greater than or equal to timeDurationForQCL, that is, according to information of a TCI field indicated by the second PDCCH. Here, when the base station does not change the direction of the beam in the first PDCCH, the QCL parameter of the first PDCCH (or the first PDSCH) may be applied to the second PDSCH.

In another embodiment, for NC_JT transmission, the base station may compare t_so1 with timeDurationForQCL or t_so2 with timeDurationForQCL to a certain terminal, regardless of each CORESET group, and when one of t_so t and t_so2 is less than timeDurationForQCL, the base station may not transmit a PDSCH (second PDSCH) scheduled in the CORESET (e.g., CORESET #1) in which the offset value is less than timeDurationForQCL.

In addition, in the above embodiment, it has been described that the CORESET group (e.g., CORESET group #0 includes CORESET #0 and CORESET #2) exists, but in some cases, only CORESET may exist without the concept or configuration of a CORESET group, and in such solutions, only the CORESET group is excluded from the above description, and it may be obvious that the description is interpreted based on a description of the CORESET ID.

Although a case with the lowest CORESET/CORSET group ID are described in the plurality of embodiments described above, extension to a case of a highest CORESET/CORSET group ID may also be considered.

Embodiment 8-3

As an example, when tci-PresentinDCI is not configured to 'enabled' by the base station or DCI format 1_0 is received from the base station, the terminal may receive a plurality of PDSCHs that are based on NC-JT transmission, without considering the scheduling time offset t_so and timeDurationForQCL reported by the UE capability report. That is, when DCI format 1_0 is received, the terminal may consider that the base station transmits only one PDSCH allocated by one PDCCH. For example, the terminal may determine that a beamforming direction of a first PDCCH is the same as a beamforming direction of a first PDSCH indicated by the first PDCCH, and a beamforming direction of the second PDCCH is the same as a beamforming direction of a second PDSCH indicated by the second PDCCH.

As another example, when tci-PresentinDCI is not configured to 'enabled' by the base station, the terminal may determine that NC-JT transmission-based PDSCH transmission is not supported.

13-50 of FIG. 14 indicates a case in which a value of a duration (t_so1) between a last symbol of the first PDCCH and a start symbol of the first PDSCH, wherein the value is calculated by the terminal, and a value of a duration t_so2 between the last symbol of the first PDCCH and the start symbol of the first PDSCH are both 14 or more, and the base station and the terminal may determine and operate according to at least one of the methods proposed below.

Embodiment 9-1

For example, when the above condition is satisfied, the base station may always set tci-PresentinDCI to 'enabled' during NC-JT transmission. Alternatively, when tci-PresentinDCI is configured to 'enabled', the base station may configure a scheduling time such that the time condition is always satisfied during NC-JT transmission.

When tci-PresentinDCI is configured to 'enabled' by the base station and DCI format 1_1 of the first PDCCH or the second PDCCH is received from the base station, and when the scheduling time offset t_so value calculated by the terminal is all greater than or equal to the UE capability parameter timeDurationForQCL (e.g., S14) reported to the base station, the terminal applies a QCL assumption indicated by a TCI field in the PDCCH (DCI), to a corresponding PDSCH DMRS port. For example, the terminal may apply a TCI state-related QCL parameter for the first PDSCH and the second PDSCH based on TCI field information of each DCI in the first PDCCH and the second PDCCH to change a PDSCH beamforming direction. Even when a CORESET group is configured, the above operation may be easily applied through analogy as in Embodiment 8.

Embodiment 9-2

For example, when the base station does not configure tci-PresentinDCI to 'enabled' to a terminal or indicates the terminal to use DCI format 1_0, the base station may not perform scheduling for NC-JT transmission. That is, when tci-PresentinDCI is not configured to 'enabled' by the base station or when DCI format 1_0 is received from the base station, the terminal may consider that the base station transmits only one PDSCH allocated by one PDCCH. For example, the terminal may determine that a beamforming direction of a first PDCCH is the same as a beamforming direction of a first PDSCH indicated by the first PDCCH, and a beamforming direction of a second PDCCH is the same as a beamforming direction of a second PDSCH indicated by the second PDCCH.

In the above embodiments, the terminal may expect that one or more default QCLs are configured in NC-JT transmission based on multiple PDCCH within one CORESET.

Figure 15:
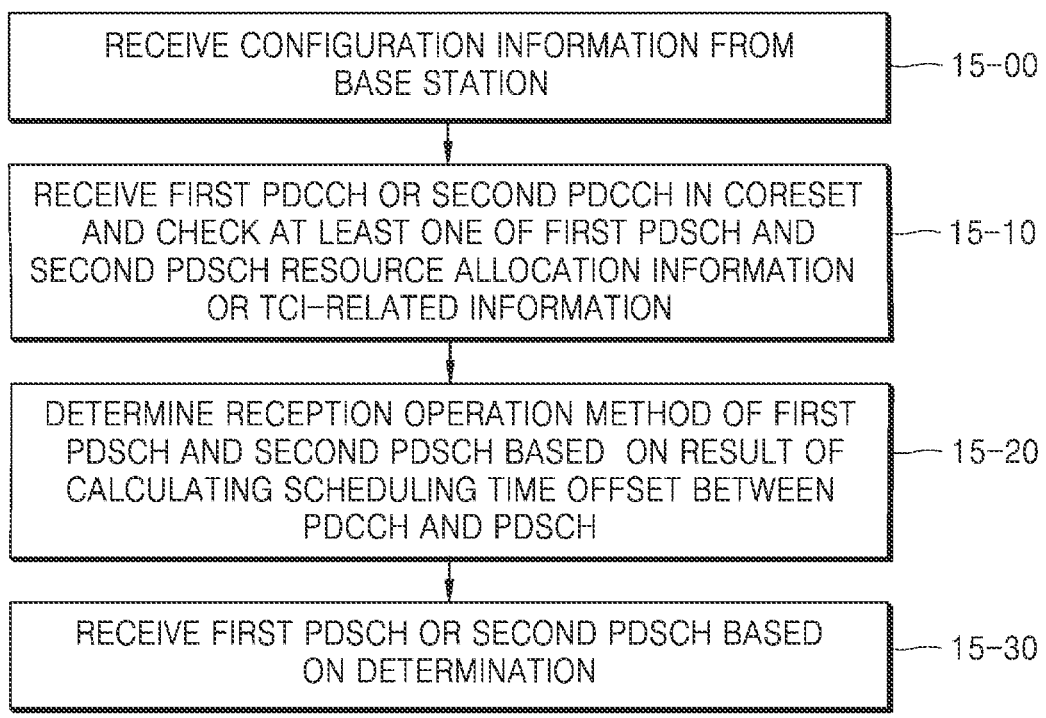
FIG. 15 is a flowchart of an operating method of a terminal according to an embodiment of the disclosure.

FIG. 15 is a flowchart of an operating method of a terminal according to an embodiment of the disclosure.

Referring to FIG. 15, a method of receiving, by the terminal, NC-JT transmission-based PDSCH, according to an embodiment of the disclosure, and a default QCL assumption are described.

In an RRC configuration process with the base station, the terminal may receive at least one piece of configuration information including at least one of a parameter related to base station beamforming (tci-PresentinDCI), a parameter for a control channel and a data channel, or configuration information (PDDCH-config, PDSCH-config) (15-00).

In addition, the terminal may transmit UE capability information (timeDurationForQCL) to the base station (15-00). The terminal may transmit the UE capability information at the request of the base station or at a predetermined point in time (e.g., in the RRC configuration process with the base station). Accordingly, when the base station receives the capability information of the terminal, the process of receiving the capability may be omitted. Alternatively, the operation of receiving the capability itself according to the configuration information may be omitted.

Thereafter, the terminal receives, from the base station, the first PDCCH or the second PDCCH in a specific CORESET based on the configuration information.

In addition, the terminal may check at least one of resource allocation information for the first PDSCH or the second PDSCH, TCI-related information, and antenna port information based on the first PDCCH or the second PDCCH (15-10).

Based on the identified information, the terminal may calculate a scheduling time offset between the PDCCH and the PDSCH (at least one of between the first PDDCH and the first PDSCH or between the second PDCCH and the second PDSCH), and determine at least one of an operation of receiving the first PDSCH or the second PDSCH (or a reception operation method) or a reception beamforming direction, based on a result of the calculation (15-20). Here, the determining a reception operation method, by the terminal, may include determining at least one of determining whether to receive data through at least one of the first PDSCH and the second PDSCH or a method for receiving data when it is determined to receive the data.

The terminal may receive data through the first PDSCH and the first PDSCH corresponding to the first PDCCH or the second PDCCH based on at least one of the identified information (15-10) and a result of the determination (15-20) (15-30).

And, the terminal may perform decoding of the received data.

Table 16 shows a simplified structure of Abstract syntax notation (ASN.1) of a serving cell. Hereinafter, an embodiment is described based on a higher level information element and field information described with reference to Table 16, for a configuration of a multi-TRP and distinguishing between multi-TRPs for NC-JT based transmission.

In Table 16, serving cells may be mapped to respective cell indexes through ServingCellIndex. Here, ServingCellIndex may refer to an ID of a serving cell, and may refer to a value of 0 when the serving cell is a PCell of a master cell group, a value set as servCellIndex of an SpCellConfig information element (IE) when the corresponding serving cell is a PSCell, and sCellIndex of the SCellConfig IE when the serving cell is an SCell.

Also, physCellId refers to a physical cell identifier for the serving cell, and a corresponding ID may be a value set in the ServingCellConfigCommon IE. Downlink transmission channel-related configuration of the corresponding serving cell and a transmission resource configuration such as BWP may be defined by IEs such as ARFCN, PDSCH-ServingCellConfig, BWP, PDCCH-Config, and PDSCH-Config. Similarly, uplink transmission-related configuration of the corresponding serving cell may be defined by IEs such as ARFCN, PUSCH-ServingCellConfig, BWP, PUCCH-Config, and PUSCH-Config. For NC-JT-based multi-TRP transmission, a configuration of a pair or set of TRPs may be configured based on parameters or IEs of Table 16.

For example, for NC-JT-based multi-TRP transmission, the configuration of a pair or set of TRPs may configure or distinguish TRPs in units of ServingCell IEs. In this case, when TRPs are distinguished based on each ServingCell, NC-JT-based transmission may configure a pair or set of different ServingCells, and when a change is necessary, additional combination and change may be performed. That is, a plurality of base stations may be operated by mapping each TRP to different ServingCell objects. In addition, it is also possible to configure a pair or set of ServingCells and set a separate higher layer parameter for the same. Here, multi-TRPs for NC-JT may have the same SSB carrier or SCS-SpecificCarrier. In addition, the multi-TRPs may include the same SCS, the same carrier BW, and the same point A (a common reference point for resource block grids or lowest subcarrier of common RB 0).

As another example, for the NC-JT-based multi-TRP transmission, the configuration of a pair or set of TRPs may configure or distinguish TRPs in units of PDCCH-config. In this case, as the multi-TRPs are already configured with the same ServingCell, the terminal may determine that the multi-TRPs are the same cell. When the base station configures a pair or set of TRPs for the NC-JT in units of PDDCH-config, the terminal may determine the configuration and change of the TRP through the configuration and change of the PDCCH-config through an RRC configuration or reconfiguration process. That is, at least two or more TRPs may configure a plurality of CORESETs and SearchSpaces through PDCCH-config, and may additionally allocate different scrambling IDs or different time/frequency resources. Here, a maximum of 5 CORESETs may be used for each PDCCH-config for the purpose of URLLC, and the TRPs may have TCI states independent of each other for PDCCH diversity performance.

As another example, for NC-JT-based multi-TRP transmission, the configuration of a pair or set of TRPs may configure or distinguish TRPs in units of CORESETs or CORESET groups below PDCCH-config. In this case, as the multi-TRPs are already configured with the same ServingCell, the terminal may determine that the multi-TRPs are the same cell. When the base station configures a pair or set of TRPs for the NC-JT in units of CORESETs or CORESET groups, the terminal may determine the configuration and change of the TRP through the configuration or reconfiguration of CORESET (index) or CORESET group (index) below PDCCH-config. That is, for transmitting at least two or more, a plurality of TRPs, each CORESET index may be associated with each other or a CORESET group index set in each CORESET may be used to map the CORESETs of the TRPs to be associated and operated.

The maximum number of CORESETs that may be configured in the same TRP may be determined by the capability of the terminal, and by considering a capability value of the terminal, the base station may configure the maximum number of candidate values of the CORESETs from a minimum of 3 to a maximum of 5 (e.g., URLLC scenario). In addition, the maximum number of CORESET groups (index) supported by the terminal may be configured to be less than or equal to the maximum number of CORESETs configured for the terminal. A terminal supporting NC-JT in Rel-16 supports up to two CORESET groups. The terminal may store the configured CORESET group (index) in a memory according to the capability value of the terminal, and may manage based on the same.

When a higher layer index is configured for each CORESET, in a case of multi-DCI-based operation, when a plurality of dataScramblingIdentityPDSCH parameters are configured, each dataScramblingIdentityPDSCH is associated with a higher layer index for each CORESET, and a DCI identified in CORESETs having the same higher layer index is applied to a scheduled PDSCH.

TABLE 16

1> ServingCell
  2> ServingCellIndex
  2> physCellId
  2> downlink
    3> ARFCN
    3> PDSCH-ServingCellConfig
      4> pucch-Cell
    3> BWP
      4> PDCCH-Config
        5> CORESET
          6> pdcch-DMRS-ScramblingID
        5> SearchSpace
      4> PDSCH-Config
        5> dataScramblingIdentityPDSCH
        5> DMRS
          6> scramblingID0
          6> scramblingID1
        5> TCI-States
  2> uplink
    3> ARFCN
    3> BWP
      4> PUCCH-Config TABLE 16-continued

```
    4> PUSCH-Config
        5> dataScramblingIdentityPUSCH
        5> DMRS
            6> scramblingID0
            6> scramblingID1
    4> SRS-Config
    4> RACH-Config
```

Various embodiments of the disclosure describe operations for determining a default QCL in a base station and a terminal. In the above various embodiments, description is provided considering a situation in which a beam for transmitting a PDCCH and a beam for transmitting a PDSCH are the same. On the other hand, according to the configuration of the base station or the TRP, the TRP may be decoupled such that a PDCCH beam (a beam for transmitting the PDCCH) and a PDSCH beam (a beam for transmitting the PDSCH) are not identical. For example, like when a PDCCH beam width is configured to be wide and a PDSCH beam width is configured to a narrow beam, the non-identically configured beams may include a case where beam widths are different, or a case where the beam widths are the same and different or adjacent beams are configured. At least two or more beam widths (e.g., level 1: a wide beam, level 2: a normal beam, level 3: a narrow beam, . . . , etc.) operated by the base station may be configured, and here, the base station may configure and use, as a beam for transmitting a PDCCH, a wide beam such as level 1, and as a beam for transmitting a PDSCH, the base station may configure and use narrow beams such as levels 2 and 3 in addition to level 1, for terminal(s), the throughput of which needs to be increased.

Even when the TRP configures the beam for transmitting a PDCCH and the beam for transmitting a PDSCH differently from each other, the terminal may perform a PDSCH receiving operation in a similar manner as rel-15. As an example, when a value of a scheduling time offset t_so calculated from a time when control information including information about allocation of a PDSCH is received to a time when the allocated PDSCH is received is less than UE capability parameter timeDurationForQCL (for example, 14 symbols), reported to the base station, the terminal may apply a QCL assumption applied to a lowest CORESET ID in a recent monitoring time (slot or occasion) (that is, the same QCL parameter) to reception of a PDSCH.

However, the above embodiment may be suitable in a situation where a beam for transmitting different PDCCHs and a beam for transmitting a PDSCH are the same. When the base station configure a beam for transmitting a PDCCH and a beam for transmitting a PDSCH to be different from each other in order to improve throughput, and when the t_so value is less than timeDurationForQCL, the terminal may use a default spatial QCL for receiving a PDSCH, and in the disclosure, a method for determining the default spatial QCL is proposed.

Embodiment 1

The base station and the terminal may configure a beam applied to the default QCL through MAC CE-based signaling. The terminal may check default (spatial) QCL-related information of a MAC CE received from the base station, and apply the checked information in an operation of receiving a PDSCH. That is, the terminal may receive MAC CE from the base station to check default QCL-related information, and when the received t_so value between the PDCCH and the PDSCH is less than timeDurationForQCL, the terminal may receive a PDSCH by applying, to a beam for receiving the PDSCH, the default QCL-related information configured by the MAC CE for PDSCH reception. Here, the default QCL-related information may include at least one of a QCL parameter, information related to TCI states, and information associated with DL-RS or UL-RS.

The MAC CE structure configured by the base station may (re)use and (re)interpret at least one of the MAC CE structures discussed in the existing rel-15/16.

As an example, when the terminal receives a TCI States Activation/Deactivation MAC CE message for a rel-15 based PDSCH as shown in FIG. 10-00 of FIG. 10A, the terminal may determine that a beam indicated by the default QCL of the PDSCH and a beam for transmitting the PDCCH are configured differently from each other. In detail, upon receiving the TCI States Activation/Deactivation message, the terminal may understand one TCI state as a TCI state corresponding to the default QCL, according to a set rule among activated TCI states. For example, according to the set rule, the TCI state corresponding to the default QCL may be defined as a TCI state indicated by an index having a lowest/highest index value among activated TCI states in the MAC CE message. When the terminal receives the MAC CE message indicating that serving cell ID #2, BWP #4, and values of T0 to T7 are all activated (1), the terminal may determine that the TCI corresponding to the default QCL in serving cell #2 and BWP #4 as being configured as a lowest TCI index (T0) or an index T7 which is a highest index, from among the activated TCI indexes.

As another example, the terminal may receive a TCI State Indication MAC CE message for the rel-15-based PDCCH as shown in FIGS. 10-50 of FIG. 10A, and understand a TCI state ID indicated together with CORESET 0 in the message, as a TCI state corresponding to a default QCL for a beam for transmitting a PDSCH. Here, the TCI state ID of the MAC CE message refers to an ID of the TCI states for the PDSCH configured in a higher layer (e.g., the TCI states ID included in tci-StatesToAddModList). That is, the terminal may receive a TCI State Indication MAC CE for a PDCCH from the base station, check information related to the default QCL, and when the received t_so values of the PDDCH and the PDSCH are less than timeDurationForQCL, the terminal may apply a TCI state indicated together with CORESET 0 for PDSCH reception, to a beam for receiving the PDSCH. As a result, when the terminal receives the PDSCH scheduled through the PDCCH transmitted in CORESET 0, a default QCL beam about the PDSCH may be the same as a beam configured for CORESET 0. When the beam for CORESET 0 is not configured by MAC-CE, a default beam for PDSCH reception may be a preset TCI state as in the above various embodiments.

As another example, when a portion of a beam list for PDCCH reception configured in the terminal (e.g., a beam list configured and released through tci-StatesPDCCH-ToAddList and tci-StatesPDCCH-ToReleaseList) is configured to overlap as a beam list for PDSCH reception (e.g., a beam list configured and released through tci-StatesToAddModList), the base station and the terminal may exclude the overlapped beams when configuring a default QCL for PDSCH reception. That is, the terminal may compare a reference RS and QCL type for each of the beams configured for PDCCH reception, with the reference RS and QCL types for each of the beams configured for the PDSCH reception, and when the reference RS and QCL types overlap in the PDCCH reception beam list and the PDSCH reception beam list, the beams may be excluded from the default QCL configuration for PDSCH reception. Alternatively, the terminal may not expect the base station to configure a beam that may be used redundantly for the PDCCH reception and the PDSCH reception as a default QCL for PDSCH reception.

The MAC CE structure configured by the base station may be composed of a new control element message (signaling) structure.

Here, the new message may be configured in the form of a message for configuring a default QCL for supporting single-TRP. For example, a MAC CE message for configuring a default QCL may include information (e.g., TCI index) indicating at least one state among TCI states for assuming a default QCL of the PDSCH. As another example, the message may directly or indirectly indicate a direction of a beam transmitted by the base station, by using information such as QCL type A/B/C/D or DL-RS/UL-RS index. The information refers to a direction of a beam assumed by the base station and the terminal for reception of a PDSCH, when time for the terminal to decode DCI including beam information for PDSCH reception, transmitted by one TRP, is not sufficient or time for the terminal to switch a beam and receive the PDSCH is not sufficient.

In addition, the message may be configured in the form of a message for configuring a default QCL for supporting multi-TRP. For example, the MAC CE message for setting the default QCL may include information (e.g., TCI index #1 or TCI index #2, etc.) indicating at least one TCI state among TCI states for a default QCL assumption of PDSCH(s). Here, when one TCI state is included in the message, the terminal may determine that the same one default QCL is indicated by multi-TRP or that one default QCL is indicated by single-TRP, and when two or more TCI states are included in the message, and the TCI states are different from each other, two or more different default QCLs are indicated by multi-TRP. In detail, when two or more TCI indexes are indicated in the message, the terminal may determine that the order of the TCI indexes is mapped according to the order of TRPs or the order of HigherLayerIndexPerCORESET index. Alternatively, the TRP index/HigherLayerIndexPerCORESET index and TCI indexes corresponding thereto may be indicated, respectively. In addition, when two or more TCI states are included in the message and the indicated TCI states are the same, the terminal may determine that the same default QCL is indicated.

For another example, a MAC CE message for configuring a default QCL may include information (e.g., TCI set index) indicating at least one TCI set (e.g., one pair constituting two, one set constituting three) from among TCI states for a default QCL assumption of PDSCH(s) transmitted from multi-TRP. Here, when the terminal receives the TCI set index, the terminal may determine that the TCI states previously designated by multi-TRP are indicated as the default QCL.

As another example, the message may directly or indirectly indicate a direction of a beam transmitted by the base station, by using information such as a plurality of QCL types A/B/C/D or DL-RS/UL-RS indexes. The information refers to a beam direction assumed by the base station and the terminal for reception of a PDSCH transmitted by one TRP, when time for the terminal to receive the PDSCH by performing beam switching on the PDSCH is not sufficient.

Additionally, the message may be configured as separate and distinct messages for single-TRP and multi-TRP, or may be configured as an integrated message composed of one type, respectively.

Also, as an example, a MAC CE message for configuring a multi-TRP-based default beam may be separately configured for single-DCI-based multi-TRP. As another example, for example, a MAC CE message for configuring a multi-TRP-based default beam may be separately configured for multi-DCI-based multi-TRP.

In addition, separately distinguished messages for the single-TRP and multi-TRP may be determined according to the TRP transmission/reception capability supported by the terminal. In addition, the MAC CE may be used in configuring an initial default QCL or may be considered in an additionally updated form.

Embodiment 2

In Embodiment 1, MAC CE message configuration and setting may be configured per component carrier (CC) or per BWP.

First, the MAC message configuration and setting may be configured in units of one CC. For example, the MAC CE message may indicate default QCL-related information applied to one CC (e.g., Primary CC/PCell/PSCell, secondary CC/SCell or across CC) and activated BWP. As another example, the MAC CE message may indicate default QCL-related information applied to one CC and at least one configured BWP(s). As another example, the MAC CE message may indicate default QCL-related information applied to one CC and default QCL-related information in all BWP(s) supported by the CC.

Second, the MAC message configuration and setting may be configured for a plurality of CCs at once. For example, the MAC CE message may indicate information related to default QCL applied in at least two or more CCs (e.g., including Primary CC/PCell/PSCell, secondary CC/SCell or across CC) and activated BWP. As another example, the MAC CE message may indicate default QCL-related information applied to at least two or more CCs and at least one or more configured BWP(s). As another example, the MAC CE message may indicate at least two or more CCs and default QCL-related information applied to all BWP(s) supported by the CCs.

Third, in the above embodiment, MAC CE message configuration and setting may be configured for each combination of CCs and/or BWPs configured to the terminal. In detail, in the MAC CE message, a factor indicating some or all of CC(s)/activated CCs(s) preset by higher layer signaling may be configured. The CC indicator may indicate at least one as shown in Table 17.

TABLE 17

When a set of CC for beam configuration/switching is configured by higher layer signaling
A factor indicating an index of the CC set or a set of indexes of the CC set →
MAC CE is applied to the indicated CC set.
A factor indicating a CC index included in the CC set → MAC CE is integrally
applied to CCs in some or all CC sets including the CC indexes.

TABLE 17-continued

When a set of CC for beam configuration/switching is not configured by higher layer signaling
A factor indicating a set/list of CC indexes is applied by MAC CE.
A factor indicating a combination of CCs is applied by MAC CE.

The MAC CE message may include default QCL-related information applied to the indicated CC as described above. Also, the MAC CE message may be applied to all BWP/activated BWP/BWP sets within the indicated CC. Here, the BWP set may be an explicitly indicated or implicitly agreed BWP set, and when explicitly indicated, may be indicated through higher layer configuration or MAC CE.

Fourth, in the above embodiment, the MAC CE message configuration and setting may be configured or additionally updated when the terminal switches the CC or BWP. In detail, the MAC CE message may indicate, to the terminal, default QCL-related information for each BWP, when an additional CC is activated, or when CC switching occurs, such as when a connected CC is deactivated and a new CC is activated. For example, the MAC CE message may indicate default QCL-related information applied to switched or updated CC(s) and activated BWP, in addition to CCs in which the terminal and the base station are currently communicating. As another example, the MAC CE message may indicate default QCL-related information applied to switched or updated CC(s) and at least one or more configured BWP(s). As another example, the MAC CE message may indicate default QCL-related information applied to all BWP(s) supported by the switched or updated CC(s).

Embodiment 3

A method of designating and updating a beam for default QCL based on the MAC CE message may be effectively used from a time point when the MAC CE message is configured. For example, after the terminal performs an initial access process, a duration in which the MAC CE message related to a default QCL configuration is not activated by the base station may occur. The duration may include a duration in which the default QCL configuration-related MAC CE message is not received and a predefined duration from a time the terminal receives the MAC CE message to when the corresponding received MAC CE is activated. When receiving each PDSCH before and after the duration described above, the default QCL may be configured as below.

First, until the MAC CE message for configuring the default QCL-related information transmitted by the base station is activated, the terminal may determine that a beam for transmitting a PDCCH transmitted by the base station is the same as a beam transmitting a PDSCH. When a value of scheduling time offset t_so calculated from a time when a CORESET including a PDCCH for allocating a PDSCH is received, to a time when the allocated PDSCH is received, is less than UE capability parameter timeDurationForQCL (for example, 14 symbols), reported to the base station, the terminal may equally apply a QCL assumption applied to a lowest CORESET ID in a recent monitoring time (slot or occasion) to reception of the PDSCH. Alternatively, when the above condition is satisfied, within a CORESET group in which the PDCCH which allocates the PDSCH is transmitted, the QCL assumption applied to the lowest CORESEST ID at the most recent monitoring time (slot or occasion) may be equally applied to reception of the PDSCH. When the MAC CE message for PDSCH default QCL configuration is activated in a specific CC or BWP but the MAC CE message is not activated in the remaining CCs or BWPs, the above operation may also be applied to the non-activated CC or BWP.

Second, the terminal may receive the PDSCH based on the default QCL-related information configured in the MAC CE message as described in Embodiments 1 and 2 after activation of the MAC CE message for configuring the default QCL-related information transmitted by the base station. When the value of scheduling time offset t_so calculated from a time when control information for allocating a PDSCH is received via a CORESET, to a time when the allocated PDSCH is received, is less than UE capability parameter timeDurationForQCL (for example, 14 symbols), reported to the base station, the terminal may apply a QCL parameter such that the PDSCH is received based on QCL-related information indicated by the MAC CE.

Third, after the terminal receives the MAC CE message for configuring the default QCL-related information, transmitted from the base station, when a code point value of a Transmission configuration indication (TCI) field is indicated in DCI format 1_1, as described in Embodiments 1 and 2, the terminal may receive a PDSCH based on the default QCL-related information configured in the MAC CE message. The TCI field may be applied when a higher layer parameter tci-PresentInDCI is enabled.

Fourth, when the base station does not configure the higher layer parameter tci-PresentInDCI to enable or configures the same by switching the same to disable, to the terminal, the terminal may not expect a MAC CE message-based default QCL configuration. Alternatively, when the base station does not configure the higher layer parameter tci-PresentInDCI to enable, for the terminal, the terminal may not apply the default QCL-related information indicated in the MAC CE, to reception of the PDSCH even when receiving the MAC CE message for default QCL configuration, transmitted by the base station. As a result, when the value of scheduling time offset t_so calculated from a time when control information for allocating a PDSCH is received via a CORESET, to a time when the allocated PDSCH is received, is less than UE capability parameter timeDurationForQCL (for example, 14 symbols), reported to the base station, the terminal may equally apply the QCL assumption applied to the lowest CORESET ID in the recent monitoring time (slot or occasion), to reception of the PDSCH. Alternatively, when the above condition is satisfied, within the CORESET group in which the PDCCH which allocates the PDSCH is transmitted, the QCL assumption applied to the lowest CORESEST ID at the most recent monitoring time (slot or occasion) may be equally applied to reception of the PDSCH.

Fifth, when the base station performs cross-carrier scheduling or cross-BWP scheduling with respect to PDSCH, and PDSCH default QCL through MAC CE is not configured in a specific CC or BWP, the terminal may perform the same operation as an operation prior to activation of the MAC CE message described above, in the specific CC or BWP.

For example, when the value of scheduling time offset t_so calculated from a time when control information for scheduling a PDSCH allocated to cross-carrier or cross-BWP is received via a CORESET, to a time when the PDSCH allocated to the cross-carrier or cross-BWP is received, is less than the UE capability parameter timeDurationForQCL (for example, 14 symbols), reported to the base station, the terminal may apply the QCL assumption applied to the lowest CORESET ID in the recent monitoring time (slot or occasion), as the same QCL parameter, to reception of the PDSCH. Alternatively, when the value of scheduling time offset t_so calculated from a time when a CORESET in a CORESET group including a PDCCH for scheduling a PDSCH allocated to cross-carrier or cross-BWP is received, to a time when the PDSCH allocated to the cross-carrier or cross-BWP is received, is less than the UE capability parameter timeDurationForQCL (for example, 14 symbols), reported to the base station, the terminal may apply, in the CORESET group in which the PDCCH for allocating the PDSCH is allocated is transmitted, the QCL assumption applied to the lowest CORESET ID at the most recent monitoring time (slot or occasion), as the same QCL parameter, to reception of the PDSCH.

FIGS. 11 and 16 to 18 illustrate that a plurality of TRPs transmit a plurality of PDSCHs to a certain terminal through a single PDCCH. Here, various schemes may exist according to aspects of PDSCHs allocated by TRPs to the terminal. A scheme according to PDSCH transmission may be divided as below.

Scheme 1 (Spatial Domain Multiplexing (SDM)): A scheme in which the base station allocates, to the terminal, a PDSCH based on n TCI states smaller than $N_s$ (the maximum number of supportable TCI states) in a single slot; each PDSCH being transmitted overlaps each other in a time and frequency domain.

Scheme 2 (Frequency Domain Multiplexing (FDM)): A scheme in which the base station allocates, to the terminal, a PDSCH based on n TCI states smaller than $N_f$ (the maximum number of supportable TCI states) in a single slot; each PDSCH being transmitted does not overlap each other in a time and frequency domain (non-overlapped).

Scheme 3 (Time Domain Multiplexing (TDM)): A scheme in which the base station allocates, to the terminal, a PDSCH based on n TCI states smaller than $N_{t1}$ (the maximum number of supportable TCI states) in a single slot; each PDSCH being transmitted does not overlap each other in a time domain (non-overlapped).

Scheme 4 (Time Domain Multiplexing (TDM)): A scheme in which the base station allocates, to the terminal, a PDSCH based on n TCI states smaller than $N_{t2}$ (the maximum number of supportable TCI states) in a multi-slot; each PDSCH being transmitted does not overlap each other in a time domain (non-overlapped).

The maximum number of TCI States in Scheme 3 or 4 may be two or more, for example, based on 3GPP rel-16. In addition, the same number of consecutive symbols may be supported when transmitted once from TRP. For example, when a first PDSCH transmitted to the terminal consists of two symbols, second and subsequent PDSCHs may all consist of two symbols, respectively. In addition, the maximum number of layers transmitted per TRP may be at least two or more. A maximum TB size supported may be determined based on the capability of the terminal.

In Scheme 3, the number of times a PDSCH is transmitted may be determined by the number of TCI states indicated in a codepoint of a TCI field in DCI. For example, by checking a TCI field in DCI received by the terminal, when the number of states is one, it may mean that the PDSCH allocated by the base station is transmitted once, and when there are two states, it may mean that the PDSCH is transmitted twice. Here, an offset value Koffset indicating an offset by a certain symbol or slot between PDSCHs in a time domain in transmission of the first PDSCH and transmission of the second and subsequent PDSCHs may be configured. For example, a first symbol of the second transmission may be allocated apart from a last symbol of the first transmission by the number of Koffset symbols. Here, the value of Koffset may be configured by a related RRC parameter. In this case, when Koffset is not separately configured in RRC, the terminal considers Koffset to be 0.

In Scheme 4, the base station may indicate the terminal the number of times of transmitting a PDSCH by using the PDSCH-TimeDomainResourceAllocation field for Time-domain resource Allocation (TDRA). Here, as a method of indicating PDSCH resource allocation, information about an SLIV field indicating a start position, length, and offset of a PDSCH symbol may be used directly or indirectly. In addition, a value of SLIV applied to the first PDSCH allocated to the base station may be equally applied a second PDSCH and other, a plurality of PDSCHs transmitted thereafter.

RVid indicated by DCI may indicate selection of one redundancy version (RV) sequence. The base station transmits data according to the configured RVid, and in this case, data having the same $RV_{id}$ has the same data. In general, a transmission sequence of RV includes, as a basis, transmitting four times repeatedly, and in each transmission, data having numbers of an $RV_{id}$ of 0, 2, 3, 1 or 0, 0, 0, 0 or 0, 3, 0, 3 may be transmitted. The sequence as above may be performed to obtain a gain through soft combining, when the terminal receives re-transmitted data. An RV sequence transmitted from each TRP may be defined as below.

A selected RV sequence is determined in association with a first TRP (first TCI state), and an RV sequence associated with a second TRP is determined by an RV offset from the selected RV sequence.

RV offset is determined by a configured RRC value.

Two options for TCI state mapping for PDSCH transmission are supported, and switching is determined by RRC.

Option 1: cyclical mapping (when two TCI states are indicated, mapped to #1 #2 #1 #2)

Option 2: sequential mapping (when two TCI states are indicated, mapped to #1 #1 #2 #2)

Figure 16:
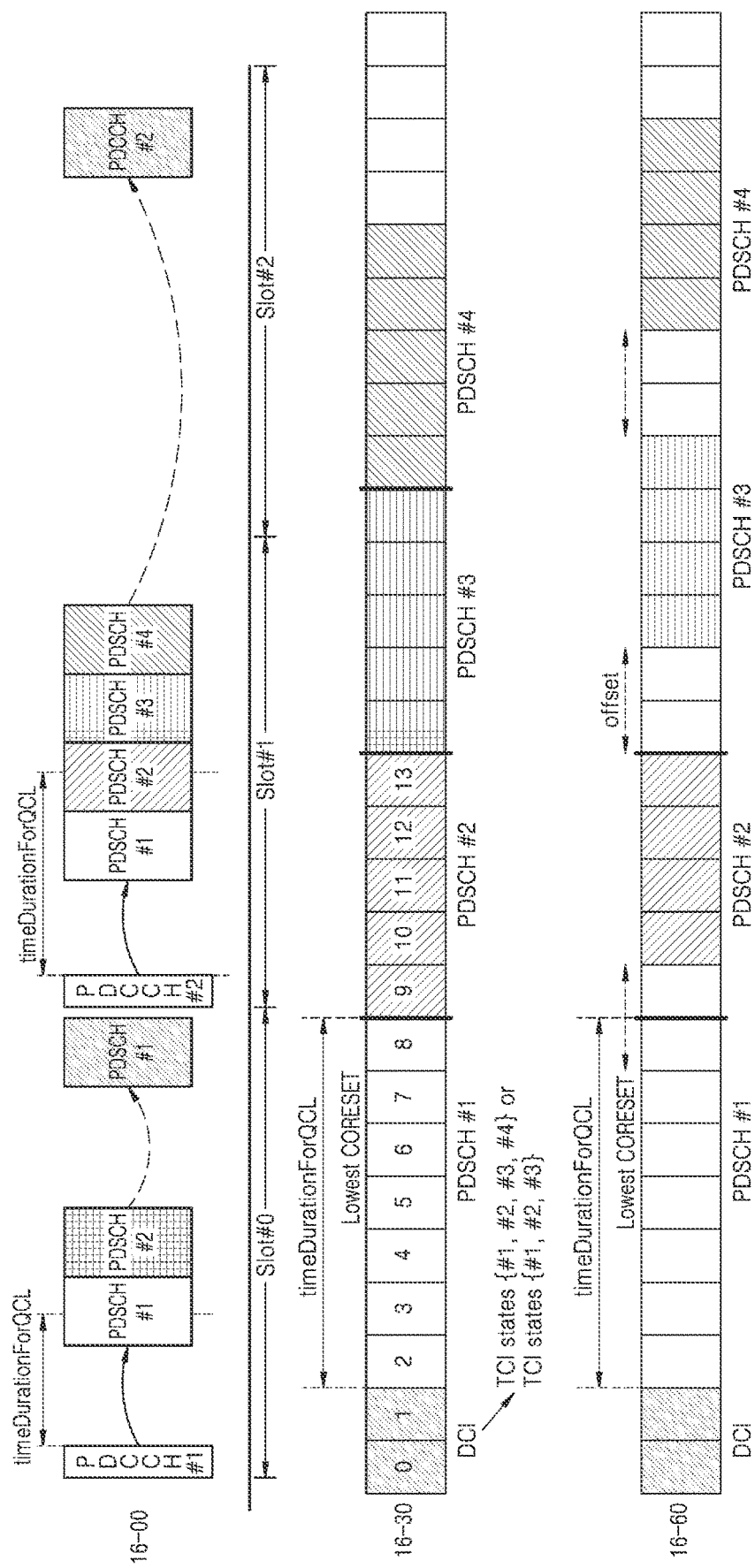
FIGS. 16 to 18 are diagrams for describing a process of transmitting, by a plurality of TRPs according to an embodiment of the disclosure, a plurality of PDSCHs to a certain terminal through a single PDCCH.
Figure 17:
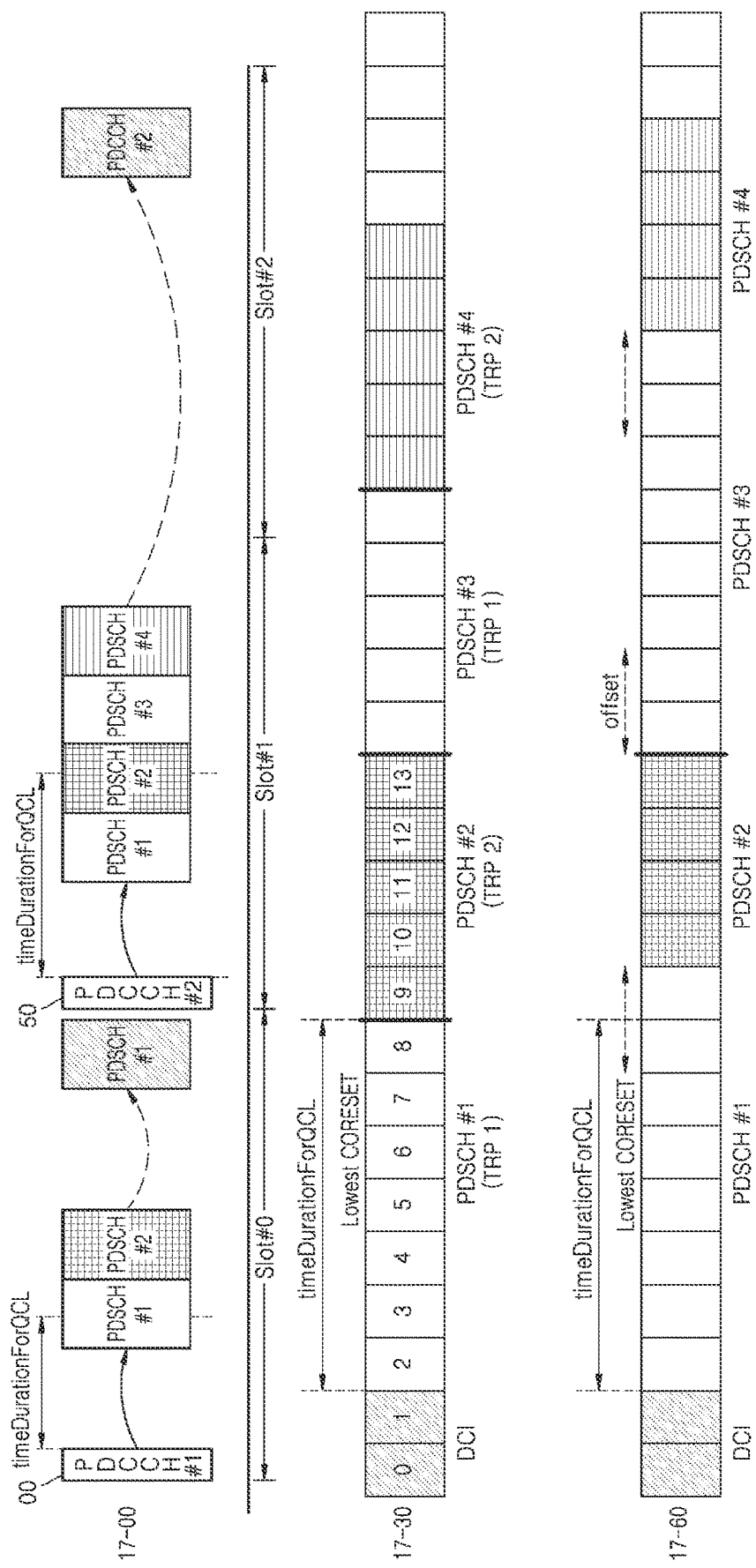
Figure 18:
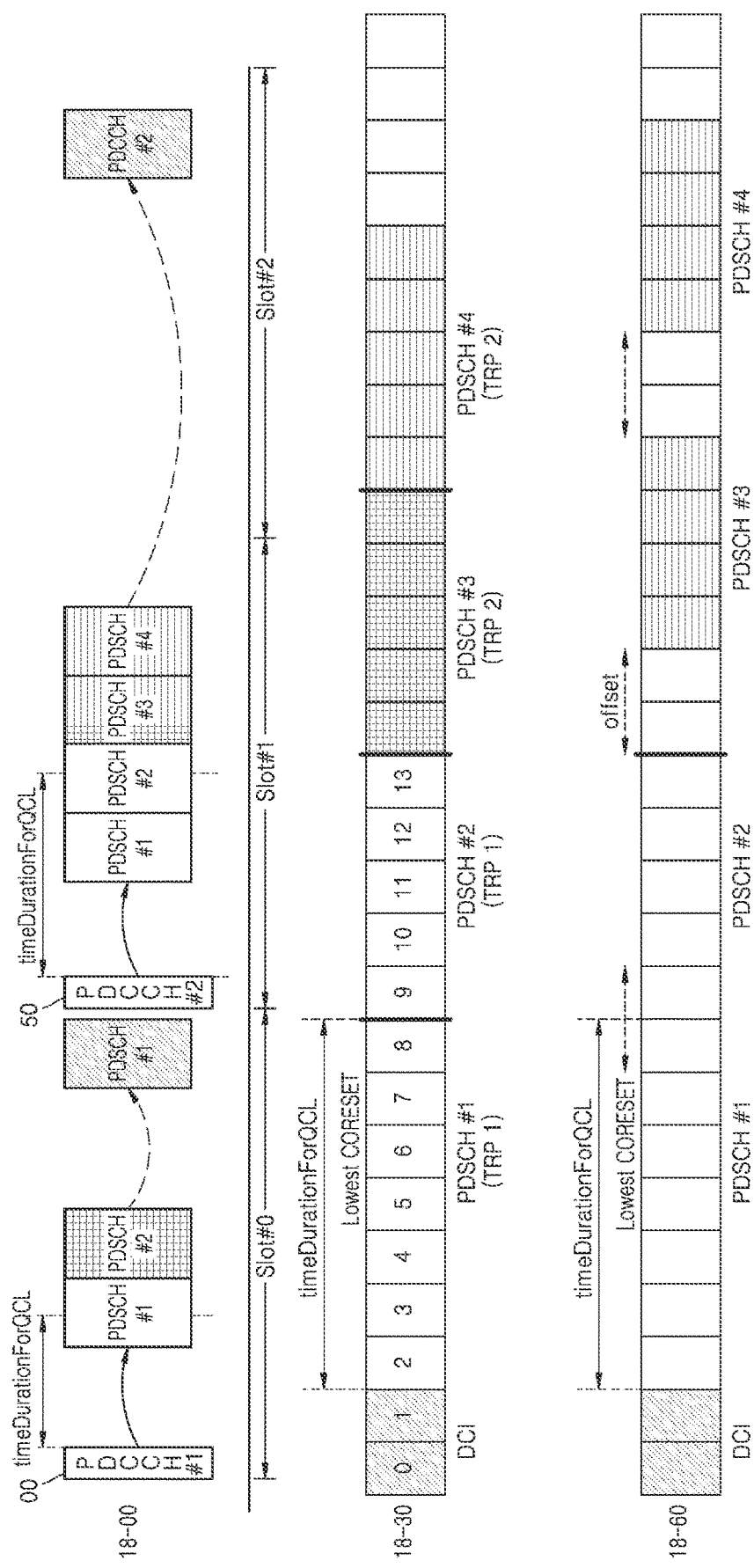

FIGS. 16 to 18 are diagrams for describing a process of transmitting, by a plurality of TRPs according to an embodiment of the disclosure, a plurality of PDSCHs to a certain terminal via a single PDCCH.

Referring to FIGS. 16 to 18, FIGS. 16-00, 17-00, and 18-00 correspond to a case in which Koffset between a plurality of PDSCHs allocated to the terminal by the base station based on Schemes 3 and 4 is 0. In particular, the base station may transmit a first PDCCH and first and second PDSCHs corresponding thereto to the terminal, and in some cases, may transmit a second PDCCH and first to fourth PDSCHs corresponding thereto subsequently or after a certain period of time. The terminal may receive a plurality of PDSCHs and transmit HARQ ACK/NACK to PUCCHs #1 and #2 indicated to the PDCCH configured by the base station according to whether decoding is successful. A plurality of PDSCHs scheduled by a single PDCCH may repeatedly transmit the same data (e.g., an indicated RV value is the same).

Alt 1-1

In detail, the number of TCI states transmitted by TRPs or the number of TRPs transmitting PDSCH may be the same as the number of PDSCHs repeatedly transmitted as in Pattern 1.

Here, Pattern 1 may be as below.
Pattern 1: the number of TCI states (number of TRPs)=number of repetitions
(Pattern 1: Number of TCI states (number of TRPs)=number of repetitions)

For example, the terminal may check that TCI states {#1, #2, #3, #4} are indicated through TCI codepoint in DCI, and as in 16-00, that it is indicated to apply TCI state #1 ton the first PDSCH, TCI state #2 to the second PDSCH, TCI state #3 to the third PDSCH, and TCI state #4 to the fourth PDSCH. As described above, the terminal identifying the DCI may determine a direction of a reception beam through a determination process as below as to whether the indicated states are applied.

First, when the number of TCI states indicated by TCI in DCI from the base station is the same as the number of repeatedly transmitted PDSCHs, the location of the time-side resource of PDSCH(s) to which TCI states are applied and timeDurationForQCL are compared to determine whether TCI states are applied.

As an example, when the time point at which TCI states are applied to PDSCHs is later than a location based on the configured timeDurationForQCL, the terminal may sequentially allocate all TCI state information indicated in DCI to the PDSCH. That is, when a transmission time (start time) of PDSCHs scheduled to apply the TCI states is greater than or equal to symbol 9, the terminal identifying that a last symbol index of a PDCCH transmitted by the base station is 2 and the configured timeDurationForQCL value is 7 may receive the PDSCHs by sequentially applying TCI state #1 to the first PDSCH, TCI state #2 to the second PDSCH, TCI state #3 to the third PDSCH, and TCI state #4 to the fourth PDSCH.

As another example, when the transmission time (start time) of PDSCHs scheduled to apply the TCI states is greater than or equal to symbol number 1 of a next slot, the terminal identifying that the last symbol index of the PDCCH transmitted by the base station is 2 and the configured timeDurationForQCL value is 14, the terminal may receive the PDSCHs by sequentially applying TCI state #1 to the first PDSCH, TCI state #2 to the second PDSCH, TCI state #3 to the third PDSCH, and TCI state #4 to the fourth PDSCH.

Alt 1-2

The terminal receiving a plurality of PDSCHs, for which TCI states are indicated, from the base station, may, when a time when the TCI states are applied to the PDSCHs is earlier than the location based on the configured timeDurationForQCL, not completely sequentially allocate all TCI state information indicated by DCI to the PDSCH.

As an example, when at least one symbol of a first PDSCH (e.g., a first PDSCH) among a plurality of PDSCHs exists in a location based on timeDurationForQCL, the terminal receiving a plurality of PDSCHs, for which TCI states are indicated, from the base station, may not apply TCI state #1 indicated by the first PDSCH, but apply a default spatial QCL. The default spatial QCL refers to a QCL parameter used in reception of a PDCCH in a CORESET associated with a monitored search space having a lowest CORESET ID in a most recent slot. And, the terminal may sequentially receive the PDSCHs by applying TCI state #2 to the second PDSCH, TCI state #3 to the third PDSCH, and TCI state #4 to the fourth PDSCH. That is, as shown in 16-30, while the base station has indicated the terminal to apply TCI state #1 to the first PDSCH, when a start symbol of the first PDSCH is symbol number 4 and a symbol length is 5, the terminal that has identified that the last symbol index of the PDCCH is 2 and the timeDurationForQCL value is 7, performs beamforming for PDSCH reception by allowing the first PDSCH to follow the default spatial QCL, and applying the TCI states #2 to #4 indicated by the TCI in DCI to the second to fourth PDSCHs, respectively.

As another example, when at least one symbol of a second PDSCH (e.g., the first PDSCH) among a plurality of PDSCHs exists in a location based on timeDurationForQCL, the terminal receiving a plurality of PDSCHs, for which TCI states are indicated, from the base station, may not apply TCI state #1, #2 indicated by the first and second PDSCHs, but apply a default spatial QCL. The default spatial QCL refers to a QCL parameter used in reception of the PDCCH in the CORESET associated with the monitored search space having the lowest CORESET ID in the most recent slot. And, the terminal may sequentially receive the PDSCHs by applying TCI state #3 to the third PDSCH and TCI state #4 to the fourth PDSCH. That is, while the base station has indicated the terminal to apply TCI state #1, #2 to the first and second PDSCHs, when the start symbol of the first PDSCH is symbol number 5 and the symbol length is 3, the terminal that has identified that the last symbol index of the PDCCH is 2 and the timeDurationForQCL value is 7, performs beamforming for PDSCH reception by allowing the first and second PDSCHs to follow the default spatial QCL, and applying TCI states #3 and #4 indicated by the TCI in DCI to the remaining third and fourth PDSCHs.

default spatial QCL may also be extended as below besides the above-described meaning.

1) the above-described meaning, that is, a QCL parameter used in reception of the PDCCH in the CORESET associated with the monitored search space having the lowest CORESET ID in the most recent slot.
2) default spatial QCL for PDSCH configured by MAC-CE, etc. Here, the default spatial QCL may be configured with the same value for all TRPs, or may be configured differently for each TRP.
3) Default spatial QCL for PDSCH may refer to a value having a lowest ID among TCI states for PDSCH configured by RRC or a value having a lowest ID among TCI states for PDSCH activated by MAC-CE.

Depending on the situation, different default spatial QCLs may be applied. For example, in the case of cross-carrier scheduling or cross-BWP scheduling, 3) may be applied, and in other cases, 1) or 2) may be applied. When the terminal supports MAC-CE that configures the default spatial QCL for PDSCH, 1) may be applied before activating the corresponding MAC-CE, and 2) may be applied thereafter.

Alt 1-3

As another example, in particular, in the case of Scheme 3, when start positions of all of the plurality of overlapping PDSCHs are less than timeDurationForQCL, the terminal receiving the PDSCH, for which TCI states are indicated, from the base station, in slot 0/1 of 16-00, may not apply the TCI states indicated for the first PDSCH—the second PDSCH or the first PDSCH—the fourth PDSCH but apply default spatial QCL. Here, one, two, or four default QCLs may be configured and operated based on single-PDCCH default QCL enhancement. That is, in slot 1, although the base station has indicated the terminal to apply TCI states #1 to #4 to the first to fourth PDSCHs, when the start symbol of the first PDSCH is symbol 4 and the symbol length is 1, the terminal that has identified that the last symbol index of the PDCCH is 2 and the timeDurationForQCL value is 7 may allow the first to fourth PDSCHs to follow the default spatial QCL, because the symbol index of the start position of all of the plurality of, overlapping PDSCHs (symbol numbers 4, 5, 6, 7) is less than the symbol index (number 9) of a location in consideration of timeDurationForQCL. In this case, one, two, or four configured default QCL may be configured or determined, and the PDSCHs may be received by applying the same.

Alt 1-4

When the terminal receiving the plurality of PDSCHs, for which TCI states are indicated, from the base station is earlier than a location based on the configured timeDurationForQCL when the time when the TCI states are applied to the PDSCHs, the terminal may not apply the TCI states indicated for the first PDSCH to the fourth PDSCH regardless of the location of the overlapping PDSCH, but apply default spatial QCL to the first PDSCH to the fourth PDSCH.

Alt 2

As an example, when at least one symbol of a first PDSCH (e.g., the first PDSCH) among the plurality of PDSCHs exists in a location based on timeDurationForQCL, the terminal receiving the plurality of PDSCHs, for which TCI states are indicated, from the base station, may not apply TCI state #1 indicated by the PDSCH, but apply the default spatial QCL, and sequentially apply TCI state #1 to the second PDSCH, TCI state #2 to the third PDSCH, and TCI state #3 to the fourth PDSCH. That is, as shown in 16-30, although the base station has indicated the terminal to apply TCI state #1 to the first PDSCH, when the start symbol of the first PDSCH is symbol number 4 and the symbol length is 5, the terminal that has identified that the last symbol index of the PDCCH is 2 and the timeDurationForQCL value is 7 performs beamforming for PDSCH reception by allowing the first PDSCH to follow the default spatial QCL, and applying TCI states #1 to #3 indicated by TCI in DCI to the second to fourth PDSCHs. As described above, the base station may variably indicate TCI-related information in DCI by considering the default QCL of the terminal in advance. That is, the base station may predict default QCL in which the terminal operates, and indicate TCI states of {#1, #2, #3}, {#1, #2} or {#1} instead of {#1, #2, #3, #4} by considering default QCL. Here, the base station may dummy-pad a higher layer parameter field related to a TCI field or TCI states.

FIG. 16-60 shows a case where Koffset between a plurality of PDSCHs allocated to the terminal by the base station is not 0 (the value of Koffset is configured to 2) in various embodiments of Alt1 and Alt2. Here, a condition to be changed to Koffset is that, when the location based on timeDurationForQCL is in an offset region located between PDSCHs on the time domain, the terminal may consider PDSCH(s) existing before the offset as a region for determining whether the default QCL is applied. For example, when the transmission time (start time) of PDSCHs scheduled to apply the TCI states is greater than or equal to symbol 9, the terminal that has identified that the last symbol index of the PDCCH transmitted by the base station is 2 and the configured timeDurationForQCL value is 7 may receive by sequentially applying TCI state #1 to the first PDSCH, TCI state #2 to the second PDSCH, TCI state #3 to the third PDSCH, and TCI state #4 to the fourth PDSCH.

As another example, although the base station has indicated the terminal to apply TCI state #1 to the first PDSCH, when the start symbol of the first PDSCH is symbol number 4, the symbol length is 4, and Koffset is 2, the terminal that has identified that the last symbol index of the PDCCH is 2 and the timeDurationForQCL value is 7 may further identify that the timeDurationForQCL exists in an offset region between the first PDSCH and the second PDSCH or in a region before the second PDSCH, and allow the first PDSCH to follow the default spatial QCL, and the various embodiments (alt1-2) above may be reflected in the remaining second PDSCH to the fourth PDSCH.

As another example, in particular, in the case of Scheme 3, when the start positions of all of the plurality of overlapping PDSCHs are less than timeDurationForQCL, the terminal receiving the PDSCH, for which TCI states are indicated, from the base station in slot 0/1 of 17-00 may not apply the TCI states indicated for the first PDSCH—the second PDSCH or the first PDSCH—the fourth PDSCH but apply default spatial QCL. Here, one or two default QCLs may be configured and operated based on single-PDCCH default QCL enhancement. That is, in slot 1, although the base station has indicated the terminal to apply TCI states #1 to #2 to the first to fourth PDSCHs, when the start symbol of the first PDSCH is symbol 4 and the symbol length is 1, the terminal that has identified that the last symbol index of the PDCCH is 2 and the timeDurationForQCL value is 7 may allow the first to fourth PDSCHs to follow the default spatial QCL, because the symbol index of the start position of all of the plurality of overlapping PDSCHs (symbol numbers 4, 5, 6, 7) is less than the symbol index (number 9) of a location in consideration of timeDurationForQCL. Here, two configured default QCL may be configured or determined, and the PDSCHs may be received by applying the same.

default spatial QCL may also be extended as below besides the above-described meaning.

1) the above-described meaning, that is, a QCL parameter used in reception of the PDCCH in the CORESET associated with the monitored search space having the lowest CORESET ID in the most recent slot.
2) default spatial QCL for PDSCH configured by MAC-CE, etc. Here, the default spatial QCL may be configured to the same value for all TRPs, or may be configured differently for each TRP.
3) Default spatial QCL for PDSCH may refer to a value having the lowest ID among the TCI states for PDSCH configured by RRC or a value having the lowest ID among TCI states for PDSCH activated by MAC-CE.

Depending on the situation, different default spatial QCLs may be applied. For example, in the case of cross-carrier scheduling or cross-BWP scheduling, 3) may be applied, and in other cases, 1) or 2) may be applied. When the terminal supports MAC-CE that configures the default spatial QCL for PDSCH, 1) may be applied before activating the corresponding MAC-CE, and 2) may be applied thereafter.

Alt 3, 4

As shown in FIGS. 17 and 18, in detail, the number of TCI states transmitted by TRPs or the number of TRPs transmitting PDSCH may be less than the number of PDSCHs repeatedly transmitted as in Pattern 2.

Here, Pattern 2d may be as below.

Pattern 2: the number of TCI states (number of TRPs) <number of repetitions (Pattern 2: Number of TCI states (number of TRPs) <number of repetitions)

For example, the terminal may check the PDCCH and that TCI states {#1, #2} are indicated through the TCI codepoint in DCI, and check that the PDSCH is repeatedly transmitted a total of four times. As such, the method for the base station to transmit the PDSCH four times may be classified as below according to a method of applying TCI states.

Scheme 1: Cyclical mapping method (e.g., $1^{st}$ occasion—#1 for TRP1, $2^{nd}$ occasion—#2 for TRP2, $3^{rd}$ occasion—#1 for TRP1, $4^{th}$ occasion—#2 for TRP2), when corresponding TCI states are indicated as many times as each TRP is repeatedly transmitted (Example: two times).

Scheme 2: Sequential mapping method (e.g., $1^{st}$ occasion—#1 for TRP1, $2^{nd}$ occasion—#1 for TRP1, $3^{rd}$ occasion—#2 for TRP1, $4^{th}$ occasion—#2 for TRP2), when each TRP corresponds to one TCI state and performs repeated transmission (e.g., two times).

As shown in FIG. 17, in the case of Scheme 1 (Cyclical mapping method), TRP 1 transmits by applying TCI state #1 to the first PDSCH, to the terminal, and TRP 2 may transmit by applying the TCI state #2, to the second PDSCH. In succession, TRP 1 may transmit by applying TCI state #1 to the third PDSCH, and TRP 2 by applying TCI state #2 to the fourth PDSCH.

Unlike the above, in the case of Scheme 2 (Sequential mapping method) as FIG. 18, TRP 1 may transmit to the terminal twice by applying TCI state #1 to the first PDSCH and the second PDSCH. Next, TRP 2 may transmit twice by applying TCI state #2 to the third PDSCH and the fourth PDSCH.

The base station may configure a higher layer parameter such that the terminal distinguishes Scheme 1 from Scheme 2. For example, when the base station configures a value for RRC parameter RepTCIMapping to 'CycMapping' to the terminal, the terminal may operate in Scheme 1, and when a value for the parameter is configured to 'SeqMapping', the terminal may operate in Scheme 2.

The base station may utilize a separate field in DCI to distinguish Scheme 1 and Scheme 2 from each other, or may utilize an existing TCI field. Alternatively, a parameter or bit resource for distinguishing Scheme 1 and Scheme 2 may be used in RRC. That is, the terminal identifying the DCI may determine a direction of a reception beam through a determination process as below as to whether the indicated states are applied.

Alt 3-1

When values of TCI states indicated to each TRP are less than the number of repeatedly transmitted PDSCHs, the terminal may check whether the method is Scheme 1, and compare the location of the time-side resource of PDSCH(s), to which TCI states are applied, and timeDurationForQCL to determine whether TCI states are applied.

As an example, when a time point at which TCI states are applied to PDSCHs in Scheme 1 is later than a location based on the configured timeDurationForQCL, the terminal may consider that all TCI state information indicated in DCI is cyclically mapped to the PDSCH. That is, when a transmission time (start time) of PDSCHs scheduled to apply the TCI states is greater than or equal to symbol number 9, the terminal that has identified that the last symbol index of the PDCCH transmitted by the base station is 2 and the configured timeDurationForQCL value is 7 may receive by sequentially applying TCI state #1 to the first PDSCH allocated in TRP 1, TCI state #2 to the second PDSCH allocated in TRP 2, TCI state #1 to the third PDSCH allocated in TRP 1, and TCI state #2 to the fourth PDSCH allocated in TRP2.

As another example, when the transmission time (start time) of PDSCH(s) scheduled to apply the TCI states is greater than or equal to symbol number 1 of a next slot, the terminal that has identified that the last symbol index of the PDCCH transmitted by the base station is 2 and the configured timeDurationForQCL value is 14 may receive by sequentially applying TCI state #1 to the first PDSCH allocated in TRP 1, TCI state #2 to the second PDSCH allocated in TRP 2, TCI state #1 to the third PDSCH allocated in TRP 1, and TCI state #2 to the fourth PDSCH allocated in TRP2.

Alt 3-2

The terminal receiving a plurality of PDSCHs, for which TCI states are indicated, from the base station, may, when a time when the TCI states are applied to the PDSCHs is earlier than the location based on the configured timeDurationForQCL, not completely sequentially allocate all TCI state information indicated by DCI to the PDSCH.

As an example, as shown in FIG. 17-00, when at least one symbol of a first PDSCH (e.g., a first PDSCH) among a plurality of PDSCHs exists in a location based on timeDurationForQCL, the terminal receiving a plurality of PDSCHs, for which TCI states are indicated, from the base station, may not apply TCI state #1 indicated by the first PDSCH, but apply default spatial QCL. The default spatial QCL refers to a QCL parameter used in reception of the PDCCH in the CORESET associated with the monitored search space having the lowest CORESET ID in the most recent slot. And the terminal may receive by sequentially applying TCI state #2 to the second PDSCH allocated in TRP 2, TCI state #1 to the third PDSCH allocated in TRP 1, and TCI state #2 to the fourth PDSCH allocated in TRP 2. That is, although the base station has indicated the terminal to apply TCI state #1 to the first PDSCH as shown in FIG. 17-30, when the start symbol of the first PDSCH is symbol number 4 and the symbol length is 5, the terminal that has identified that the last symbol index of the PDCCH is number 2 number and the value of timeDurationForQCL is 7 may allow the first PDSCH to follow the default spatial QCL, and receive the PDSCHs by applying TCI #2 to the second PDSCH in which the symbol index allocated in TRP 2 start from number 9, TCI state #1 to the third PDSCH in which the symbol index starts from the symbol number 0 of a next slot allocated in TRP1, and TCI state #2 to the fourth PDSCH allocated in TRP 2 in which the symbol index starts from symbol number 5 of a next slot.

The default spatial QCL of the first PDSCH or the second PDSCH may correspond to at least one of TRP1, TRP2, or TRP that has transmitted DCI.

Alt 3-3

As an example, when at least one symbol of a first PDSCH (e.g., a first PDSCH) among a plurality of PDSCHs exists in a location based on timeDurationForQCL, the terminal receiving a plurality of PDSCHs, for which TCI states are indicated, from the base station may not apply TCI state #1 indicated by the first PDSCH, but apply default spatial QCL. And the terminal may receive by sequentially applying TCI state #2 to the second PDSCH allocated in TRP 2, default QCL applied to the first PDSCH, instead of TCI state #1, to the third PDSCH allocated in TRP 1, and TCI state #2 to the fourth PDSCH allocated in TRP 2.

As another example, when at least one symbol of a second PDSCH (e.g., the first PDSCH) among a plurality of PDSCHs exists in a location based on timeDurationForQCL, the terminal receiving a plurality of PDSCHs, for which TCI states are indicated, from the base station, may not apply TCI state #1, #2 indicated by the first and second PDSCHs, but apply default spatial QCL. The terminal may sequentially apply the default QCL applied to the first PDSCH, to the third PDSCH allocated in TRP1, instead of TCI state #1, and apply the default spatial QCL applied to the second PDSCH, to the fourth PDSCH allocated in TRP2, instead of TCI state #2. The default spatial QCL applied to the first PDSCH and the default spatial QCL applied to the second PDSCH may be equally applied when they are identical, and may be differently applied when they are differently configured. Alternatively, the default spatial QCL of the first PDSCH may correspond to at least one of TRP1, TRP2, or TRP that has transmitted DCI.

Alt 3-4

For example, in particular, in the case of Scheme 3, when the start position of all of the plurality of overlapping PDSCHs is less than timeDurationForQCL, the terminal receiving the PDSCH, for which TCI states are indicated, from the base station in slot 0/1 of 18-00, may not apply the TCI states indicated for the first PDSCH—the second PDSCH or the first PDSCH—the fourth PDSCH but apply default spatial QCL. Here, one or two default QCLs may be configured and operated based on single-PDCCH default QCL enhancement. That is, in slot 1, although the base station has indicated the terminal to apply TCI states #1 to #2 to the first to fourth PDSCHs, when the start symbol of the first PDSCH is symbol 4 and the symbol length is 1, the terminal that has identified that the last symbol index of the PDCCH is 2 and the timeDurationForQCL value is 7 may allow the first to fourth PDSCHs to follow the default spatial QCL, because the symbol index of the start position of all of the plurality of overlapping PDSCHs (symbol numbers 4, 5, 6, 7) is less than the symbol index (number 9) of a location in consideration of timeDurationForQCL. In this case, two configured default QCL may be configured or determined, and the PDSCHs may be received by applying the same.

Alt 4-1

When values of TCI states indicated to each TRP are less than the number of repeatedly transmitted PDSCHs, the terminal may check whether the method is Scheme 2, and compare the location of the time-side resource of PDSCH(s), to which TCI states are applied, and timeDurationForQCL to determine whether TCI states are applied.

As an example, when a time point at which TCI states are applied to PDSCHs in case 1 is later than the location based on the configured timeDurationForQCL, the terminal may consider that all TCI state information indicated in DCI is sequentially mapped to the PDSCH. That is, when a transmission time (start time) of PDSCHs scheduled to apply the TCI states is greater than or equal to symbol number 9, the terminal that has identified that the last symbol index of the PDCCH transmitted by the base station is 2 and the configured timeDurationForQCL value is 7 may receive by sequentially applying TCI state #1 to the first PDSCH allocated in TRP 1, TCI state #2 to the second PDSCH allocated in TRP 1, TCI state #2 to the third PDSCH allocated in TRP 2, and TCI state #4 to the fourth PDSCH allocated in TRP2.

As another example, when the transmission time (start time) of PDSCH(s) scheduled to apply the TCI states is greater than or equal to symbol number 1 of a next slot, the terminal that has identified that the last symbol index of the PDCCH transmitted by the base station is 2 and the configured timeDurationForQCL value is 14 may receive by sequentially applying TCI state #1 to the first PDSCH allocated in TRP 1, TCI state #1 to the second PDSCH allocated in TRP 1, TCI state #2 to the third PDSCH allocated in TRP 1, and TCI state #2 to the fourth PDSCH allocated in TRP 2.

Alt 4-2

The terminal receiving a plurality of PDSCHs, for which TCI states are indicated, from the base station, may, when a time when the TCI states are applied to the PDSCHs is earlier than the location based on the configured timeDurationForQCL, not completely sequentially allocate all TCI state information indicated by DCI to the PDSCH.

As an example, as shown in FIG. 18-00, when at least one symbol of a first PDSCH (e.g., a first PDSCH) among a plurality of PDSCHs exists in a location based on timeDurationForQCL, the terminal receiving a plurality of PDSCHs, for which TCI states are indicated, from the base station, may not apply TCI state #1 indicated by the first PDSCH, but apply default spatial QCL. The default spatial QCL refers to a QCL parameter used in reception of the PDCCH in the CORESET associated with the monitored search space having the lowest CORESET ID in the most recent slot. And the terminal may receive by sequentially applying TCI state #1 to the second PDSCH allocated in TRP 1, TCI state #2 to the third PDSCH allocated in TRP 2, and TCI state #2 to the fourth PDSCH allocated in TRP 2. That is, although the base station has indicated the terminal to apply TCI state #1 to the first PDSCH as shown in FIG. 18-30, when the start symbol of the first PDSCH is symbol number 4 and the symbol length is 5, the terminal that has identified that the last symbol index of the PDCCH is number 2 number and the value of timeDurationForQCL is 7 may allow the first PDSCH to follow the default spatial QCL, and receive the PDSCHs by applying TCI #1 to the second PDSCH in which the symbol index allocated in TRP 1 start from number 9, and TCI state #2 to the third and fourth PDSCHs in which the symbol index starts from symbol number 0 of a next slot. The default QCL of the first PDSCH may correspond to at least one of TRP1, TRP2, or TRP that has transmitted DCI. default spatial QCL may be the default spatial QCL mentioned in Alt 3-2.

Alt 4-3

As an example, when at least one symbol of a first or second PDSCH (e.g., a first PDSCH or a second PDSCH) among a plurality of PDSCHs exists in a location based on timeDurationForQCL, the terminal receiving a plurality of PDSCHs, for which TCI states are indicated, from the base station may not apply TCI state #1 indicated by the first PDSCH, but apply default spatial QCL. The terminal may receive by sequentially applying default spatial QCL to the second PDSCH allocated in TRP 1 and TCI state #2 to the third and fourth PDSCHs allocated in TRP 2.

As another example, when at least one symbol of a second PDSCH (e.g., a first PDSCH) among a plurality of PDSCHs exists in a location based on timeDurationForQCL, the terminal receiving a plurality of PDSCHs, for which TCI states are indicated, from the base station may commonly apply default spatial QCL to the first to fourth PDSCHs. The default QCL of the first and third PDSCHs may correspond to at least one of TRP1, TRP2, or TRP that has transmitted DCI.

Alt 4-4

For example, in particular, in the case of Scheme 3, when the start position of all of the plurality of overlapping PDSCHs is less than timeDurationForQCL, the terminal receiving the PDSCH, for which TCI states are indicated, from the base station in slot 0/1 of 18-00, may not apply the TCI states indicated for the first PDSCH—the second PDSCH or the first PDSCH—the fourth PDSCH, but apply default spatial QCL. Here, one or two default QCLs may be configured and operated based on single-PDCCH default QCL enhancement. That is, in slot 1, although the base station has indicated the terminal to apply TCI states #1 to #2 to the first to fourth PDSCHs, when the start symbol of the first PDSCH is symbol 4 and the symbol length is 1, the terminal that has identified that the last symbol index of the PDCCH is 2 and the timeDurationForQCL value is 7 may allow the first to fourth PDSCHs to follow the default spatial QCL, because the symbol index of the start position of all of the plurality of overlapping PDSCHs (symbol numbers 4, 5, 6, 7) is less than the symbol index (number 9) of a location in consideration of timeDurationForQCL. In this case, two configured default QCL may be configured or determined, and the PDSCHs may be received by applying the same.

The default spatial QCL described in Alt 3-4 above may be extended as below and applied to all embodiments, besides the meaning described above.

1) the above-described meaning, that is, a QCL parameter used in reception of the PDCCH in the CORESET associated with the monitored search space having the lowest CORESET ID in the most recent slot.
2) default spatial QCL for PDSCH configured by MAC-CE, etc. Here, the default spatial QCL may be configured to the same value for all TRPs, or may be configured differently for each TRP.
3) Default spatial QCL for PDSCH may refer to a value having the lowest ID among the TCI states for PDSCH configured by RRC or a value having the lowest ID among TCI states for PDSCH activated by MAC-CE.

Depending on the situation, different default spatial QCLs may be applied. For example, in the case of cross-carrier scheduling or cross-BWP scheduling, 3) may be applied, and in other cases, 1) or 2) may be applied. When the terminal supports MAC-CE that configures the default spatial QCL for PDSCH, 1) may be applied before activating the corresponding MAC-CE, and 2) may be applied thereafter.

4) TCI state(s) corresponding to a smallest (lowest) codepoint from among TCI states configured by TCI in a DCI field may be used as a default QCL. For example, the lowest codepoint may refer to a codepoint having a smallest index value from among codepoints of a TCI field. Here, the lowest codepoint may include two or more TCI states. As another example, the lowest codepoint may refer to having a smallest value (index) among codepoints including at least two or more TCI states among a plurality of codepoints of the TCI field.

For example, when there are two TCI states indicated by the lowest codepoint, both a first located TCI state and a second located TCI state may be determined as the default QCL. That is, when all of the determined first and second TCI states are determined as default QCL, the terminal may perform beamforming according to all of the first and second TCI states. As another example, when there are two TCI states indicated by the lowest codepoint, at least one of the first located TCI state and the second located TCI state may be determined as the default QCL. That is, when only the first located TCI state is determined as the default QCL, the terminal may perform beamforming according to only the first TCI state, and when only the second located TCI state is determined as the default QCL, the terminal may perform beamforming only according to the second TCI state. The method of determining one of the two TCI states as the default QCL described above may follow the configurations of the base station and the terminal or a predetermined operation.

5) When all TCI codepoints include one single TCI state and are mapped, a Rel-15-based base station/terminal operation is followed.

The default QCL operation described above may be a feature defined in UE capability.

6) The default QCL operation described in 1) to 5) above may be a feature defined in UE capability. As an example, the terminal may report that a default QCL operation including two TCI states may be performed, via UE capability, and the base station may configure, for the terminal through higher layer signaling, whether performing a default QCL operation including two TCI states is possible. Therefore, the default QCL operation may vary according to the reported UE capability. When the terminal reports, via the UE capability, to the base station that a default QCL operation including two TCI states may be performed, the base station configures, through higher layer signaling, to perform a default QCL operation including two TCI states, with respect to the corresponding terminal, and when at least one codepoint including two TCI states among TCI codepoints is activated, and at least one of the TCI states configured in the PDSCH in a corresponding serving cell includes QCL-TypeD, in a situation where a default QCL operation performance condition is applied, a TCI codepoint of a lowest index among the codepoints including the two TCI states is used. For example, in particular for Scheme 3 or 4, after receiving a PDCCH for indicating Scheme 3 or 4, when a time interval between at least one of the plurality of PDSCHs indicated by a corresponding PDCCH and the PDCCH is shorter than a beam switching time limit (e.g., timeDurationForQCL) reported by the terminal, the terminal may receive the PDSCHs by applying a default QCL operation including two TCI states, to all PDSCHs scheduled by the corresponding PDCCH. Here, when a first PDSCH is received, a first TCI state among the two TCI states included in the default QCL operation may be applied, and when a second PDSCH is received, a second TCI state among the two TCI states included in the default QCL operation may be applied. In addition, when all PDSCHs are received, any TCI state among the two TCI states included in the default QCL operation may be applied to the terminal to receive the PDSCHs. For example, with respect to Scheme 4, when transmission of four PDSCHs is scheduled to a terminal in which cyclical mapping is configured, the PDSCHs may be received by applying the first TCI state of the default TCI codepoint to the first and third PDSCHs, and applying the second TCI state of the default TCI codepoint to the second and fourth PDSCHs. Also, with respect to Scheme 4, when transmission of four PDSCHs is scheduled to a terminal in which cyclical mapping is configured, the PDSCHs may be received by applying the first TCI state of the default TCI codepoint to the first and second PDSCHs, and applying the second TCI state of the default TCI codepoint to the third and fourth PDSCHs. As another example, with respect to Scheme 3 or 4, after receiving a PDCCH for indicating Scheme 3 or 4, when a time interval between some of the plurality of PDSCHs indicated by the corresponding PDCCH and the PDCCH is shorter than a beam switching time limit (e.g., timeDurationForQCL) reported by the terminal, and a time interval between the rest of PDSCHs and the PDCCH is longer than the beam switching time limit (e.g., timeDurationForQCL) reported by the terminal, the terminal may receive the PDSCHs by applying a default QCL operation including two TCI states with respect to reception of some of the PDSCHs, the time interval of which with respect to reception of the PDCCH is shorter than the beam switching time limit (e.g., timeDurationForQCL). In addition, with respect to the reception of some of the PDSCHs, the time interval of which with PDCCH reception is longer than the beam switching time limit (e.g., timeDurationForQCL) reported by the terminal, the terminal may receive the PDSCHs by applying the TCI state indicated by the PDCCH. Here, after receiving a PDCCH indicating transmission of a plurality of PDSCHs for Scheme 3, two default TCIs are sequentially applied to the PDSCHs, the time interval of which with the PDCCH is shorter than the beam switching time limit (e.g., timeDurationForQCL) reported by the terminal, and then two indicated TCIs may be sequentially applied to the PDSCHs, the time interval of which with the PDCCH is longer than the beam switching time limit (e.g., timeDurationForQCL) reported by the terminal. In detail, after receiving a PDCCH indicating transmission of two PDSCHs scheduled in Scheme 3, when a time interval of the first PDSCH with respect to the PDCCH is shorter than the beam switching time limit (e.g., timeDurationForQCL) reported by the terminal, and a time interval of the second PDSCH with respect to the PDCCH is longer than the beam switching time limit (e.g., timeDurationForQCL) reported by the terminal, the terminal may receive the PDSCHs by applying default TCI #1 to the first PDSCH, initializing an index applied in the default TCI, and applying indicated TCI #1 to the second PDSCH. In the same example, the terminal may receive the PDSCHs by applying default TCI #1 to the first PDSCH, and applying indicated TCI #2 to the second PDSCH in consideration of the last index applied in the default TCI. In addition, when the number of scheduled PDSCHs for which cyclical mapping is configured for scheme 4 is four, and the first and second PDSCHs have a shorter time interval with respect to the PDCCH than the beam switching time limit (e.g., timeDurationForQCL) reported by the terminal, and the third and fourth PDSCHs have a longer time interval with respect to the PDCCH than the beam switching time limit (e.g., timeDurationForQCL) reported by the terminal, the terminal may receive the PDSCHs by applying default TCI #1 and default TCI #2 for the first and second PDSCHs, respectively, and may receive the PDSCHs by applying indicated TCI state #1 and indicated TCI state #2 to the third and fourth PDSCHs, respectively. Here, the maximum number of TCI states that the terminal may use for Schemes 3 and 4 is two, and in the above example, a total of four TCI states, which are default TCI #1, default TCI #2, indicated TCI #1, indicated TCI #2, are used in reception of a plurality of PDSCHs. Thus, the terminal may expect that default TCI #1=indicated TCI #1 and default TCI #2=indicated TCI #2, or default TCI #1=indicated TCI #2 and default TCI #2=indicated TCI #1. As another example, when the number of scheduled PDSCHs for which cyclical mapping is configured for scheme 4 is four, and the first to third PDSCHs have a shorter time interval with respect to the PDCCH than the beam switching time limit (e.g., timeDurationForQCL) reported by the terminal, and the fourth PDSCH has a longer time interval with respect to the PDCCH than the beam switching time limit (e.g., timeDurationForQCL) reported by the terminal, the terminal may receive the PDSCHs by applying default TCI #1, default TCI #2, and default TCI #1 to the first, second, and third PDSCHs, respectively, initializing an index applied to the default TCI, and applying indicated TCI state #1 to the fourth PDSCH. Here, the maximum number of TCI states that the terminal may use for Schemes 3 and 4 is two, and in the above example, a total of three TCI states of default TCI #1, default TCI #2, and indicated TCI #1 are used in reception of a plurality of PDSCHs, and thus, the terminal may expect that indicated TCI #1 is the same as default TCI #1 or default TCI #2. That is, it may be expected that indicated TCI #1=default TCI #1 or indicated TCI #1=default TCI #2. In the same example, the terminal may receive the PDSCHs by applying default TCI #1, default TCI #2, and default TCI #1 to the first, second, and third PDSCHs, respectively, and receive the PDSCHs by applying indicated TCI state #2 to the fourth PDSCH by considering the last index applied in the default TCI. Here, the maximum number of TCI states that the terminal may use for Schemes 3 and 4 is two, and in the above example, a total of three TCI states of default TCI #1, default TCI #2, and indicated TCI #2 are used in reception of a plurality of PDSCHs, and thus, the terminal may expect that indicated TCI #2 is the same as the default TCI #1 or default TCI #2. That is, it may be expected that indicated TCI #2=default TCI #1 or indicated TCI #2=default TCI #2. As another example, when the number of scheduled PDSCHs for which sequential mapping is configured is four, and the first to third PDSCHs have a shorter time interval with respect to the PDCCH than the beam switching time limit (e.g., timeDurationForQCL) reported by the terminal, and the fourth PDSCH has a longer time interval with respect to the PDCCH than the beam switching time limit (e.g., timeDurationForQCL) reported by the terminal, the terminal may receive the PDSCHs by applying default TCI #1, default TCI #1, and default TCI #2 to the first, second, and third PDSCHs, respectively, initializing an index applied to the default TCI, and applying indicated TCI state #1 to the fourth PDSCH. Here, the maximum number of TCI states that the terminal may use for Schemes 3 and 4 is two, and in the above example, a total of three TCI states of default TCI #1, default TCI #2, and indicated TCI #1 are used in reception of a plurality of PDSCHs, and thus, the terminal may expect that indicated TCI #1 is the same as the default TCI #1 or default TCI #2. That is, it may be expected that indicated TCI #1=default TCI #1 or indicated TCI #1=default TCI #2. In the same example, the terminal may receive the PDSCHs by applying default TCI #1, default TCI #1, and default TCI #2 to the first, second, and third PDSCHs, respectively, and receive the PDSCHs by applying indicated TCI state #2 to the fourth PDSCH by considering the last index applied in the default TCI. Here, the maximum number of TCI states that the terminal may use for Schemes 3 and 4 is two, and in the above example, a total of three TCI states of default TCI #1, default TCI #2, and indicated TCI #2 are used in reception of a plurality of PDSCHs, and thus, the terminal may expect that indicated TCI #2 is the same as default TCI #1 or default TCI #2. That is, it may be expected that indicated TCI #2=default TCI #1 or indicated TCI #2=default TCI #2.

When the terminal reports, by the UE capability, that it is impossible to perform a default QCL operation including two TCI states, and the base station configures the terminal not to perform a default QCL operation including two TCI states by higher layer signaling, and there is no codepoint including two TCI states among TCI codepoints, a QCL assumption used when receiving a CORESET corresponding to a lowest controlResourceSetId in a most recent slot in a situation where a default QCL operation execution condition is applied may be followed. In addition, besides the above, various default QCL operations described above may be applied, and the number of applicable default QCLs may be limited to one. For example, with respect to Scheme 3 or 4, after receiving a PDCCH for indicating Scheme 3 or 4, when a time interval between at least one of a plurality of PDSCHs indicated by the PDCCH and the PDCCH is shorter than a beam switching time limit (e.g., timeDurationForQCL) reported by the terminal, the terminal may receive the PDSCHs by applying a default QCL operation in which only one TCI is applicable to all PDSCHs scheduled by the PDCCH. For example, with respect to Scheme 4, when transmission of four PDSCHs is scheduled to a terminal in which cyclical mapping or sequential mapping is configured, the PDSCHs may be received by applying a default QCL operation in which only one TCI may be applied to all of the first to fourth PDSCHs. As another example, with respect to Scheme 3 or 4, after receiving a PDCCH for indicating Scheme 3 or 4, when a time interval between some of a plurality of PDSCHs indicated by the PDCCH and the PDCCH is shorter than a beam switching time limit (e.g., timeDurationForQCL) reported by the terminal, and a time interval between the rest of PDSCHs and the PDCCH is longer than the beam switching time limit (e.g., timeDurationForQCL) reported by the terminal, the terminal may receive the PDSCHs by applying a default QCL operation in which only one TCI is applicable to reception of some PDSCHs having the shorter time interval with respect to reception of PDCCH than the beam switching time limit (e.g., timeDurationForQCL). In addition, for the reception of some PDSCHs having a time interval with respect to PDCCH reception, which is longer than the beam switching time limit (e.g., timeDurationForQCL) reported by the terminal, the PDSCHs may be received by applying a TCI state indicated in the PDCCH. Here, after receiving a PDCCH indicating transmission of a plurality of PDSCHs for Scheme 3, a default TCI in which only one TCI is applicable may be applied to the PDSCHs, the time interval of which with respect to the PDCCH is shorter than the beam switching time limit (e.g., timeDurationForQCL) reported by the terminal, and then two indicated TCIs may be applied to the PDSCHs, the time interval of which with respect to the PDCCH is longer than the beam switching time limit (e.g., timeDurationForQCL) reported by the terminal. In detail, after receiving a PDCCH indicating transmission of two PDSCHs scheduled in Scheme 3, when a time interval of a first PDSCH with respect to the PDCCH is shorter than the beam switching time limit (e.g., timeDurationForQCL) reported by the terminal, and a time interval of a second PDSCH with respect to the PDCCH is longer than the beam switching time limit (e.g., timeDurationForQCL) reported by the terminal, the terminal may receive the PDSCHs by applying default TCI #1 to the first PDSCH, initializing an index applied in the default TCI, and applying indicated TCI #1 to the second PDSCH. In the same example, the terminal may receive the PDSCHs by applying default TCI #1 to the first PDSCH, and applying indicated TCI #2 to the second PDSCH in consideration of the last index applied in the default TCI. In addition, when the number of scheduled PDSCHs for which cyclical mapping is configured for scheme 4 is four, and the first and second PDSCHs have a shorter time interval with respect to the PDCCH than the beam switching time limit (e.g., timeDurationForQCL) reported by the terminal, and the third and fourth PDSCH have a longer time interval with respect to the PDCCH than the beam switching time limit (e.g., timeDurationForQCL) reported by the terminal, the terminal may receive the PDSCHs by applying default TCI #1 to both the first and second PDSCHs, may initialize an index applied to default TCI, and may receive the PDSCHs by applying indicated TCI state #1 and indicated TCI state #2 to the third and fourth PDSCHs, respectively. In the same example, the terminal may receive the PDSCHs by applying default TCI #1 to both the first and second PDSCHs, and may receive the PDSCHs by applying indicated TCI state #2 and indicated TCI state #1 to the third and fourth PDSCHs, respectively, in consideration of the index applied as the default TCI. Here, the maximum number of TCI states that the terminal may use for Schemes 3 and 4 is two, and in the above example, a total of three TCI states of default TCI #1, indicated TCI #1, and indicated TCI #2 are used for receiving the plurality of PDSCHs, and thus, the terminal may expect that indicated TCI #1 is the same as indicated TCI #1 or indicated TCI #2. That is, it may be expected that default TCI #1=indicated TCI #1 or default TCI #1=indicated TCI #2. As another example, when the number of scheduled PDSCHs for which cyclical mapping is configured for scheme 4 is four, and a time interval of the first to third PDSCHs with respect to the PDCCH is shorter than the beam switching time limit (e.g., timeDurationForQCL) reported by the terminal, and a time interval of the fourth PDSCH with respect to the PDCCH is longer than the beam switching time limit (e.g., timeDurationForQCL) reported by the terminal, the terminal may receive the PDSCHs by applying default TCI #1 to all of the first, second, and third PDSCHs, may initialize an index applied to the default TCI, and receive the PDSCHs by applying indicated TCI state #1 to the fourth PDSCH. In the same example, the terminal may receive the PDSCHs by applying default TCI #1 to all of the first, second, and third PDSCHs, and may receive the PDSCHs by applying indicated TCI state #2 to the fourth PDSCH, in consideration of the last index applied in the default TCI. As another example, when the number of scheduled PDSCHs for which sequential mapping is configured is four, and a time interval of the first to third PDSCHs with respect to the PDCCH is shorter than the beam switching time limit (e.g., timeDurationForQCL) reported by the terminal, and a time interval of the fourth PDSCH with respect to the PDCCH is longer than the beam switching time limit (e.g., timeDurationForQCL) reported by the terminal, the terminal may receive the PDSCHs by applying default TCI #1 to all of the first, second, and third PDSCHs, may initialize an index applied to the default TCI, and receive the PDSCHs by applying indicated TCI state #1 to the fourth PDSCH. In the same example, the terminal may receive the PDSCHs by applying default TCI #1 to all of the first, second, and third PDSCHs, and may receive the PDSCHs by applying indicated TCI state #2 to the fourth PDSCH, in consideration of the last index applied in the default TCI. In addition, when the terminal reports, by the UE capability, that it is impossible to perform a default QCL operation including two TCI states, and the base station configures the terminal not to perform a default QCL operation including two TCI states, by higher layer signaling, the terminal may not expect that a time interval of all PDSCHs scheduled in Scheme 3 or 4, with respect to the PDCCH, is shorter than the beam switching time limit (e.g., timeDurationForQCL) reported by the terminal. In addition, the operation described above may also be applied equally when the terminal reports, by the UE capability, that it is possible to perform a default QCL operation including two TCI states, and the base station has configured, for the terminal, that it is impossible to perform a default QCL operation including two TCI states, by higher layer signaling.

For example, in the case of Alt 3-2 to 4, the terminal in which cyclical mapping is configured (CycMapping is enabled) as shown in FIG. 17 may apply a TCI state located at a first position of a lowest codepoint, as default spatial QCL applied to the first PDSCH transmitted from TRP 1, and apply a TCI state located at a second position of the lowest codepoint as a default spatial QCL applied to the second PDSCH transmitted from TRP 2. In addition, as a default spatial QCL applied to the first PDSCH transmitted from TRP 3, a first located TCI state or TCI states indicated by scheduling DCI may be applied, and as a default spatial QCL applied to the second PDSCH transmitted from TRP 4, a second located TCI state or TCI states indicated by scheduling DCI may be applied.

As another example, in the conditions of Alt 4-2 to 4, the terminal in which cyclical mapping is configured (CycMapping is enabled) as shown in FIG. 18 may apply a TCI state located at a first position of a lowest codepoint as a default spatial QCL applied to the first and second PDSCH transmitted from TRP 1, and apply a TCI state located at a second position of the lowest codepoint or TCI states indicated by scheduling DCI as a default spatial QCL applied to the second PDSCH transmitted from TRP 3, 4.

The terminal does not expect that more than two layers are received through PDSCH transmission. That is, it will be limited to receiving a maximum of two layers. Here, when all PDSCH occasions apply the first TCI state, an applied RV is applied as shown in Table 18-1 when pdsch-AggregationFactor is configured, where a value of n is counted by considering only the PDSCH transmission occasions associated with the first TCI state. In addition, an RV applied to the PDSCH transmission occasion associated with the second TCI state is applied as shown in Table 18-2 when pdsch-AggregationFactor is configured, and an additional shifting calculation for each $rv_s$ is configured by higher layer RVSeqOffset. Here, the value of n is counted by considering only PDSCH transmission occasions associated with the second TCI state.

TABLE 18-1

| | applied redundancy version | | | |
|---|---|---|---|---|
| $rv_{id}$ indicated by the DCI scheduling the PDSCH | $rv_{id}$ to be applied to $n^{th}$ transmission occasion | | | |
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

TABLE 18-2

| | redundancy version applied to second TCI. | | | |
|---|---|---|---|---|
| $rv_{id}$ indicated by the DCI scheduling the PDSCH | $rv_{id}$ to be applied to $n^{th}$ transmission occasion with second TCI state | | | |
| | n mod 4 = 0 | n mod 4 = 1 | n mod 4 = 2 | n mod 4 = 3 |
| 0 | $(0 + rv_s)$ mod 4 | $(2 + rv_s)$ mod 4 | $(3 + rv_s)$ mod 4 | $(1 + rv_s)$ mod 4 |
| 2 | $(2 + rv_s)$ mod 4 | $(3 + rv_s)$ mod 4 | $(1 + rv_s)$ mod 4 | $(0 + rv_s)$ mod 4 |
| 3 | $(3 + rv_s)$ mod 4 | $(1 + rv_s)$ mod 4 | $(0 + rv_s)$ mod 4 | $(2 + rv_s)$ mod 4 |
| 1 | $(1 + rv_s)$ mod 4 | $(0 + rv_s)$ mod 4 | $(2 + rv_s)$ mod 4 | $(3 + rv_s)$ mod 4 |

FIG. 18-60 shows a case where Koffset between a plurality of PDSCHs allocated to the terminal by the base station is not 0 (the value of Koffset is configured to 2) in various embodiments of Alt3 and Alt4. Here, a condition to be changed to Koffset is that, when a location based on timeDurationForQCL exists in an offset region (including the boundary) located between PDSCHs on a time domain, the terminal may consider PDSCH(s) existing before the offset as a region for determining whether default QCL is applied. For example, when a transmission time (start time) of PDSCHs scheduled to apply the TCI states is greater than or equal to symbol number 9, the terminal that has identified that the last symbol index of the PDCCH transmitted by the base station is 2 and the configured timeDurationForQCL value is 7 may receive the PDSCHs by applying TCI state #1 to the first PDSCH allocated in TRP 1, TCI state #2 to the second PDSCH allocated in TRP 2, TCI state #1 to the third PDSCH allocated in TRP 1, and TCI state #2 to the fourth PDSCH allocated in TRP2.

As another example, although the base station has indicated the terminal to apply TCI state #1 to the first PDSCH, when a start symbol of the first PDSCH is symbol number 4, the symbol length is 4, and Koffset is 2, the terminal that has identified that the last symbol index of the PDCCH is 2 and the timeDurationForQCL value is 7 may further identify that timeDurationForQCL exists in the offset region between the first PDSCH and the second PDSCH or in a region before the second PDSCH, and allow the first PDSCH to follows default spatial QCL and the various embodiments (alt 3 and 4) above may be reflected in the remaining second PDSCH to the fourth PDSCH.

Figure 19:
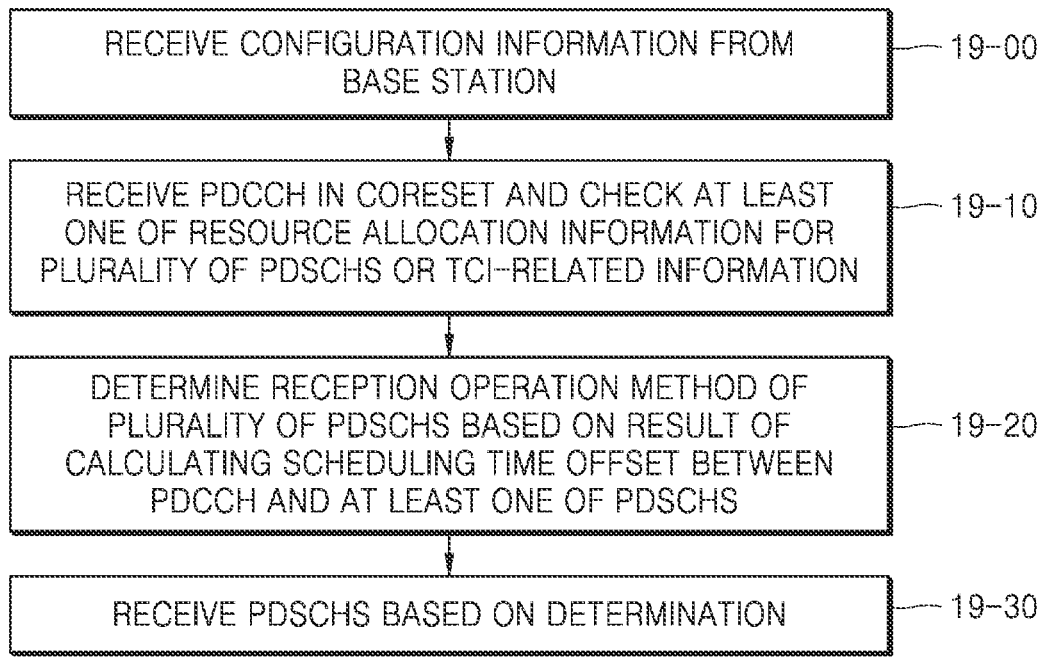
FIG. 19 is a flowchart of an operating method of a terminal according to another embodiment of the disclosure.

FIG. 19 is a flowchart of an operating method of a terminal according to an embodiment of the disclosure.

Referring to FIG. 19, a method of receiving, by a terminal, NC-JT transmission-based PDSCH, and a default QCL assumption are described.

In an RRC configuration process with a base station, the terminal may receive at least one piece of configuration information including at least one of parameters related to base station beamforming (tci-PresentinDCI, RepTCIMapping), a parameter for control channel and data channel, or configuration information (PDCCH-config, PDSCH-config) (19-00). According to a configuration value of the RepTCI-Mapping parameter, the terminal may check repeatedly transmitted data of the base station, resource-related information, beamforming patterns.

In addition, the terminal may transmit UE capability information (timeDurationForQCL) to the base station (19-00). The terminal may transmit the UE capability information at a request from the base station or at a predetermined point in time (e.g., in the RRC configuration process with the base station). Accordingly, when the base station receives the capability information of the terminal, the process of receiving the capability may be omitted. Alternatively, the operation of receiving the capability itself may be omitted according to the configuration information.

Thereafter, the terminal receives, from the base station, a first PDCCH in a specific CORESET based on the configuration information.

Also, the terminal may check at least one of resource allocation information for the PDCCH and a plurality of PDSCHs, TCI-related information, and antenna port information (19-10). The plurality of PDSCHs (for example, two PDSCHs, four PDSCHs, etc.) may be repeatedly transmitted based on the repeatedly transmitted data, the resource-related information, and the beamforming patterns described with reference to FIGS. 16 to 18.

The terminal may calculate, based on the identified information, a scheduling time offset between the PDCCH and at least one of the PDSCHs (e.g., between the PDCCH and at least one of first to Nth PDSCHs, where a value of N is 2, 4, or an integer equal to or greater than these), and may determine at least one of an operation of receiving each Nth PDSCH (e.g., where a value of N is 2, 4, or an integer equal to or greater than these) (or a reception operation method) or a reception beamforming direction based on the calculation result (19-20). For example, the determining of a reception operation method, by the terminal, may include at least one of determining whether to receive data through at least one of each of the first PDSCH and the second PDSCH or a method for receiving data when it is determined to receive data. As another example, the determining a reception operation method, by the terminal, may include determining whether to receive data through at least one of each of the Nth PDSCHs or determining repeatedly transmitted data, resource-related information, and beamforming patterns, for reception of data, when it is determined to receive each Nth PDSCH data.

The terminal may receive data through a first PDSCH and a second PDSCH corresponding to the first PDCCH or a second PDCCH based on at least one of the identified information (19-10) and a result of the determination (19-20) (19-30).

And, the terminal may perform decoding of the received data.

Figure 20:
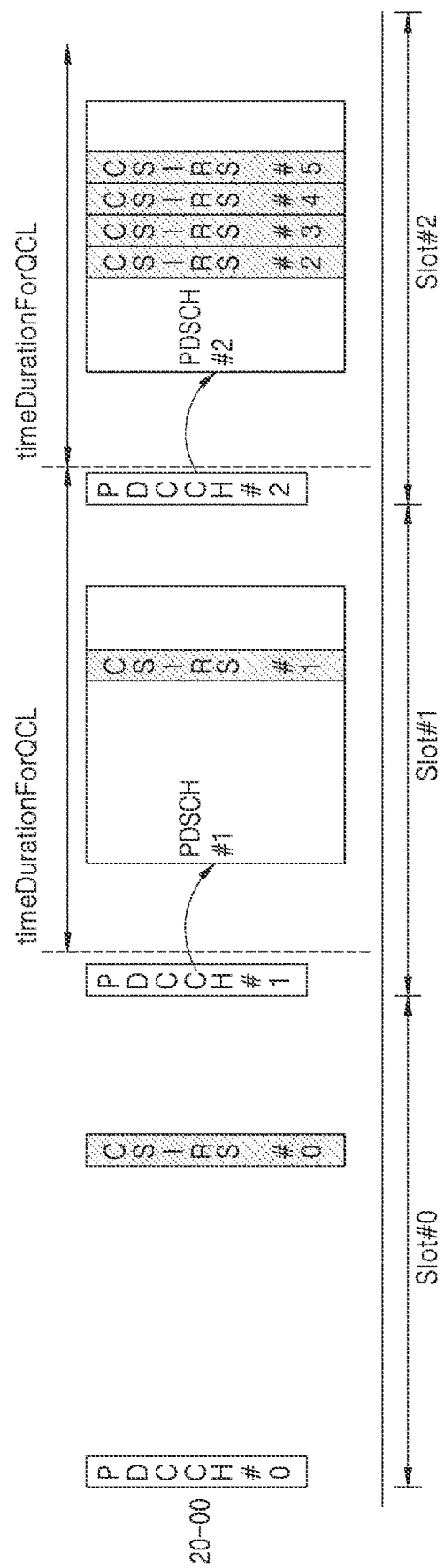
FIG. 20 illustrates a method of receiving, by a terminal, an NC-JT transmission-based PDSCH, and a default QCL assumption, according to an embodiment of the disclosure.

FIG. 20 illustrates a method of receiving, by a terminal, an NC-JT transmission-based PDSCH, according to an embodiment of the disclosure, and a default QCL assumption.

According to a UE feature, a terminal having maxNumberActiveTCI-PerBWP of 1 may report related UE capability related information to a base station. The terminal may support one active TCI state for each CC and each BWP, and the terminal may basically track one active TCI state for PDCCH and PDSCH reception. When CSI-RS(s) for the purpose of RLM (e.g., slot #0), CSI-RS(s) for beam management (e.g., slot #1), CSI-RS(s) for beam failure detection, or CSI-RS(s) for tracking are additionally configured, the terminal may measure a channel by receiving the periodic CSI-RS, SPS CSI-RS, and aperiodic CSI-RS.

On the other hand, as shown in FIG. 20-00, when beam switching is indicated to the terminal in the first PDCCH, and the scheduled first PDSCH and the first CSI-RS for channel measurement overlap in the same OFDM symbol, there may be a case for the terminal where a default QCL-based default PDSCH beam and a CSI-RS QCL type-D assumption configured in RRC conflict with each other. Here, in consideration of the configured timeDurationForQCL value (e.g., 7, 14, 28 symbols in the case of SCS of 60 kHz, 14, 28 kHz in the case of SCS of 120 kHz), to receive a PDSCH allocated from a PDCCH indicating beam switching, when a start time of the PDSCH is located before a time based on timeDurationForQCL, the terminal may receive the PDSCH according to the configured default QCL (or enhanced default QCL).

The (enhanced) default QCL may operate based on at least one of various schemes as below.
1) the above-described meaning, that is, a QCL parameter used in reception of the PDCCH in the CORESET associated with the monitored search space having the lowest CORESET ID in the most recent slot.
2) default spatial QCL for PDSCH configured by MAC-CE, etc. Here, the default spatial QCL may be configured to the same value for all TRPs, or may be configured differently for each TRP.

3) Default spatial QCL for PDSCH may refer to a value having the lowest ID among the TCI states for PDSCH configured by RRC or a value having the lowest ID among TCI states for PDSCH activated by MAC-CE.

Depending on the situation, different default spatial QCLs may be applied. For example, in the case of cross-carrier scheduling or cross-BWP scheduling, 3) may be applied, and in other cases, 1) or 2) may be applied. When the terminal supports MAC-CE that configures the default spatial QCL for PDSCH, 1) may be applied before activating the corresponding MAC-CE, and 2) may be applied thereafter.

4) A PDSCH may be received by applying a QCL type-D assumption of overlapped CSI-RS symbol(s) on a time-domain resource as enhanced default QCL for reception of a scheduled PDSCH.

5) TCI state(s) corresponding to a smallest (lowest) codepoint from among TCI states configured as TCI in a DCI field may be used as a default QCL. For example, the lowest codepoint may refer to a codepoint having a smallest index value from among codepoints of a TCI field. Here, when layers for transmitting a PDSCH are two to four, the lowest codepoint may include two or more TCI states. As another example, the lowest codepoint may refer to having the smallest value (index) among codepoints including at least two or more TCI states among a plurality of codepoints of the TCI field.

The present embodiment may also be sufficiently applied to the various embodiments described with reference to FIGS. 16 to 18.

For example, when a plurality of PDSCHs resources and the CSI-RS overlap each other on a time-domain resource through a plurality of TRPs in a single PDCCH, the QCL type-D assumption of the CSI-RS may be applied to PDSCH reception.

As another example, when each PDSCH scheduled in a plurality (e.g., two) of PDCCHs is allocated as shown in FIGS. 12 and 13, the base station may configure, to a certain terminal, a CSI-RS in association with each CORESET index or TRP index to which the PDSCHs are allocated. The method of establishing an association may include a method of indicating the CORESET index or the TRP index directly to the CSI-RS or indicating the CORESET index or the TRP index to SSB or RS referenced in the CSI-RS with respect to QCL.

Here, when the configured CSI-RS resource overlaps with the PDSCH transmitted from the same TRP, the terminal may apply the QCL type-D assumption of the CSI-RS to receive the overlapped PDSCH. When the configured CSI-RS resource overlaps with the PDSCH(s) transmitted from a different TRP, the terminal may apply a default spatial QCL of the PDSCH resource (e.g., following at least one of the enhance default QCL 1), 2), and 3)) assumption or the QCL type-D assumption of CSI-RS.

Additionally, when the configured CSI-RS resource overlaps with the PDSCH(s) transmitted from at least one TRP, for reception of all PDSCHs transmitted from each TRP, the terminal may commonly apply a default spatial QCL of the PDSCH resource (e.g., following at least one of the enhance default QCL 1), 2), and 3)) assumption or the QCL type-D assumption of CSI-RS.

In addition, when a plurality of PDSCHs are repeatedly allocated such that an offset exists, as shown in 16-60, 17-60, 18-60, and when a plurality of PDSCHs resources and the CSI-RS do not overlap each other on a time-domain resource, but in an offset symbol resource, the QCL type-D assumption of the CSI-RS may be applied to PDSCH reception.

Figure 21:
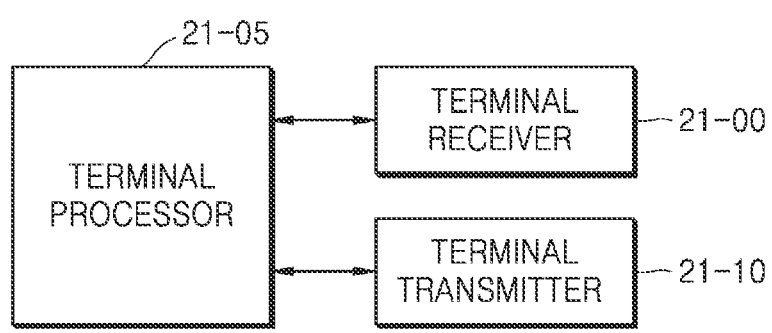
FIG. 21 illustrates a structure of a terminal in a wireless communication system according to an embodiment of the disclosure.

FIG. 21 is a block diagram of a structure of a terminal in a wireless communication system, according to an embodiment of the disclosure.

Referring to FIG. 21, the terminal may include a terminal receiver 21-00, a terminal transmitter 21-10, and a terminal processor (controller) 21-05.

The terminal receiver 21-00 and the terminal transmitter 21-10 may be together referred to as a transceiver. According to the communication method of the terminal described above, the terminal receiver 21-00, the terminal transmitter 21-10, and the terminal processor 21-05 of the terminal may operate. However, elements of the terminal are not limited to the above-described example. For example, the terminal may include more or fewer elements (for example, a memory) than the described ones. Moreover, the terminal receiver 21-00, the terminal transmitter 21-10, and the terminal processor 21-05 may be implemented as one chip.

The terminal receiver 21-00 and the terminal transmitter 21-10 (or, a transceiver) may transmit or receive a signal to or from a base station. The signal may include control information and data. In this regard, the transceiver may include an RF transmitter for up-converting and amplifying a frequency of a transmitted signal, and an RF receiver for amplifying low-noise and down-converting a frequency of a received signal. However, this is only an example of the transceiver and elements of the transceiver are not limited to the RF transmitter and the RF receiver.

Furthermore, the transceiver may receive a signal through a wireless channel and output the signal to the terminal processor 21-05, and may transmit a signal output from the terminal processor 21-05 through the wireless channel.

The memory (not shown) may store a program and data required for an operation of the terminal. Furthermore, the memory may store control information or data included in a signal obtained by the terminal. The memory may include a storage medium such as ROM, RAM, hard disk, CD-ROM, and DVD, or any combination thereof.

The terminal processor 21-05 may control a series of processes so that the terminal operates according to the above embodiments of the disclosure. The terminal processor 21-05 may be implemented as a controller or one or more processors.

Figure 22:
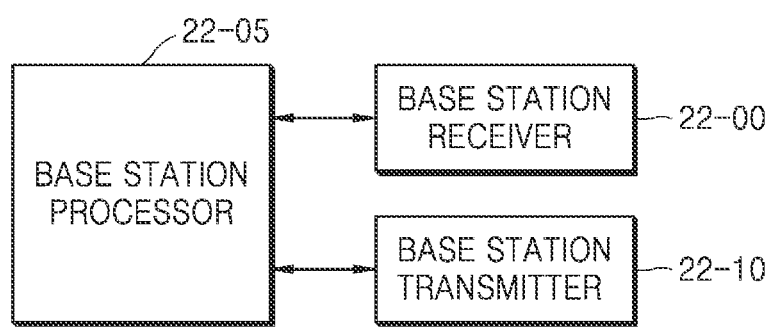
FIG. 22 illustrates a structure of a base station in a wireless communication system according to an embodiment of the disclosure.

FIG. 22 is a block diagram of a structure of a base station in a wireless communication system, according to an embodiment of the disclosure.

Referring to FIG. 22, the base station may include a base station receiver 22-00, a base station transmitter 22-10, and a base station processor (controller) 22-05.

The base station receiver 22-00 and the base station transmitter 22-10 may be together referred to as a transceiver. According to the communication method of the base station described above, the base station receiver 22-00, the base station transmitter 22-10, and the base station processor 22-05 of the base station may operate. However, elements of the base station are not limited to the above-described example. For example, the base station may include more or fewer elements (for example, a memory) than the described ones. Moreover, the base station receiver 22-00, the base station transmitter 22-10, and the base station processor 22-05 may be implemented as one chip.

The base station receiver 22-00 and the base station transmitter 22-10 (or a transceiver) may transmit or receive a signal to or from a terminal. The signal may include control information and data. In this regard, the transceiver may include an RF transmitter for up-converting and amplifying a frequency of a transmitted signal, and an RF receiver for amplifying low-noise and down-converting a frequency of a received signal. However, this is only an example of the transceiver and components of the transceiver are not limited to the RF transmitter and the RF receiver.

Furthermore, the transceiver may receive a signal through a wireless channel and output the signal to the base station processor 22-05, and may transmit a signal output from the base station processor 22-05 through the wireless channel.

The memory (not shown) may store a program and data required for an operation of the base station. Furthermore, the memory may store control information or data included in a signal obtained by the base station. The memory may include a storage medium such as ROM, RAM, hard disk, CD-ROM, and DVD, or any combination thereof.

The base station processing unit 22-05 may control a series of processes so that the base station operates according to the above embodiments of the disclosure. Also, the base station processor 22-05 may be implemented as a controller or one or more processors.

The methods according to the claims of the disclosure or the embodiments described in the specification may be implemented in hardware, software, or a combination of hardware and software.

When implemented in software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described in the claims and the specification.

The programs (e.g., software modules or software) may be stored in random access memory, non-volatile memory including flash memory, read-only memory (ROM), electrically erasable programmable read-only memory (EEPROM), a magnetic disc storage device, a compact disc-ROM (CD-ROM), a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as the Internet, an intranet, a local area network (LAN), a wide LAN (WLAN), and a storage area network (SAN). Such a storage device may access the electronic device via an external port. Furthermore, an additional storage device on the communication network may access a device that performs the embodiments of the disclosure.

In the drawings for explaining the method of the disclosure, the order of description does not necessarily correspond to the order of execution, and the precedence relationship between the operations of the method may be changed or the operations may be executed in parallel.

Alternatively, some components may be omitted and only some components may be included in the drawings for explaining the method of the disclosure without impairing the gist of the disclosure.

Also, parts or all of the descriptions included in each of the embodiments of the method of the disclosure may be performed in combination without departing from the gist of the disclosure.

Also, although not disclosed in the disclosure, a method in which a separate table or information including at least one component included in the table proposed in the disclosure is used is also possible.

Meanwhile, the embodiments disclosed in the specification and drawings are merely presented to easily describe the technical content of the disclosure and help understanding of the disclosure, and are not intended to limit the scope of the disclosure. Thus, it will be apparent to those of ordinary skill in the art that the disclosure is not limited to the embodiments of the disclosure, which have been provided only for illustrative purposes. Also, when necessary, the above respective embodiments may be employed in combination. For example, parts of Embodiments 1 to 9 of the disclosure may be combined with each other to enable a base station and a terminal to operate.

The invention claimed is:

1. A method performed by a terminal in a wireless communication system, the method comprising:
   receiving, from a base station through higher layer signaling, configuration information indicating whether a transmission configuration indication (TCI) field is present in downlink control information (DCI);
   receiving, from the base station, DCI on a physical downlink control channel (PDCCH) for scheduling both a first physical downlink shared channel (PDSCH) associated with a first transmission and reception point (TRP) and a second PDSCH associated with a second TRP; and
   when it is configured to apply in case that the configuration information indicates that the TCI field is present in DCI and a time offset between the reception of the DCI and at least one of the first PDSCH or the second PDSCH is longer than or equal to a value related to a time duration for quasi co-location (QCL), receiving the first PDSCH and the second PDSCH based on at least one QCL parameter associated with at least one TCI state in a codepoint of the TCI field included in the DCI, and
   wherein the DCI, the first PDSCH, and the second PDSCH are received on a same cell.

2. The method of claim 1, further comprising:
   in case that the time offset is shorter than the value related to the time duration for QCL, receiving the first PDSCH and the second PDSCH based on at least one QCL parameter used for the PDCCH.

3. The method of claim 2, wherein the at least one QCL parameter used for the PDCCH comprises a QCL parameter used for a QCL indication for PDCCH of a control resource set (CORESET) associated with a search space having a lowest CORESET identifier (ID) in a most recent slot.

4. The method of claim 1, wherein information on the time duration for QCL is transmitted to the base station through capability information of the terminal.

5. The method of claim 1, further comprising:
   receiving, from the base station, a medium access control (MAC) control element (CE) including information related to at least one TCI state candidate for PDSCH, from among TCI states configured by higher layer signaling,
   wherein the at least one TCI state in the codepoint of the TCI field included in the DCI indicates at least one of the at least one TCI state candidate.

6. A method performed by a base station in a wireless communication system, the method comprising:
   transmitting, to a terminal through higher layer signaling, configuration information indicating whether a transmission configuration indication (TCI) field is present in downlink control information (DCI);

transmitting, to the terminal, DCI on a physical downlink control channel (PDCCH) for scheduling both a first physical downlink shared channel (PDSCH) s associated with a first transmission and reception point (TRP) and a second PDSCH associated with a second TRP; and in case that the configuration information indicated that the TCI field is present in DCI, and a time offset between the reception of the DCI and at least one of the first PDSCH and the second PDSCH is longer than or equal a value related to a time duration for quasi co-location (QCL), transmitting the first PDSCH and the second PDSCH according to at least one QCL parameter associated with at least one TCI state in a codepoint of the TCI field included in the DCI, wherein the DCI, the first PDSCH, and the second PDSCH are transmitted on a same cell.

7. The method of claim 6, further comprising:

in case that the time offset is shorter than the value related to the time duration for QCL, transmitting the first PDSCH and the second PDSCH according to at least one QCL parameter used for the PDCCH.

8. The method of claim 7, wherein the at least one QCL parameter used for the PDCCH comprises a QCL parameter used for a QCL indication for PDCCH of a control resource set (CORESET) associated with a search space having a lowest CORESET identifier (ID) in a most recent slot.

9. The method of claim 6, wherein information on the time duration for QCL is received from the terminal through capability information of the terminal.

10. The method of claim 6, further comprising:

transmitting, to the terminal, a medium access control (MAC) control element (CE) including information related to at least one TCI state candidate for PDSCH, from among TCI states configured by higher layer signaling, wherein the at least one TCI state in the codepoint of the TCI field included in the DCI indicates at least one of the at least one TCI state candidate.

11. A terminal in a wireless communication system, the terminal comprising:

a transceiver; and a controller coupled with the transceiver configured to:

receive, from a base station through higher layer signaling, configuration information indicating whether transmission configuration indication (TCI) field is present in downlink control information (DCI), receive, from the base station, DCI on a physical downlink control channel (PDCCH) for scheduling both a first physical downlink shared channel (PDSCH) associated with a first transmission and reception point (TRP) and a second PDSCH associated with a second TRP, and in case that the configuration information indicates that the TCI field is present in DCI and a time offset between the reception of the DCI and at least one of the first PDSCH or the second PDSCH is longer than or equal to a value related to a time duration for quasi co-location (QCL), receive the first PDSCH and the second PDSCH based on at least one QCL parameter associated with at least one TCI state in a codepoint of the TCI field included in the DCI, wherein the DCI, the first PDSCH, and the second PDSCH are received on a same cell.

12. The terminal of claim 11, wherein the controller is further configured to, in case that the time offset is shorter than the value related to the time duration for QCL, receive the first PDSCH and the second PDSCH based on at least one QCL parameter used for the PDCCH.

13. The terminal of claim 12, wherein the at least one QCL parameter used for the PDCCH comprises a QCL parameter used for a QCL indication for PDCCH of a control resource set (CORESET) associated with a search space having a lowest CORESET identifier (ID) in a most recent slot.

14. The terminal of claim 11, wherein the controller is further configured to receive, from the base station, a medium access control (MAC) control element (CE) including information related to at least one TCI state candidate for PDSCH, from among TCI states configured by higher layer signaling, and wherein the at least one TCI state in the codepoint of the TCI field included in the DCI indicates at least one of the at least one TCI state candidate.

15. A base station in a wireless communication system, the base station comprising:

a transceiver; and a controller coupled with the transceiver configured to:

transmit, to a terminal through higher layer signaling, configuration information indicating whether a transmission configuration indication (TCI) field is present in downlink control information (DCI), transmit, to the terminal, DCI on a physical downlink control channel (PDCCH) for scheduling both a first physical downlink shared channel (PDSCH) associated with a first transmission and reception point (TRP) and a second PDSCH associated with a second TRP, and in case that the configuration information indicates that the TCI field is present in DCI and a time offset between the reception of the DCI and at least one of the first PDSCH or the second PDSCH is longer than or equal to a time duration for quasi co-location (QCL), transmit the first PDSCH and the second PDSCH according to at least one QCL parameter associated with at least one TCI state in a codepoint of the TCI field included in the DCI, wherein the DCI, the first PDSCH, and the second PDSCH are transmitted on a same cell.

* * * * *